(12) United States Patent
Berntorp et al.

(10) Patent No.: US 11,698,625 B2
(45) Date of Patent: Jul. 11, 2023

(54) STOCHASTIC MODEL-PREDICTIVE CONTROL OF UNCERTAIN SYSTEM

(71) Applicant: Mitsubishi Electric Research Laboratories, Inc., Cambridge, MA (US)

(72) Inventors: Karl Berntorp, Newton, MA (US); Rien Quirynen, Somerville, MA (US); Sean Vaskov, Ann Arbor, MI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 368 days.

(21) Appl. No.: 17/117,159

(22) Filed: Dec. 10, 2020

(65) Prior Publication Data
US 2022/0187793 A1   Jun. 16, 2022

(51) Int. Cl.
*G05B 19/4155* (2006.01)
*G05D 1/00* (2006.01)
*G06N 20/00* (2019.01)

(52) U.S. Cl.
CPC ....... *G05B 19/4155* (2013.01); *G05D 1/0088* (2013.01); *G05B 2219/42061* (2013.01); *G05D 2201/0213* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,180,443 B1 * | 2/2007 | Mookerjee | G01S 13/723 342/162 |
| 2021/0373513 A1 * | 12/2021 | Quirynen | G05B 13/0275 |

* cited by examiner

*Primary Examiner* — Ryan A Jarrett
(74) *Attorney, Agent, or Firm* — Gennadiy Vinokur; Hironori Tsukamoto

(57) ABSTRACT

A stochastic model predictive controller (SMPC) estimates a current state of the system and a probability distribution of uncertainty of a parameter of dynamics of the system based on measurements of outputs of the system, and updates a control model of the system including a function of dynamics of the system modeling the uncertainty of the parameter with first and second order moments of the estimated probability distribution of uncertainty of the parameter. The SMPC determines a control input to control the system by optimizing the updated control model of the system at the current state over a prediction horizon and controls the system based on the control input to change the state of the system.

20 Claims, 39 Drawing Sheets

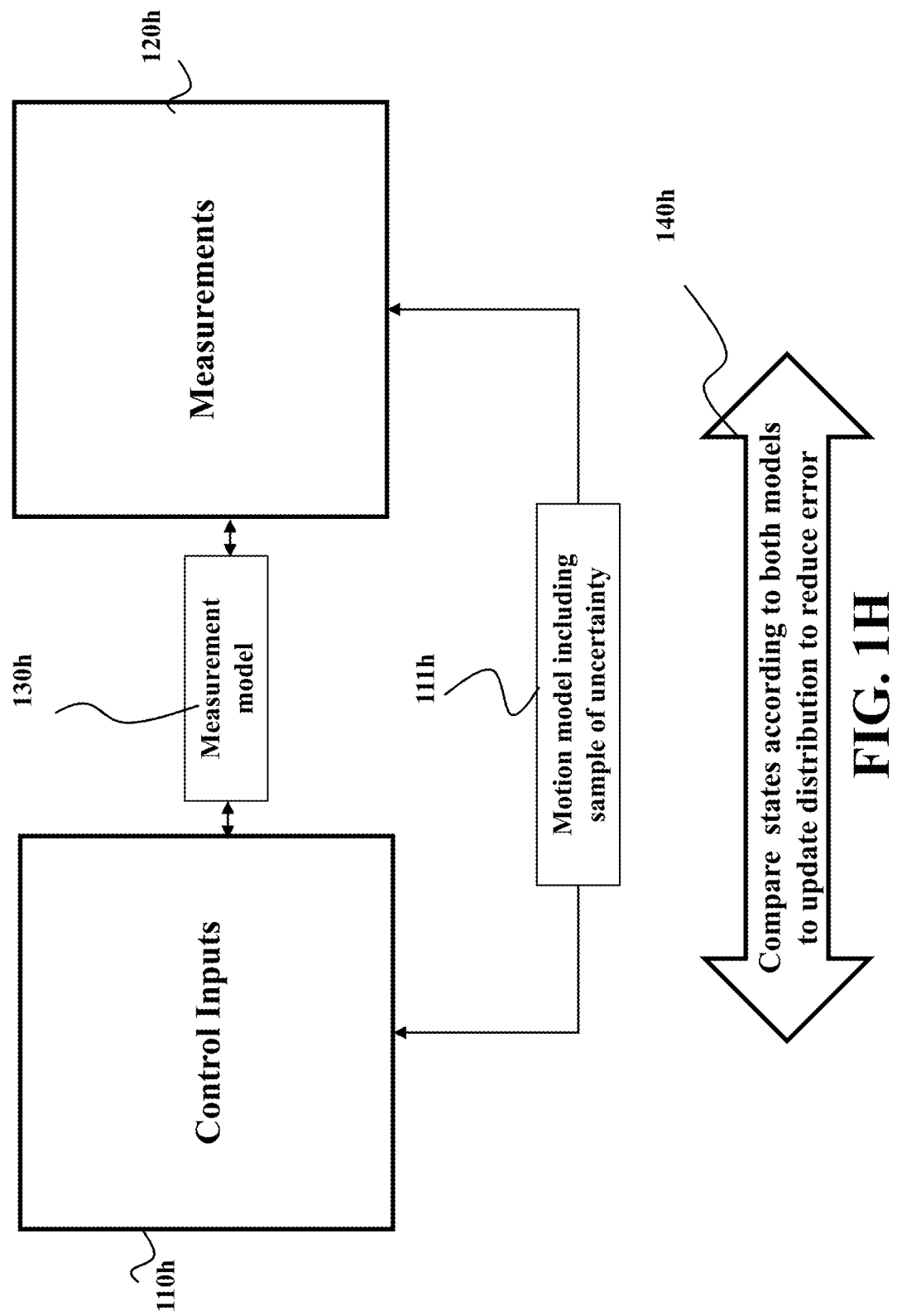

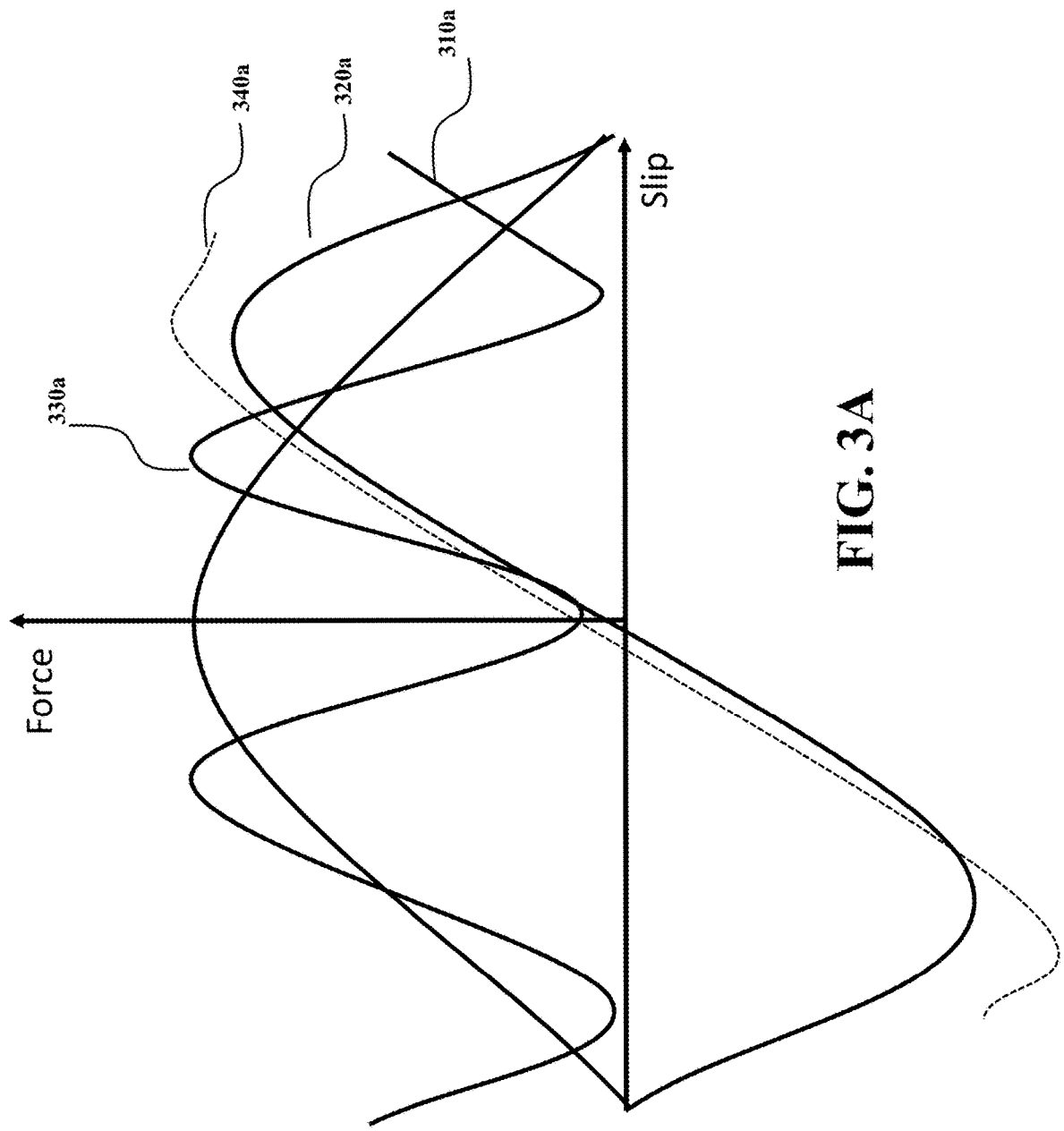

STOCHASTIC MODEL-PREDICTIVE CONTROL OF UNCERTAIN SYSTEM

TECHNICAL FIELD

The invention relates generally to control applications, and more particularly to methods and apparatus for model-predictive control of a system in response to an estimated uncertainty of at least a parameter of the system.

BACKGROUND

Optimization-based control and estimation techniques, such as model predictive control (MPC), allow a model-based design framework in which the system dynamics and constraints can directly be taken into account. MPC is used in many applications to control dynamical systems of various complexities, where the systems are described by a set of nonlinear differential equations, i.e., a system of ordinary differential equations (ODE), differential-algebraic equations (DAE), or partial differential equations (PDE). Examples of such systems include production lines, car engines, robots, numerically controlled machining, satellites, and power generators.

The MPC is based on a real-time finite-horizon optimization of a model of a system. The MPC has the ability to anticipate future events and to take appropriate control actions. This is achieved by optimizing the operation of the system over a future finite time-horizon subject to constraints, and only implementing the control over a current time step.

The MPC can predict the change in state variables of the modeled system caused by changes in control variables. The state variables define a state of the system, i.e., a state of a controlled system is the smallest set of state variables in the state-space representation of the control system that can represent the entire state of the system at any given time. For example, if a controlled system is an autonomous vehicle, the state variables may include position, velocity, and heading of the vehicle. The MPC uses models of the system, the current system measurements and/or state estimates, the current state of the vehicle, and state and control constraints to calculate future changes in the state of the vehicle. These changes are calculated to hold the state close to the target subject to constraints on both control and state variables. The MPC typically sends out only the first change in each control variable to be implemented by actuators of the controlled system and repeats the calculation when the next change is required.

Many systems to be controlled are partially unknown, or at least uncertain. E.g., when controlling a vehicle both the maximum friction between tire and road is not exactly known, and furthermore, the dependence of the friction to the state of the vehicle, e.g., the velocity of the vehicle, is also not known. Typically, such uncertainties are estimated concurrently with the MPC, to give the MPC a better knowledge of the model it controls. Although MPC exhibits inherent robustness due to feedback, such controllers do not take uncertainties directly into the account and, consequently, the satisfaction of safety-critical constraints cannot be guaranteed in the presence of model uncertainties or external disturbances. One alternative approach is robust MPC, which relies on the optimization of control policies under worst-case scenarios in the presence of a bounded range of uncertainty. However, robust MPC can lead to conservative control performance, due to the worst-case scenarios occurring with an extremely small probability.

Another type of MPC is stochastic MPC (SMPC), where the uncertainty of the system is modeled to have a distribution, e.g., the distribution can be the Gaussian distribution having a mean (center) and a covariance (uncertainty). SMPC aims at reducing the conservativeness of robust MPC by directly incorporating the probabilistic description of uncertainties into the optimal control problem (OCP) formulation. In some implementations, the SMPC requires constraints to be satisfied with a certain probability, i.e., by formulating so-called chance constraints that allow for a specified, yet non-zero, probability of constraint violation. In addition, SMPC is advantageous in settings where high performance in closed-loop operation is achieved near the boundaries of the plant's feasible region. In the general case, chance constraints are computationally intractable and typically require an approximate formulation.

In addition to many systems having uncertain parameters or components, such uncertainties are often time-varying. E.g., referring to the tire-friction of a vehicle, it will change depending on if the road is wet or dry, or packed with snow or having patches of ice. In cases of time-varying uncertainties, there is a need for updating the estimates of the uncertainty online, i.e., recursively. In the case of SMPC the estimating concerns determining a probability distribution of the uncertainty.

However, SMPC assumes the uncertainty is predetermined offline, i.e., prior to executing the controller. In many cases, such assumption is overly restrictive, as in numerous applications the uncertainties change with time and can hence not be predetermined offline prior to executing the SMPC.

Accordingly, there is a need to include the externally determined uncertainty distribution into the SMPC solver during a real-time control of a system.

SUMMARY

It is an objective of some embodiments to provide a stochastic model predictive controller (SMPC) for controlling a system under uncertainty, e.g., the uncertainty of a parameter of the system or a general uncertainty that cannot be parametrized a priori, e.g., due to prior lack of knowledge of the behavior of the uncertainty. It is another objective of some embodiments to provide such a controller that runs concurrently with an estimator estimating recursively, i.e., online, the uncertainty of the system. It is another objective of some embodiments to provide such a controller when the uncertainty changes with time and is dependent on the state of the system. As used herein, a system can be any mechanical system having constraints that can be controlled to achieve some task, e.g., a vehicle avoiding an obstacle where the uncertainty is the surface and the state includes the velocity, a robot performing mounting operations where the state includes joint angles and the uncertainty is the flexibility in the robot arm, or an air conditioner system controlling the temperature of a room. E.g., the constraints can be a vehicle avoiding abandoning the road while avoiding the obstacle, a robot performing mounting operations under a time limit, or an air conditioner system staying within prescribed energy efficiency limits.

Some embodiments are based on the realization that while SMPC assumes an offline predetermined uncertainty, many uncertainties in practical applications cannot be determined offline, because they are changing with time, but also because they depend on the control inputs and the system response to such control inputs. Hence, there is a need for an estimator determining an uncertainty of the distribution that can be inputted to the SMPC, to be used for uncertainty prediction in SMPC. Consequently, it is an object of some embodiments to include the externally determined uncertainty distribution into the SMPC.

Some embodiments are based on the realization that the probability distribution of the uncertainty can be categorized in two ways, state-independent probability distribution and state-dependent distribution. A state-independent distribution is a probability distribution of uncertainty that, when determined, can be expressed without knowing the state of the system. E.g., the mass of a vehicle is independent of the motion of the vehicle and is, therefore, a state-independent uncertainty. A state-dependent distribution is a probability distribution of uncertainty that is determined as a function of the state of the system. E.g., the friction between a tire and road that can be developed depends on the acceleration and velocity of the vehicle that forms a part of the state of the vehicle.

One embodiment recognizes that the control model of a system, i.e., the model of the system used for determining control commands to the system, can be decomposed to include a part independent on the uncertainty and a part dependent on the uncertainty. Some embodiments realize that a state-independent uncertainty and consequently its probability distribution of the uncertainty can be inputted to the SMPC as a multiplier to the part of the control model that is dependent on the uncertainty. Because the uncertainty can be inputted as a multiplier, it preserves linearity, i.e., the propagation of the uncertainty within the prediction horizon in the SMPC does not need to be modified, i.e., various uncertainty propagation techniques can be used without modification.

While linearity is preserved for state-independent uncertainties, one embodiment is based on the fact that such linear preservation cannot be used for state-dependent uncertainties. For state-dependent uncertainties and hence probability distributions, the state-dependent distribution of the uncertainty needs to be modified at each time-step in the SMPC prediction horizon. Furthermore, the state-dependent uncertainty is nonlinear and can thus not be extracted as a multiplier to at least a part of the control model.

Some embodiments are based on the realization that similar to the control model, the state-dependent probability distribution can be partitioned on a state-dependent part and a state-independent part. The state-dependent part can be included in the original SMPC formulation, while the state-independent part is estimated online and added to the SMPC in a manner similar to the inclusion of state-independent probability distribution. In such a manner, the state-dependent uncertainties can be determined online to be used in a framework of SMPC.

In some implementations, the probability distribution of the state-dependent uncertainty can be regarded as a Gaussian process, i.e., a distribution over functions with a continuous domain, e.g. space, such that a sample of the Gaussian process is a continuous uncertainty function. Representing the distribution of uncertainty as a Gaussian process can increase the accuracy of the uncertainty estimation. However, estimating the uncertainty function according to principles of a Gaussian process is a computationally challenging task, especially in an online setting where computationally fast recursive implementations are necessary.

Some embodiments are based on the realization of a manner of simplifying the estimation of the Gaussian process to determine the uncertainty function and the associated probability distribution of the uncertainty. Specifically, in some embodiments, the uncertainty is regarded as a weighted combination of basis functions, and the Gaussian process of the uncertainty is captured by Gaussian distributions of weights of basis functions. It can be shown that if the weights for each basis function are modeled as a Gaussian distribution, the weighted combination of the basis function has an interpretation of the uncertainty modeled as a Gaussian process. In other words, to update the Gaussian process some embodiments can just update these Gaussian distributions of weights. In effect, regarding the uncertainty function as a weighted combination of basis functions decreases the computational requirements for estimating the uncertainty in a probabilistic manner.

In other embodiments the part of the control model, i.e., the model of the system used for control, that is multiplied with the uncertainty, is a nonlinear function. In another embodiment, the state-dependent uncertainty is captured by a weighted basis function expansion, wherein the basis functions are predefined nonlinear functions of the state of the system, wherein the weights are determined online, i.e., recursively. In some embodiments the nonlinear function of the control model includes a combination of basis functions, i.e., they can be used in the SMPC without modification. In another embodiment the weights of the basis functions are multiplied with the nonlinear function of the model of the system, i.e., the weights capture the uncertainty, are independent of the state and, can therefore be provided in the multiplier.

Some embodiments first determine a probability distribution over possible functions of the uncertainty, and second determines a specific function from probability distribution. Doing in such a manner ensures that the determined uncertainty adheres to the uncertainties stemming from the available data and that the uncertainty of the specific function from said probability distribution can be quantified. This can be beneficial, e.g., in a vehicle control where the vehicle controller can exploit a large uncertainty of the friction for particular ranges of the state to minimize the risk of unwanted behavior in the vehicle control.

Some embodiments are based on an SMPC that in discrete time instances propagates covariances extracted from the determined probability distribution. In other embodiments, the specific function determined from said probability distribution is the mean of the probability distribution, which is used to propagate the state of the system forward over the SMPC control horizon.

Some embodiments are based on the realization that the feedback control action should be taken into account in the forward propagation of the uncertainty for the predicted state values. Some embodiments use a time-invariant or a time-varying sequence of affine feedback gains to pre-stabilize the nonlinear system dynamics, resulting in covariance propagation equations that directly consider the effects of feedback control actions on the uncertainty in the future. For example, the infinite-horizon linear-quadratic regulator for the linearized system dynamics at reference steady-state and input values could be used to pre-stabilize the system dynamics in the stochastic nonlinear optimal control problem (OCP) formulation. In some embodiments, the uncertainty is dependent on both the state of the system and the feedback control action. Consequently, the state and control actions are inserted into the basis functions, i.e., the state and control dependent part of the uncertainty. Doing in such a manner ensures that the weights of the basis functions are maintained state and control independent.

In some embodiments, the SMPC includes probabilistic chance constraints, based on a discretization of the nonlinear differential equations that describe the control model of the system and a discrete-time propagation of the uncertainty for the nonlinear system dynamics. Each of the probabilistic chance constraints aims to ensure that the probability of violating the corresponding inequality constraint is below a certain probability threshold value.

Some embodiments use a formulation of the probabilistic chance constraints that are based on a tightening for each of the inequality constraints with a term that depends on a back-off coefficient value, a constraint Jacobian matrix, and a covariance matrix for the predicted state value at that particular time step. Some embodiments of the invention are based on the realization that the covariance matrices can be computed efficiently for the state values at each time step in the control horizon, using an approximate linearization-based covariance propagation, wherein the covariance propagation includes the covariance of the uncertainty. The covariance equations can be based on a discretization of the linearization-based propagation of uncertainty for the continuous-time nonlinear system dynamics. Alternatively, discrete-time covariance propagation can be done directly based on linearization of the discretized set of nonlinear dynamic equations.

Some embodiments use a particle filter maintaining a set of particles, each particle includes an estimation of a state of the system, an estimation of a probability distribution function of the uncertainty, and a weight indicative of the probability of the particle.

Other embodiments are based on the recognition that it is possible to update the state of the system in each particle and the probability distribution function of the uncertainty of each particle, to fit with the measurement and control input according to the motion model and measurement model of the system.

In one embodiment, the probability distribution function of the uncertainty is determined as a weighted combination of the probability distribution function of the uncertainty in each particle.

Accordingly, one embodiment discloses a stochastic model predictive controller (SMPC) for controlling a system, comprising: at least one processor; and memory having instructions stored thereon that, when executed by the at least one processor, cause the SMPC to: determine, at each control step based on measurements of outputs of the system indicative of a transition of a state of the system from a previous state to a current state, an estimation of the current state of the system, and an estimation of a probability distribution of uncertainty of a parameter of dynamics of the system; update a control model of the system including a function of dynamics of the system modeling the uncertainty of the parameter with first and second order moments of the estimated probability distribution of uncertainty of the parameter; determine a control input to control the system by optimizing the updated control model of the system at the current state over a prediction horizon; and control the system based on the control input to change the state of the system.

Another embodiment discloses a stochastic model predictive control (SMPC) method for controlling a system, wherein the method uses a processor coupled with stored instructions implementing the method, wherein the instructions, when executed by the processor carry out steps of the method, comprising: determining, at each control step based on measurements of outputs of the system indicative of a transition of a state of the system from a previous state to a current state, an estimation of the current state of the system, and an estimation of a probability distribution of uncertainty of a parameter of dynamics of the system; updating a control model of the system including a function of dynamics of the system modeling the uncertainty of the parameter with first and second order moments of the estimated probability distribution of uncertainty of the parameter; determining a control input to control the system by optimizing the updated control model of the system at the current state over a prediction horizon; and controlling the system based on the control input to change the state of the system.

BRIEF DESCRIPTION OF THE DRAWINGS

FIG. 1H shows a schematic of a method of using states of a system to update the probability distribution of the uncertainty according to some embodiments.

FIG. 3A shows an illustration of the use of weighted basis functions according to one embodiment.

DETAILED DESCRIPTION

Figure 1A:
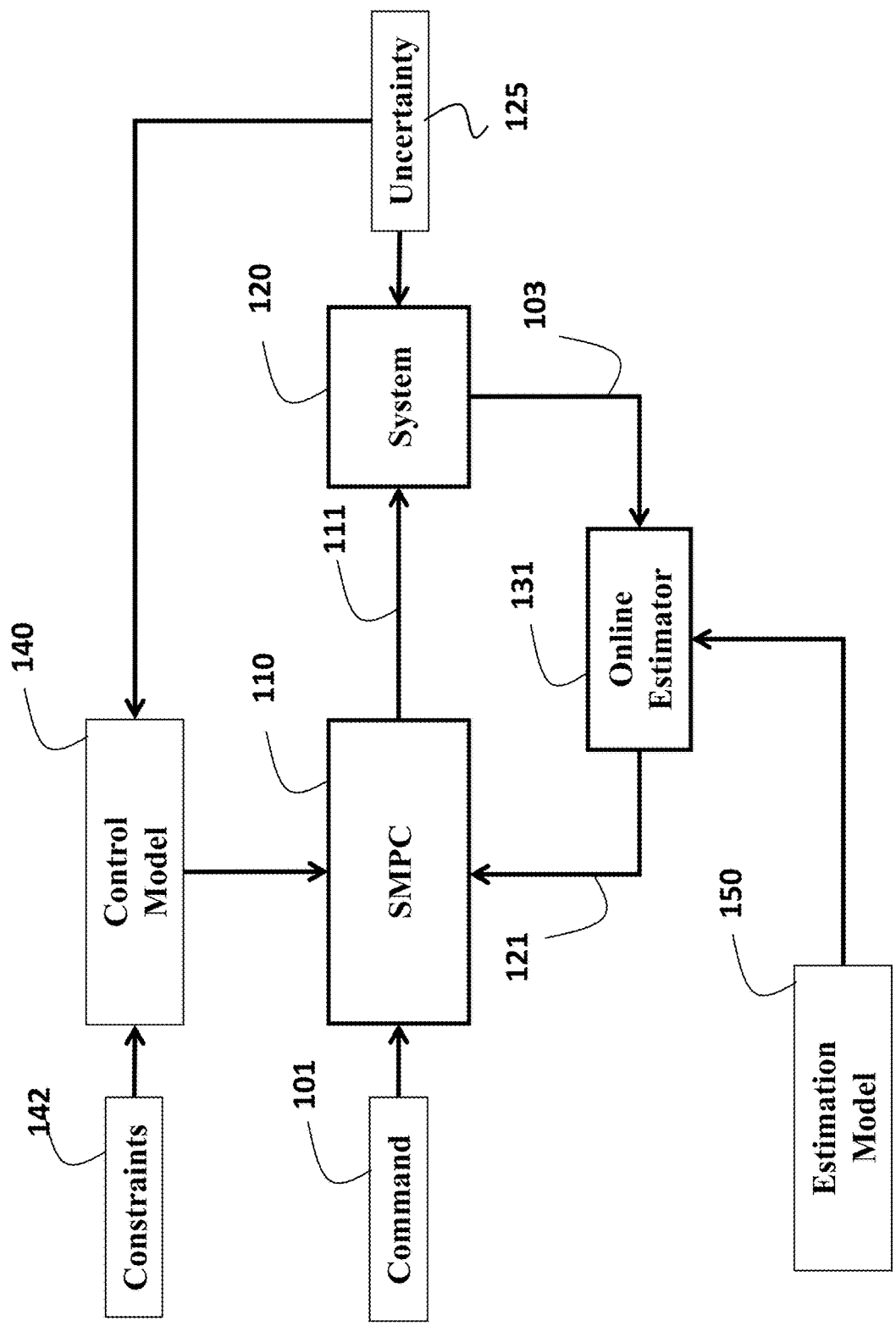
FIG. 1A shows an example system with uncertainty, connected to a stochastic model predictive controller (SMPC) according to some embodiments.

FIG. 1A shows an example system 120 with uncertainty 125, connected to a stochastic model predictive controller (SMPC) 110 via a state estimator 131 according to some embodiments. The SMPC is programmed according to a dynamical model 140, i.e., a control model of the system. The model can be a set of equations representing changes of the state and output 103 of the system 120 over time as functions of current and previous inputs 111 and previous outputs 103. The model can include constraints 142 that represent the physical and operational limitations of the system. During the operation, the controller receives a command 101 indicating the desired behavior of the system. The command can be, e.g., a motion command. In response to receiving the command 101, the controller generates a control signal 111 that serves as an input for the real system 120 with uncertainty 125. In response to the input, the system updates the output 103 of the system. Based on measurements of the output of the system 103 and an estimation model 150 that is generally different from the control model 140, the estimator 131 updates the estimated state and uncertainty 125 of the system 121. These estimates of the system 121 provide the state feedback to the controller 110.

The system 120, as referred to herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The uncertainty 125 can be any time-varying uncertainties, including any external disturbances, forces or torques acting on the system 120, any unmodeled dynamics, or any uncertainties in physical quantities such as uncertain friction coefficients, friction functions, a mass of a body, center of gravity of the system, or uncertain coefficients and parameters in the control model equations that describe the physical behavior of the real system 120. For example, in some implementations, the SMPC 110 uses a simplified control model 140, resulting in a large amount of the physical behavior in the real system to remain unmodeled, to reduce the computational complexity of the controller or because some of the physical behavior is too complex and therefore difficult or impossible to model by first principles. Such simplified modeling can cause or contribute to the uncertainty 125. Note that time-independent uncertainties can be estimated or learned, either online or offline, as part of the state and parameter estimator 131.

In various embodiments, the estimator 131 is an online estimator that determines the uncertainty 125 and/or confidence about the estimated uncertainty in real-time, i.e., during the control of the system 120. In such a manner some embodiments increase the accuracy of the estimation of the uncertainty 125 with respect to the accuracy of offline estimation of the uncertainties because the uncertainty 125 is changing with time and may depend on the control inputs and the system response to such control inputs.

A control model 140 can include a dynamic model defining dynamics of the system 120. The control model 140 of the system 120 can include a set of mathematical equations that describe how the system outputs change over time as functions of current and previous inputs and the previous outputs. The state of the system is any set of information, in general time-varying, for instance, an appropriate subset of current and previous inputs and outputs, that, together with the model of the system and future inputs, can uniquely define the future motion of the system. The real system 120 can be subject to physical limitations and specification constraints 142 limiting the range where the outputs, the inputs, and also possibly the states of the system are allowed to operate. In various embodiments, the control model of the system includes a function of dynamics of the system having the parameter with the uncertainty 125. In such a manner, the uncertainty acting on the system 120 can be captured by the model 140. Examples of parameters with uncertainty include a state of stiffness of a tire of the vehicle, a peak friction of a tire of a vehicle, a friction function capturing the friction behavior as a function of the vehicle maneuvering behavior, a mass of the vehicle, an inertia of the vehicle.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 131 can be implemented in hardware or as a software program executed in a processor, either the same or a different processor from the controller 110, which at fixed or variable control period sampling intervals receives the outputs of the system 103 and determines, using the new and the previous output measurements, the estimated state and uncertainty 121 of the system 120.

Figure 1B:
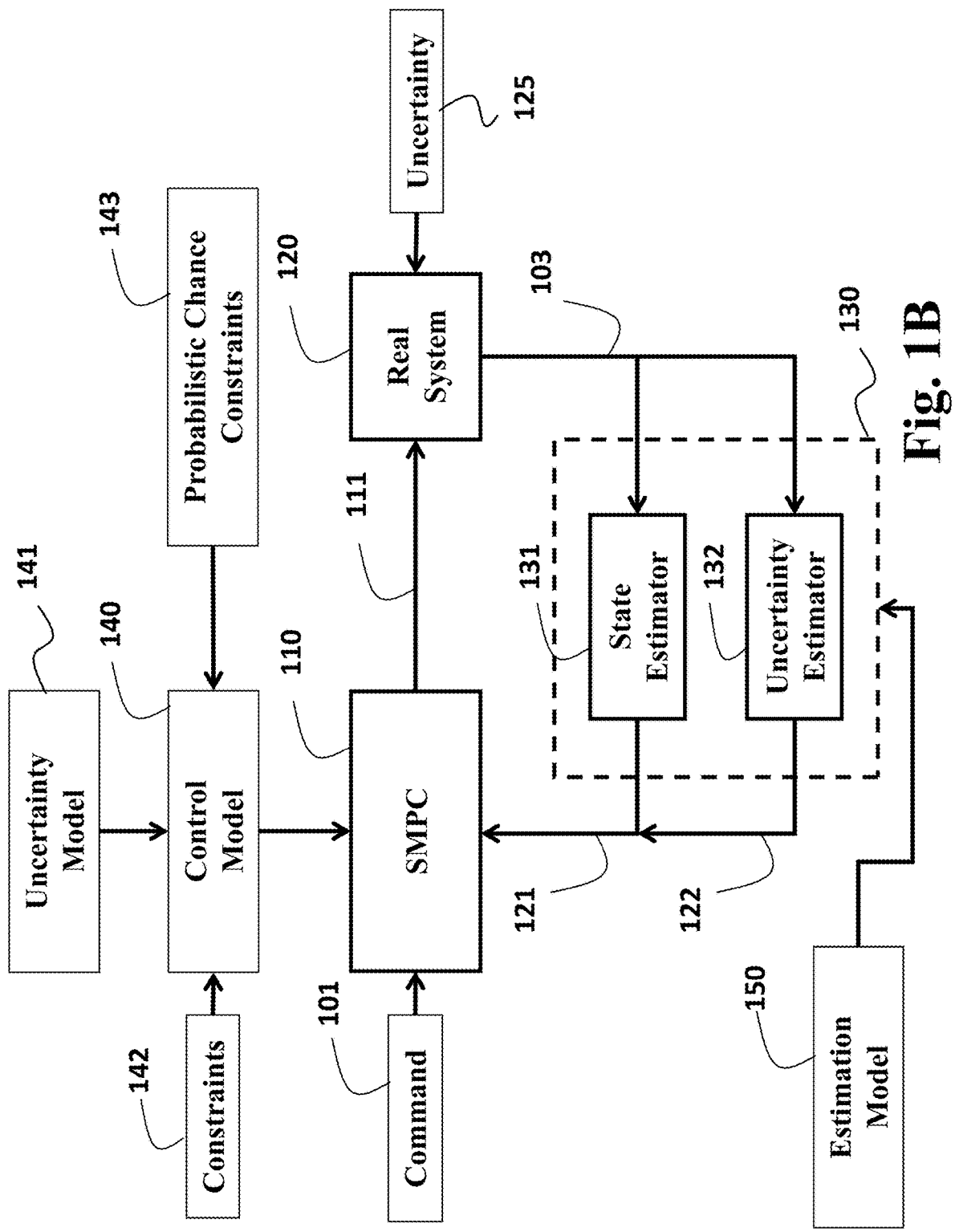
FIG. 1B shows an example system with uncertainty, connected to an SMPC via a state estimator and uncertainty estimator.

FIG. 1B shows an example system 120 with uncertainty 125, connected to an SMPC 110 via a state estimator 131 and uncertainty estimator 132 according to some embodiments. In some implementations, the SMPC is programmed according to a control model 140 of the system 120 having an uncertainty. The control model includes an uncertainty model 141 to model the uncertainty 125 and its relation to the behavior of the system. The uncertainty model 141 includes a model of the linear and/or nonlinear relations between the uncertainty and the control model equations that describe the dynamic behavior of the system. In addition, the uncertainty model includes a model of the probability distributions for each of the time-varying uncertainties in the control model.

For example, in some embodiments, the parameter of uncertainty is a slope of a tire-friction curve such that the model of the probability distribution defines an uncertainty distribution of possible values of said slope. In some embodiments, the control model 140 for SMPC 110 can include one or multiple probabilistic chance constraints 143. As used herein, a chance constraint is a constraint defining physical or geometric limitations of the system accounting for the uncertainty of different aspects of the control model. For instance, a chance constraint can define constraints on the lateral displacement of the vehicle on the road. Different embodiments can formulate one or multiple of any of the physical limitations and specification constraints for the system as one or multiple probabilistic chance constraints 143, which aim to enforce that the probability of violating the corresponding constraint is below a certain probability threshold value.

In some embodiments, the uncertainty estimator 132 provides estimates 122, e.g., the probability distribution of the uncertainty, or the first and higher-order moments of the probability distribution. In some embodiments of the invention, the state estimator 131 and uncertainty estimator 132 are implemented together in one estimator component 130, which at fixed or variable control period sampling intervals receives the outputs of the system 103 and determines, using the new and the previous output measurements, the estimated state 121 and estimated uncertainty 122 of the system 120 and uncertainty 125. In some embodiments, the estimator 130 is composed of a particle filter 131 and an uncertainty estimator 132 modeling the uncertainty as a weighted sum of basis functions dependent on the state and/or control input, wherein the weights are estimated by the uncertainty estimator. In other embodiments, the uncertainty estimator part 132 models the uncertainty as a Gaussian distribution with unknown mean and covariance, wherein the mean and covariance are state-independent. In some implementations, the weights of basis functions are modeled as Gaussian distributions with unknown mean and variance, i.e., the weights can be treated similarly to the uncertainty modeled as a Gaussian distribution, i.e., state-independent.

Figure 1C:
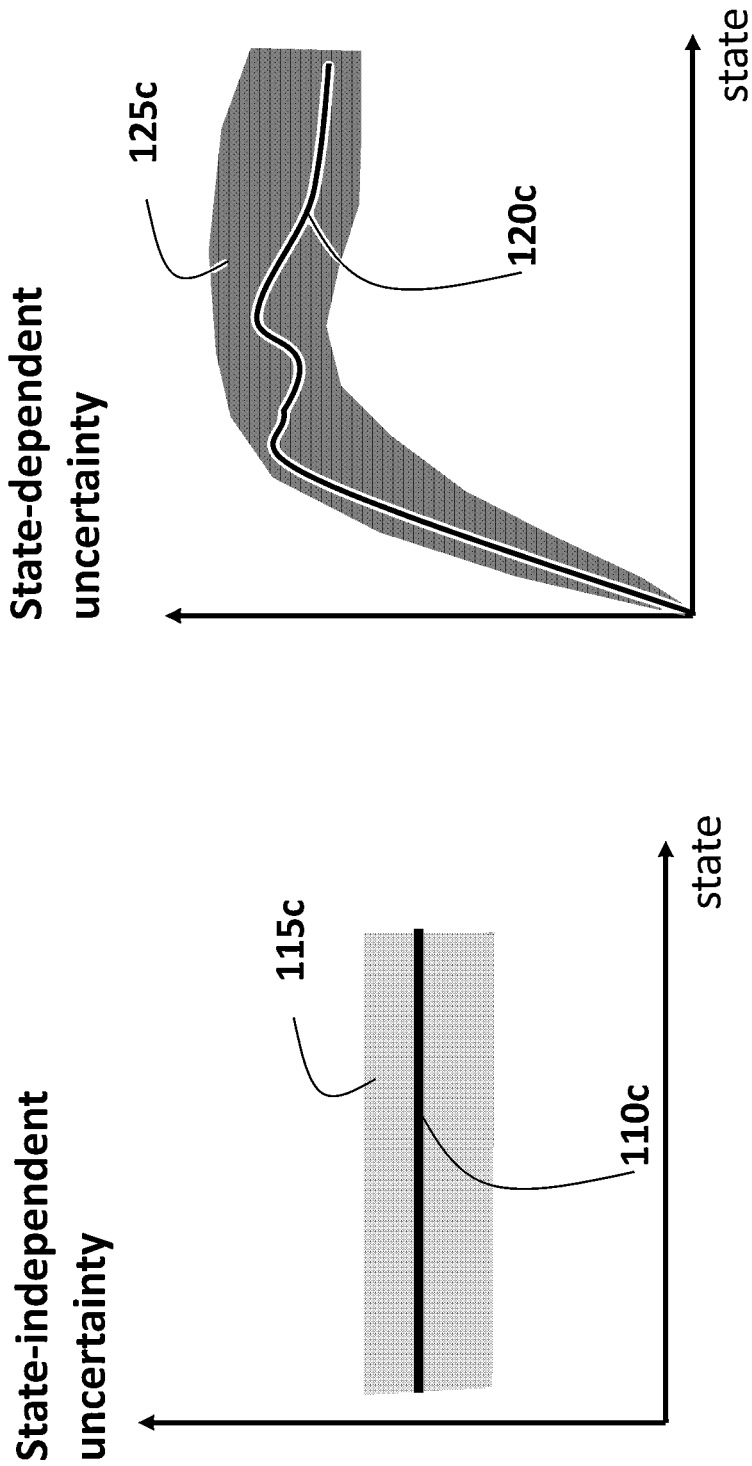
FIG. 1C shows an illustration of the categorization of the uncertainty according to some embodiments.

FIG. 1C shows an illustration of the categorization of the uncertainty according to some embodiments. Some embodiments are based on the realization that the uncertainty, and therefore also the probability distribution of the uncertainty, can be categorized in two ways, state-independent probability distribution 115c and state-dependent distribution 125c. A state-independent distribution 115c is a probability distribution of uncertainty that, when determined, can be expressed without knowing the state of the system. E.g., the mass of a vehicle is independent of the motion of the vehicle and is, therefore, a state-independent uncertainty. A state-dependent distribution 125c is a probability distribution of uncertainty that is determined as a function of the state of the system. E.g., the friction 120c between a tire and road that can be developed depends on the acceleration and velocity of the vehicle.

Some embodiments recognize that the control model 140 of a system 120, i.e., the model of the system used for determining control commands 111 to the system, can be decomposed into a part independent of the uncertainty and a part dependent on the uncertainty. Some other embodiments realize that a state-independent uncertainty and consequently its probability distribution of the uncertainty can be inputted to the SMPC as a multiplier to the part of the control model that is dependent on the uncertainty. Because the uncertainty can be inputted as a multiplier, it preserves linearity, i.e., the propagation of the uncertainty within the prediction horizon in the SMPC does not need to be modified, i.e., standard uncertainty propagation techniques can be used without modification.

Figure 1D:
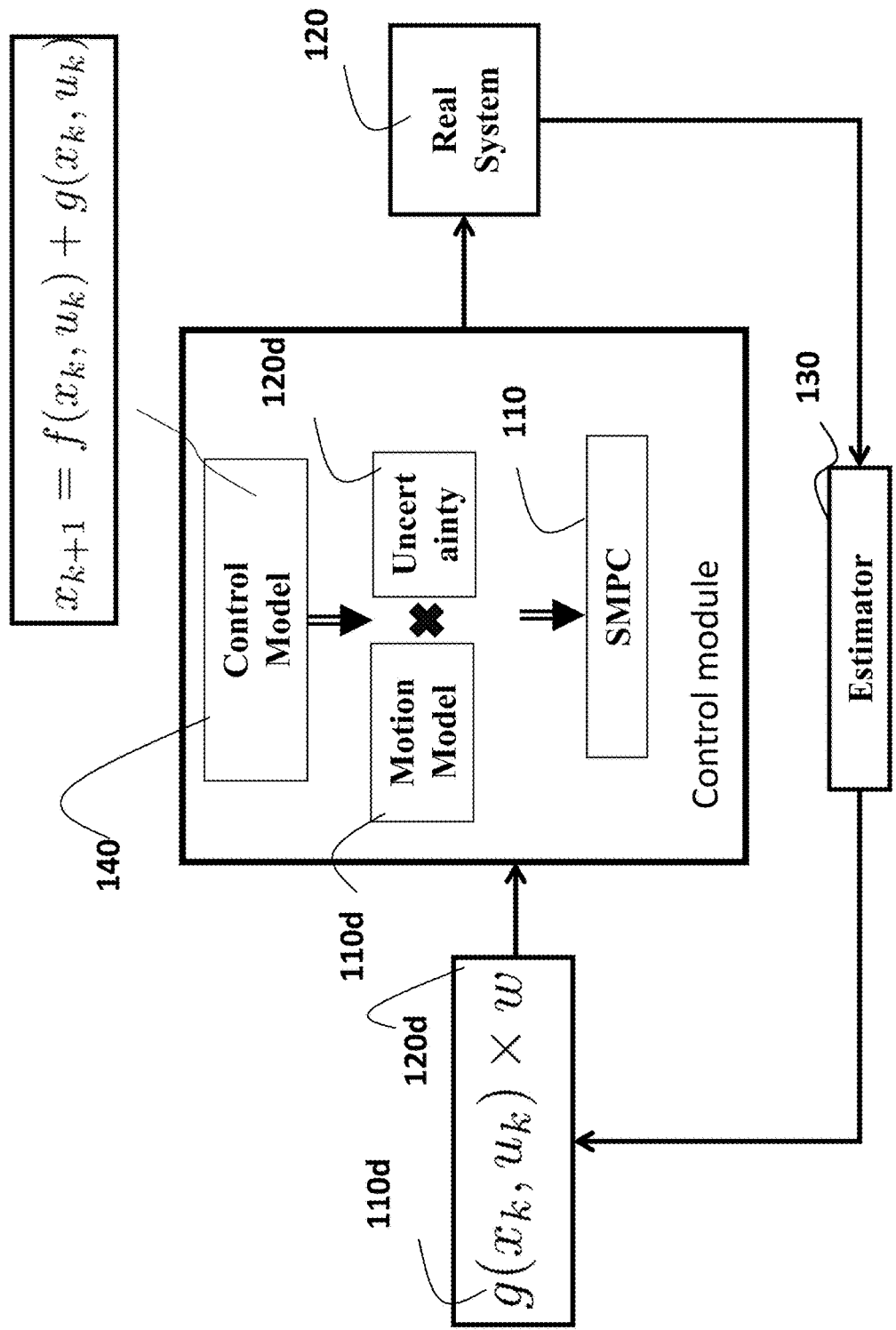
FIG. 1D shows how the model of the system used in the SMPC can be updated based on an estimation of a probability distribution of uncertainty of a system according to some principles.

FIG. 1D shows how the model of the system used in the SMPC can be updated based on an estimation of a probability distribution of uncertainty of a system according to some principles. The control model 110 is described by a set of mathematical equations, wherein the model can be decomposed into at least two components, each component is a possibly nonlinear function describing parts of the system, generally dependent on both the state $x_k$ at time step k and the control command $u_k$. At each control step, the estimator 130 estimates the probability distribution of the uncertainty 120d. The uncertainty can be inputted to the control model as a multiplier to the function 110d of dynamics of the system dependent on the uncertainty.

Figure 1E:
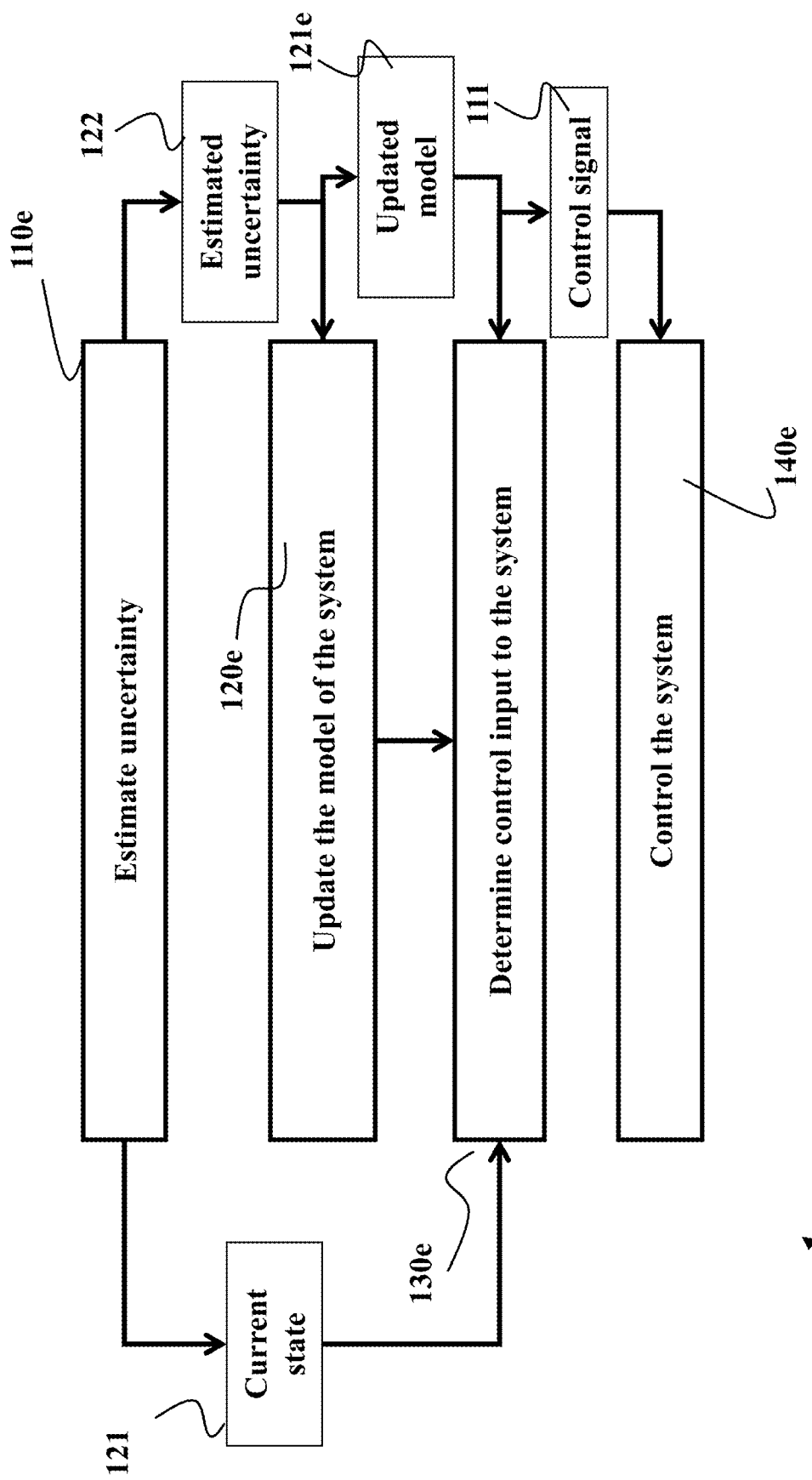
FIG. 1E shows a flowchart of an SMPC for controlling a system executed by at least one processor.

FIG. 1E shows a flowchart of an SMPC for controlling a system executed by at least one processor. At each time step of control, the SMPC 110 estimates 110e the probability distribution of the uncertainty 122 and the state 121 of the system, e.g., based on measurements of outputs 103 of the system indicative of a transition of a state of the system from a previous state to a current state. The SMPC 110 updates 120e the control model 140 of the system with the estimated uncertainty included in the updated model; using the updated model 121e, the SMPC 110 determines 130e a control input to the system by optimizing the updated model of the system over a prediction horizon; and, finally, using the determined control input 111, the SMPC controls the system based on the control input to change a state of the system.

In various embodiments, the control model 140 of the system includes a function of dynamics of the system modeling the uncertainty of the parameter with first and second order moments of the estimated probability distribution of uncertainty of the parameter. For example, the first and second order moments of the estimated probability distribution of uncertainty of the parameter are included in the control model as a multiplier of the function of dynamics of the system, such that the update of the control model includes an update of the multiplier. In such a manner, the uncertainty of the parameter can be efficiently updated for specifics of the optimization over the prediction horizon. In some implementations, such an update can be efficiently introduced without even modifying an SMPC solver.

Figure 1F:
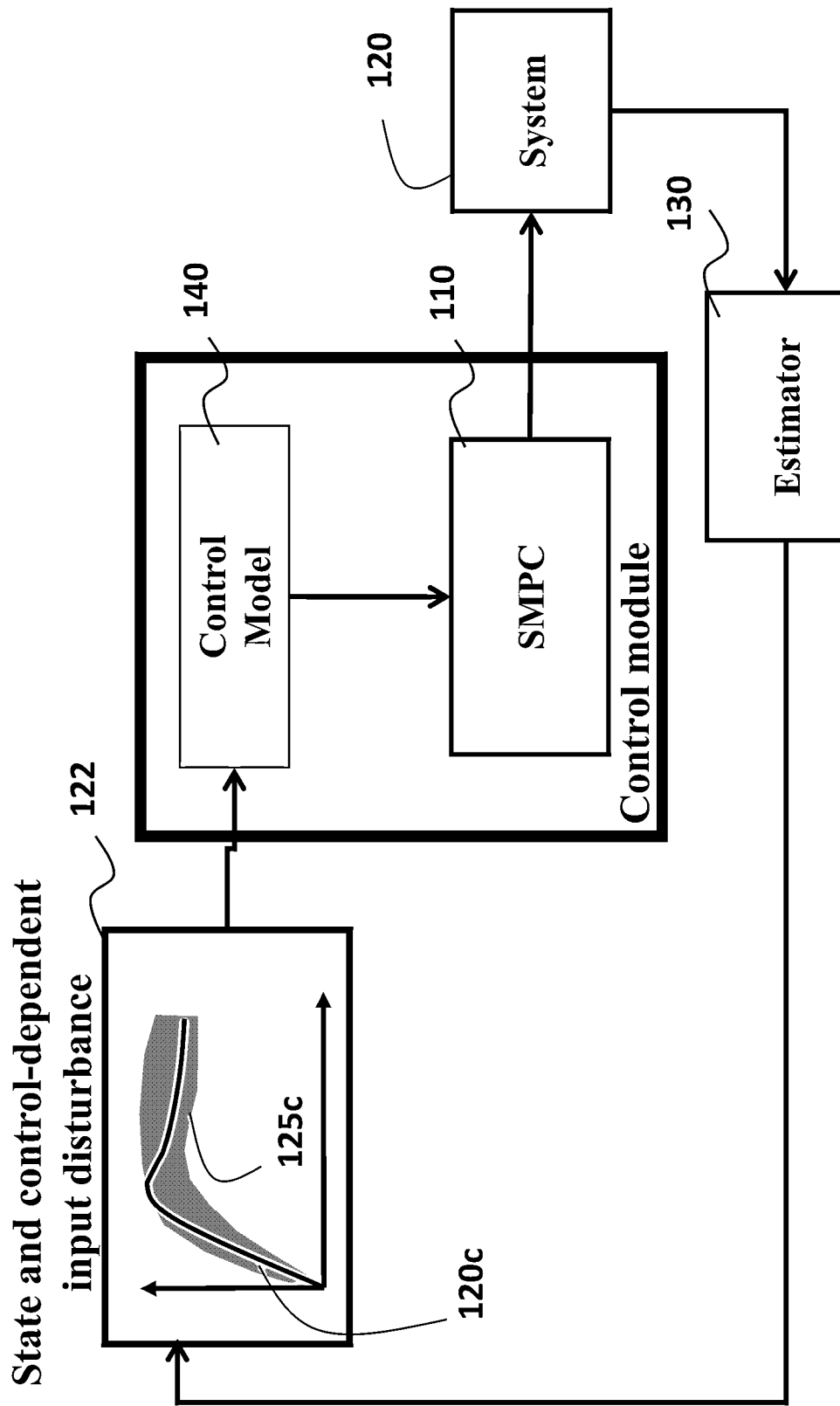
FIG. 1F shows an illustration of the need for the multiplier to the control model being state-independent.

FIG. 1F shows an illustration of the need for the multiplier to the control model being state-independent, i.e., for the uncertainty to be added to the control model as a multiplier, and thereby not having to alter the implementation of the SMPC. In FIG. 1F the uncertainty 122 outputted by the estimator 130 is a state and/or control-dependent. Hence, it cannot be inputted as a multiplier to the control model 140, because the uncertainty 122 expressed by the probability distribution 125c depends on the state. I.e., any optimization taking place in the SMPC 110 will affect the value of the uncertainty 122, necessitating including the uncertainty 122 into the SMPC solver. Furthermore, the state-dependent uncertainty is nonlinear and can thus not be extracted as a multiplier to at least a part of the control model.

Some embodiments are based on the realization that the state-dependent probability distribution can be partitioned on a state-dependent part and a state-independent part. The state-dependent part can be included in the original SMPC formulation, while the state-independent part is estimated online and added to the SMPC in a manner similar to the inclusion of state-independent probability distribution.

To that end, in some embodiment where the probability distribution of uncertainty of the parameter is dependent on the state of the system, the probability distribution of uncertainty of the parameter is partitioned into a state-dependent part expressed in the control model as a function of the state of the system and a state-independent part expressed independently from the state of the system. The state-dependent part is included inside the function of dynamics of the system, and the state-independent part is included outside of the function of dynamics of the system into the multiplier. For example, the state-dependent part is included inside the function 110d, while the state-independent part is included as at least part of the multiplier 120d.

In some implementations, the probability distribution of the state-dependent uncertainty can be regarded as a Gaussian process, i.e., a distribution over functions with a continuous domain, e.g. space, such that the sample of the Gaussian process is a continuous uncertainty function. Representing the distribution of uncertainty as a Gaussian process can increase the accuracy of the uncertainty estimation. However, estimating the uncertainty function according to principles of a Gaussian process is a computationally challenging task, especially in an online setting where computationally fast recursive implementations are necessary.

Some embodiments are based on the realization of a manner of simplifying the estimation of the Gaussian process to determine the uncertainty function and the associated probability distribution of the uncertainty. Specifically, in some embodiments, the uncertainty is regarded as a weighted combination of basis functions, and the Gaussian process of the uncertainty is captured by Gaussian distributions of weights of basis functions. In other words, to update the probability distribution of the uncertainty, some embodiments can just update these Gaussian distributions of weights. In effect, regarding the uncertainty function as a weighted combination of basis functions decreases the computational requirements for estimating the uncertainty in a probabilistic manner.

Figure 1G:
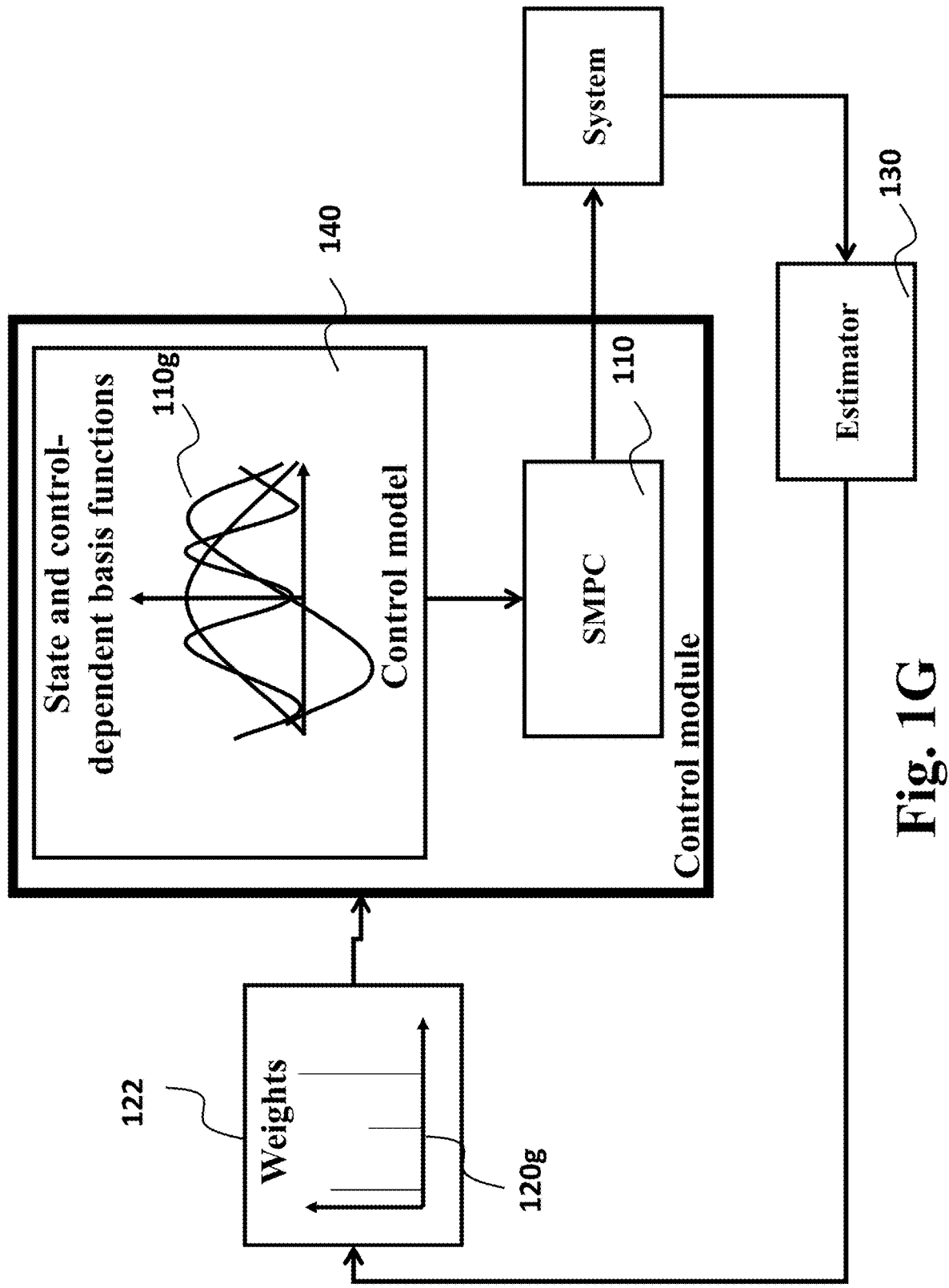
FIG. 1G shows an illustration of how to account for state-dependent uncertainties by the decomposition of uncertainty into a state-dependent part and a state-independent part.

FIG. 1G shows an illustration of how to account for state-dependent uncertainties by the decomposition of uncertainty into a state-dependent part and a state-independent part. The state-dependent part is captured by a set of basis functions 110g that is defined beforehand and are deterministic. The weights 120g of the basis functions capture the distribution of the uncertainty and because it is state-independent, it can be provided in the multiplier to the nonlinear function of dynamics, i.e., it can be added to the SMPC similar to a state-independent uncertainty.

To that end, in some embodiments, the probability distribution of uncertainty of the parameter is represented as a weighted combination of basis functions dependent on the state of the system, such that the state-dependent part of the probability distribution of uncertainty of the parameter includes a combination of basis functions capturing the dependency on the state of the system and the state-independent part of the probability distribution of uncertainty of the parameter includes the weights of the combination of basis functions independent from the state of the system and derived from the first and the second order moments of the estimated probability distribution of uncertainty of the parameter.

For example, in one implementation, the probability distribution of uncertainty of the parameter can model the weights of the combination of basis functions as a Gaussian distribution with unknown mean and covariance estimated by the SMPC during the control of the system as the first and the second order moments.

Some embodiments determine the probability distribution of the uncertainty to increase the probability of determining a current state that reconciles the differences between the motion model and measurement models in state estimation of the system. When determining the probability distribution of the uncertainty, since the uncertainty cannot be measured directly but can only be observed indirectly through the system state, the uncertainty is dependent on the system state through the motion model of the system that relates the system state to the uncertainty. The measurements may or may not include the uncertainty directly but are indicative of the system states with noise. Hence, the state determined using the motion model and the state determined using the measurement model can be compared because the state determined using the motion model including the uncertainty is indicative of the quality of the probability distribution of the uncertainty when compared to the measurements. Due to the presence of noise, it is more reliable to compare trajectories of the states, rather than individual states.

However, in a real-time operation, sensor measurements are collected recursively for each time step of control. Hence, comparing trajectories of states can be done by comparing individual states, wherein comparing the individual states includes a component that weighs in previous comparisons of individual states. Such a comparison reduces uncertainties of the comparison indicative of the uncertainty, since the comparison is not done sample by sample, but over a longer time span including multiple states for consecutive time steps of control.

FIG. 1H shows a schematic of a method of using states of a system to update the probability distribution of the uncertainty according to some embodiments. The embodiments determine a state of the system that for each time step of control fits the measurement 120h according to the measurement model 130h and the control input 110h according to the motion model 111h including the sample of the uncertainty. In other words, the embodiments compare 140h states of the system determined according to both models to update the probability distribution of the uncertainty to reduce the error of the difference in the estimations. For example, by comparing a state determined using a motion model including a sampled uncertainty, with a state determined using a measurement model, it is possible to update the probability distribution of the uncertainty to improve the sample of the uncertainty to fit both the control inputs 110h and the measurements 120h. In some implementations, such a comparison is performed probabilistically to consider noise and model errors acting on one or a combination of the motion model and the measurement model.

Figure 1I:
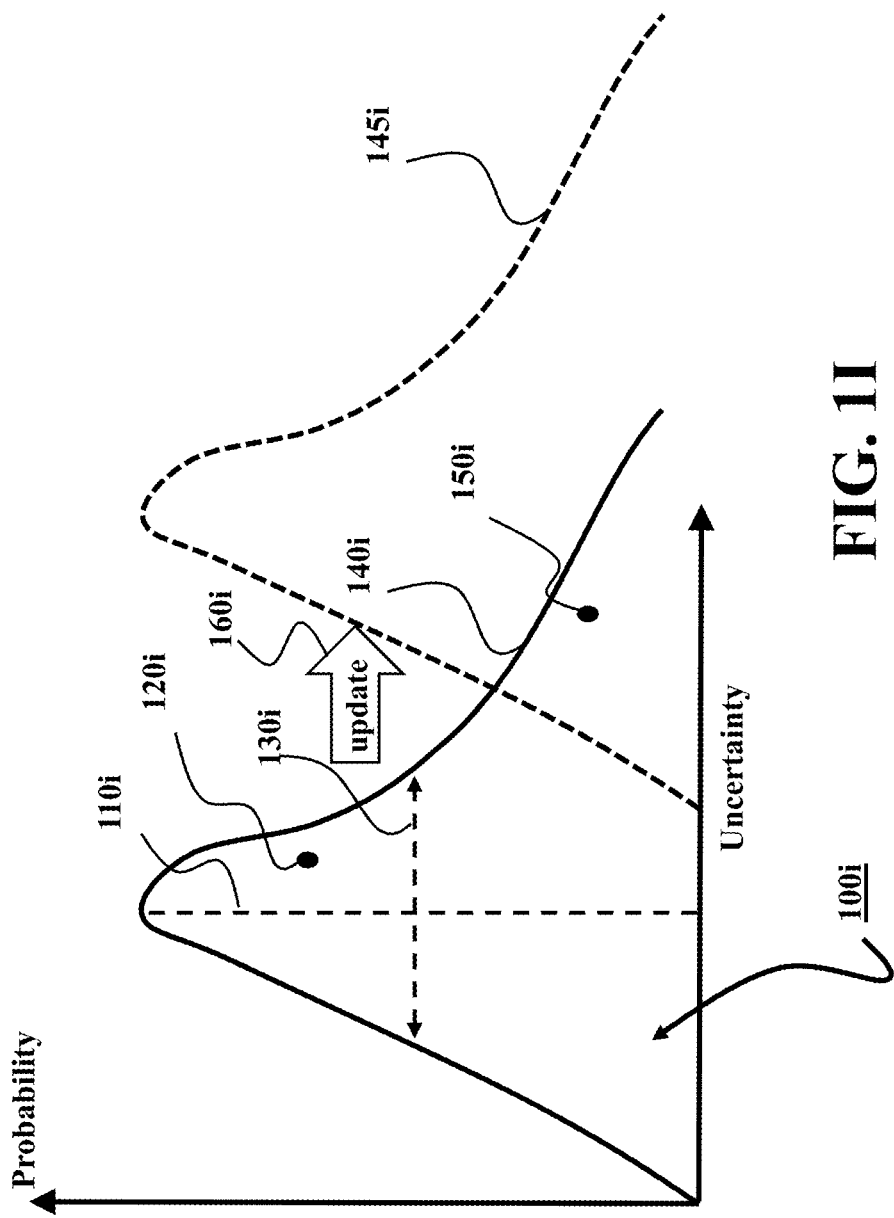
FIG. 1I shows a graph illustrating the probability distribution function defining the feasible space of uncertainty according to one embodiment.

FIG. 1I shows a graph illustrating probability distribution function 140i defining the feasible space 100i of uncertainty according to one embodiment. The shape of the probability distribution 140i is updated in every iteration of the method 140e. For example, if the distribution of the uncertainty is Gaussian for each value, the shape of the distribution 140i is the "Gaussian hat" shape for each value, and the uncertainty is a Gaussian distributed function, i.e., a Gaussian process. As used herein, sampling the values of the uncertainty is drawing the values with probabilities defined by the distribution 140i. For example, according to the distribution 140i, the probability of a sample 120i to be drawn or sampled is higher than the probability of the sample 150i. Such a representation allows iteratively updating 160i the probability distribution of uncertainty to produce an updated distribution 145i defining updated feasible space for sampling the uncertainty in the next step.

In some embodiments, the update of the probability distribution of uncertainty is done using a Kalman filter-type method. In other embodiments, the estimating the probability distribution of the uncertainty is done using a particle filter. Other embodiments use other nonlinear estimators.

Figure 2A:
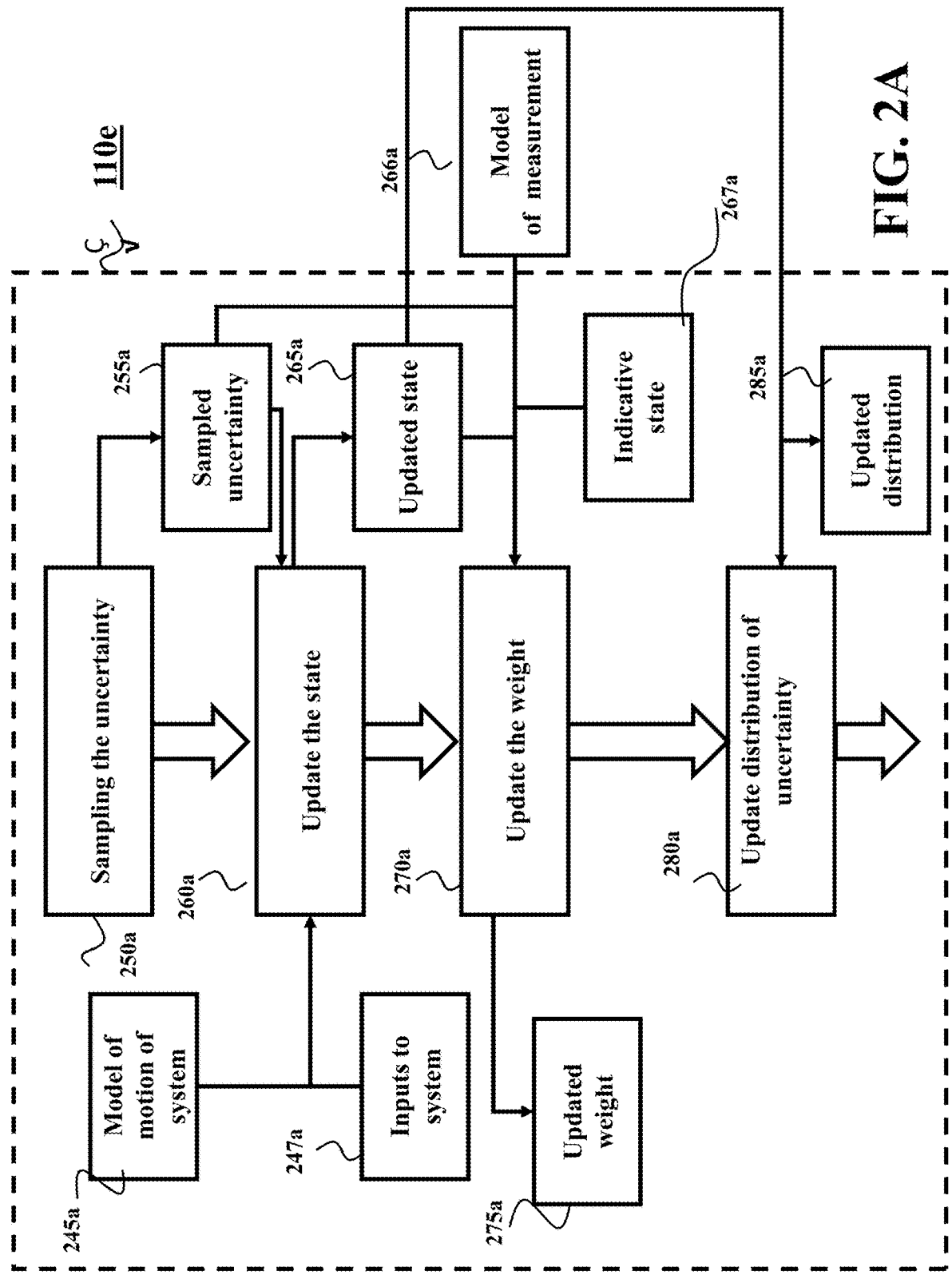
FIG. 2A shows a block diagram of a method for estimating the uncertainty according to some embodiments.

FIG. 2A shows a block diagram of a method for estimating 110e the uncertainty according to some embodiments, wherein estimating the probability distribution of the uncertainty is done using a particle filter. This embodiment updates at least one of the particles in the particle filter in response to the measurement to fit the particles to the measurements. The method commences with sampling 250a the uncertainty from the probability distribution of uncertainty in the particle, to produce a sampled 255a uncertainty. For instance, in one implementation the sample is the mean of the distribution determined during a previous iteration. Then, using the sampled uncertainty, the model 245a of motion of the system, the control input 247a to the system, the method updates 260a the state to produce an updated state 265a. Using the updated state 265a, the model 266a of measurement, and the measurement, i.e., indicative state, 267a at the current time step of control, the method updates 270a the weight of the particle to reduce an error between the state and indicative state. Next, the method updates 280a the probability distribution of uncertainty 285a.

In some embodiments, the motion model of the system is a nonlinear function of the system state on the form $x_{k+1}=f(x_k, u_k)+g(x_k, u_k)w(x_k, u_k)$, where $x_k$ is the state, $u_k$ is the control input, $f(x_k, u_k)+g(x_k, u_k)$ is the deterministic, known part of the motion model, and $w(x_k, u_k)$ is the uncertainty that is, in the general case, dependent on the state $x_k$ and control input $u_k$.

One embodiment generates a sample of uncertainty of each particle for the control input and the measurement, wherein each sample of the uncertainty corresponds to a particle having its own belief of the uncertainty and previous state. At each time step of control corresponding to the time steps of the control inputs and measurements, one embodiment samples from the uncertainty one or a multiple of. That is, multiple samples are drawn of the uncertainty. Hence, each control input leads to a slightly different trajectory, i.e., a slightly different state. Thus, the difference to the indicative state determined from the measurement will be different according to the different sampled uncertainty. Each sample of the uncertainty forms a particle used to evaluate probabilistically the fitting between the control input and the measurement.

Figure 2B:
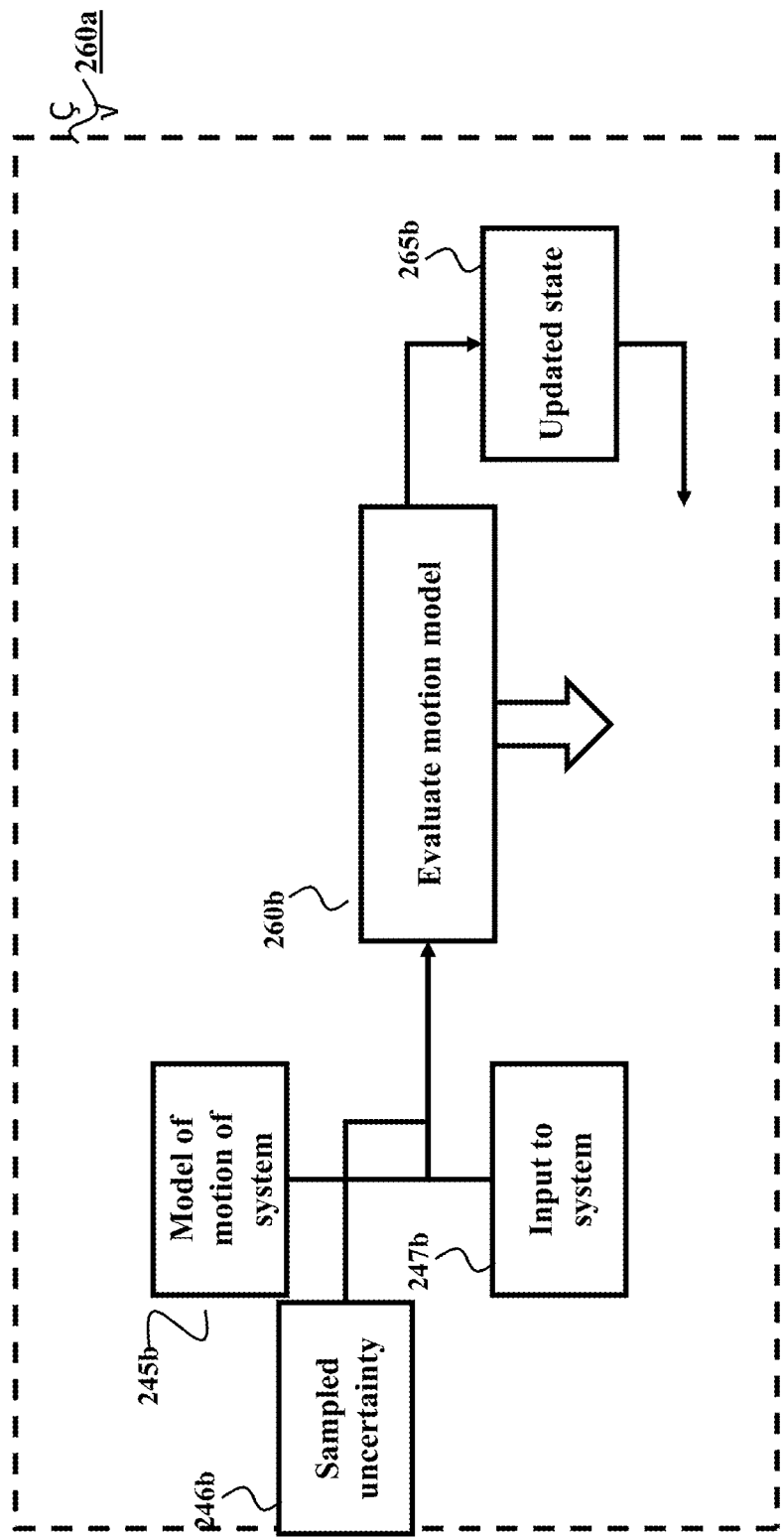
FIG. 2B shows a block diagram of a method for updating the state of the particle according to some embodiments.

FIG. 2B shows a block diagram of a method for updating 260a the state of the particle according to some embodiments. The method updates 260a the state probabilistically. The method inserts the sampled uncertainty 246b, and control input 247b into the model of the motion of the system 245b, and evaluate 260b the motion model at the system of the previous state, to produce an updated state 265b of the system. In some embodiments, the model of motion of the system is a control model 140, whereas in other embodiments the model of the motion of the system is a model that is simplified compared to the control model. The determining of the particles is done for each step of the control and measurement, thus forming a trajectory of particles representing a state trajectory of the system. A particle includes a probability distribution of uncertainty, a state of the system, and a weight indicating the quality of the system.

Updating the state of the particle can be done in several ways. When used in a particle filter, the updated state can either use sampling from the distribution of uncertainty that incorporates the information of the measurement, or it can be updated solely based on the information about the uncertainty without incorporating the measurement since the information in such a scenario implicitly determines the update of the probability distribution of the uncertainty for each particle.

Figure 2C:
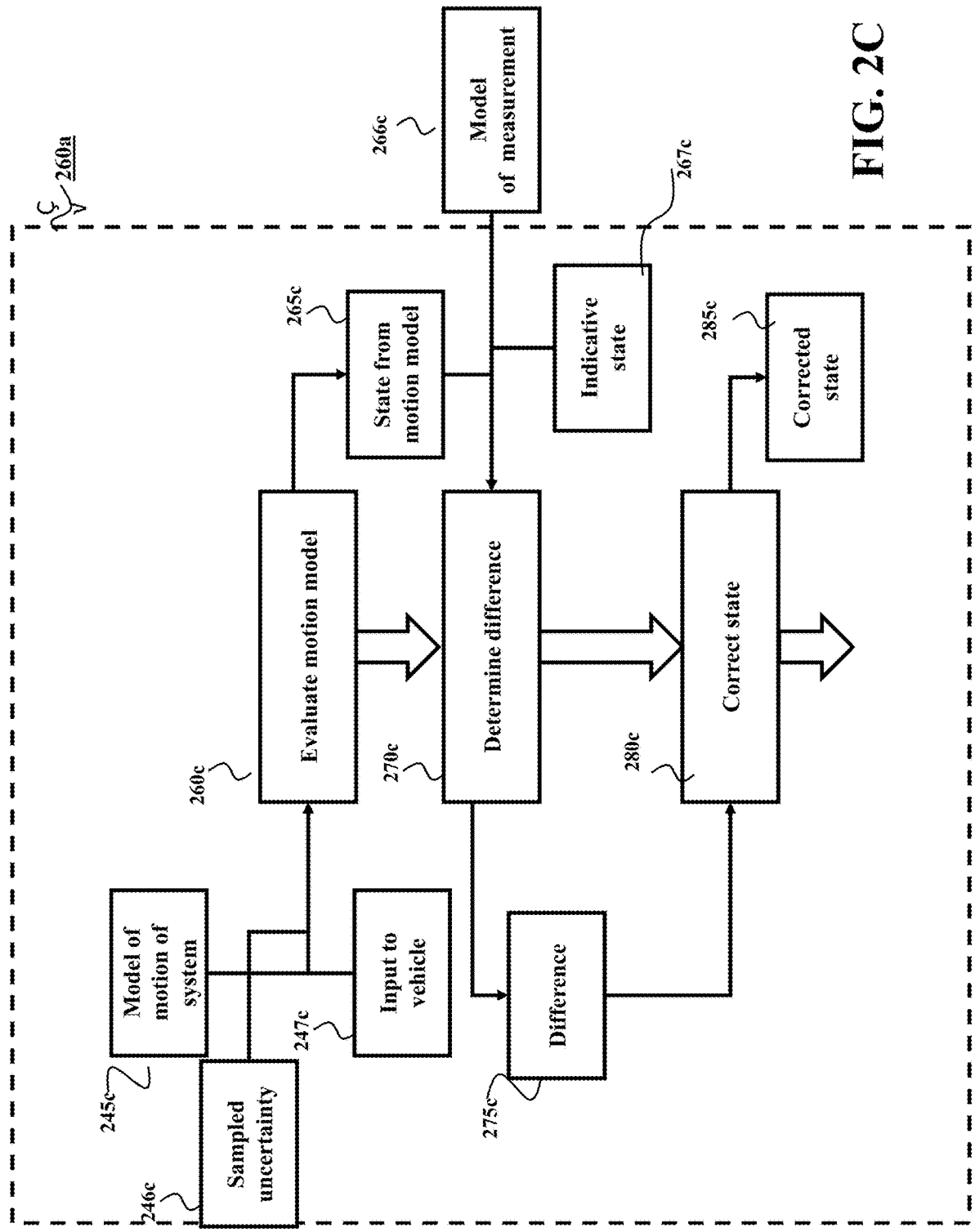
FIG. 2C shows a block diagram of another method for updating the state of the particle according to some embodiments.

FIG. 2C shows a block diagram of another method for updating 260a the state of the particle according to some embodiments, wherein the measurements are explicitly incorporated in the update of the state in each particle. The method updates 260a the state probabilistically. The method inserts the sampled uncertainty 246c, and control input 247c into the model of the motion of the system 245c, and evaluates 260c the motion model at the value of the previous state, to produce an updated state 265c from the motion model of the system. Next, the method inserts the state 265c resulting from the motion model into the measurement model 266c and determines 270c a difference of the estimated state with the measurement indicative of the state 267c. Finally, the method corrects 280c the state 265c based on a difference 275c between the measurement and measurement model with the state from the motion model inserted into the model, to produce an updated state 285c.

Figure 2D:
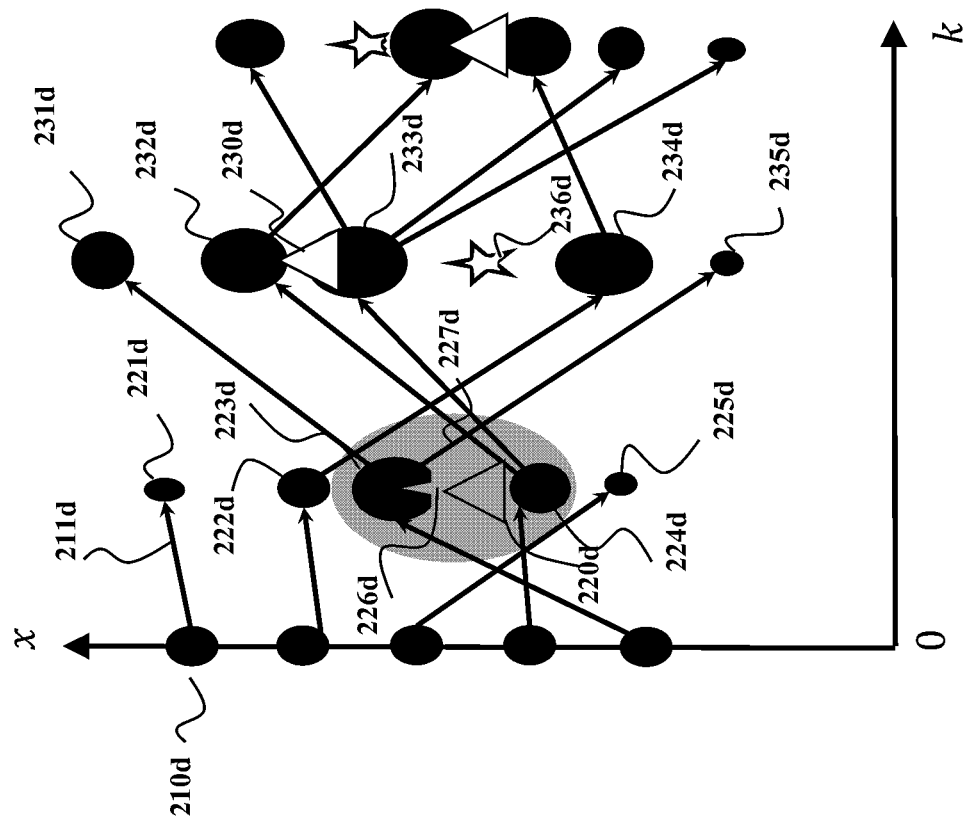
FIG. 2D shows a simplified schematic of the result of three iterations of generating updated states in particles.

FIG. 2D shows a simplified schematic of the result of three iterations of generating updated states in particles when five particles are generated for each iteration according to one embodiment. The initial state 210d is predicted forward in time 211d using the model of the motion, the input to the system, and the uncertainty sampled on the probability distribution of possible uncertainties for that particle, to produce five next states 221d, 222d, 223d, 224d, and 225d. The probabilities are determined as a function of the measurement 226d and the bias 227d of the measurement 226d. At each time step of control, an aggregate of the probabilities is used to produce an aggregated state 220d and an aggregate of the parameter estimation, e.g., the aggregated tire friction function. For instance, in one embodiment the aggregated tire-friction function is a weighted combination of tire-friction functions in each particle. In another embodiment, the aggregated tire-friction function is the function of the particle having the highest probability.

Figure 2E:
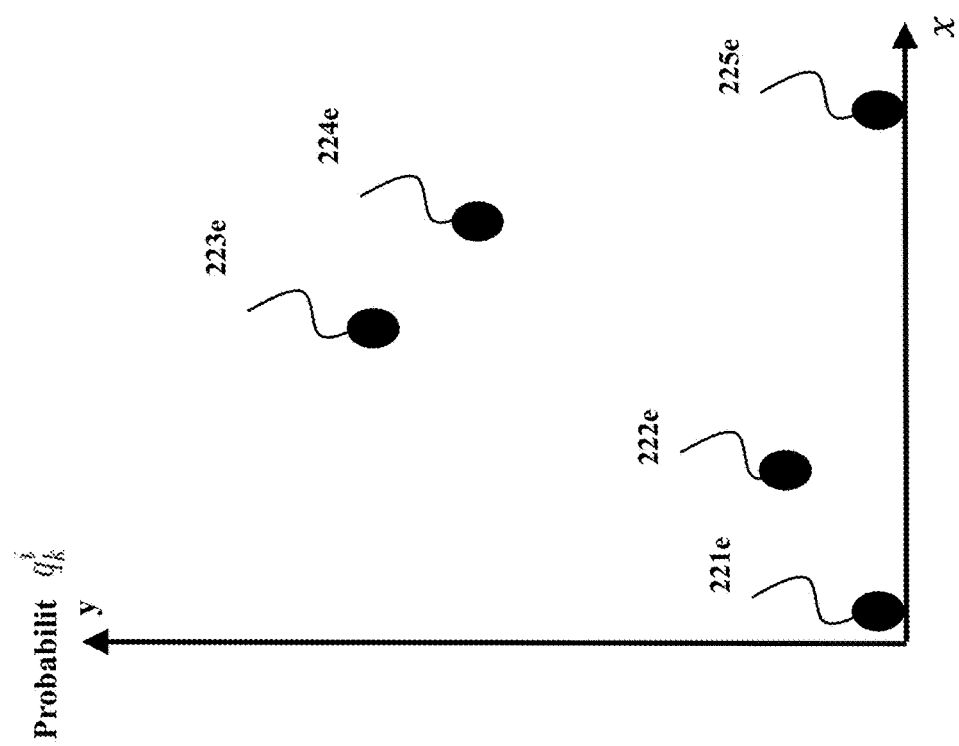
FIG. 2E shows possible assigned probabilities of the five states at the first iteration in FIG. 2D.

FIG. 2E shows possible assigned probabilities of the five states at the first iteration in FIG. 2D. Those probabilities 221e, 222e, 223e, 224e, and 225e are reflected in selecting the sizes of the dots illustrating the states 221e, 222e, 223e, 224e, and 225e.

Using the motion model and the measurement model, the particle filter determines the probability distribution of state recursively as a weighted combination of states of each particle at each time step of control k, $$p(x_{0:k} | y_{0:k}) \approx \sum_{i=1}^{N} q_k^i \delta(x_{0:k}^i - x_{0:k}),$$

wherein $\delta(\cdot)$ is the Dirac delta mass and $q_k^i$ is the weight. Using the motion model including uncertainty, one embodiment propagates the state forward in time, and determines the weight according to $q_k^i \propto q_{k-1}^i p(y_k|x_k^i)$, wherein $p(y_k|x_k^i)$ is the measurement model written as a probability distribution, the likelihood. Upon multiple such propagations, the embodiment forms a state trajectory.

In some embodiments, the set of states generated from the particle states including weights of each state, wherein the weights reflect an error between the state and the indicative state, is used to updating the probability distribution of uncertainty for each particle by decreasing the error between the state and the motion resulting in the state when used in the motion model. Such an error reflects the error due to the error in uncertainty and can be used to update the probability distribution of uncertainty since a probability distribution of uncertainty can be determined as a weighted combination of the probability distribution of uncertainty for each particle. This is possible because the indicative state is already used in determining the state and is influencing the weight of each state.

Figure 2F:
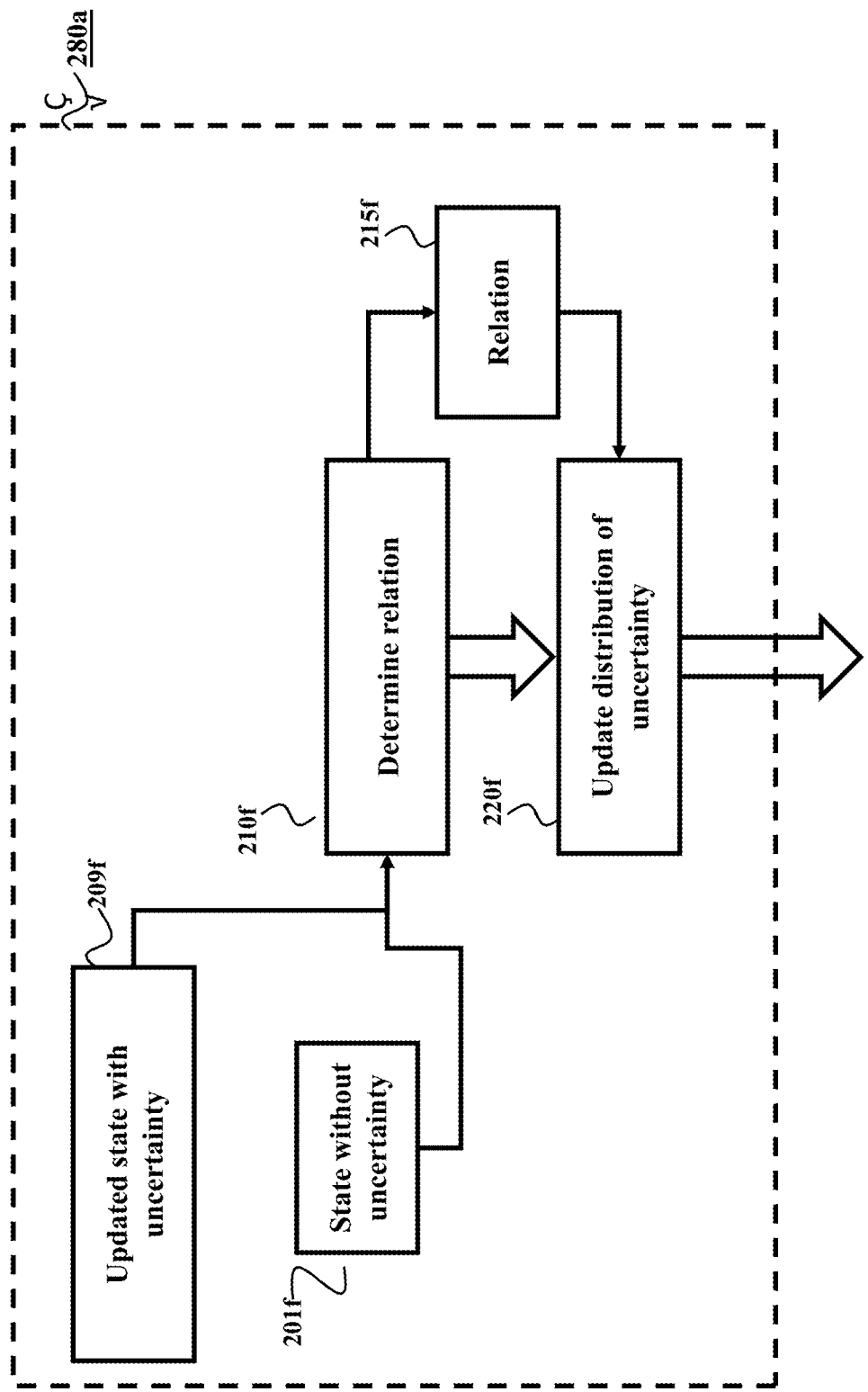
FIG. 2F shows a block diagram of a method for updating a probability distribution of uncertainty in each particle according to one embodiment.

FIG. 2F shows a block diagram of a method for updating a probability distribution of uncertainty in each particle according to one embodiment. The method determines 210f a relation between the updated state 209f with the motion model having uncertainty and the state 201f using the motion model without uncertainty, and updates 220f the probability distribution of uncertainty based on the said relation 215f, to reduce an error between the updated state of the system and the measurement of the state.

In some embodiments, the relation between the updated state 209f with the motion model having uncertainty and the state 201f using the motion model without uncertainty is a division between the state having an uncertainty and the state not having the uncertainty. In other embodiments, the relation between the updated state 209f with the motion model having uncertainty and the updated state 201f using the motion model without uncertainty is a difference.

In some embodiments, the probability distribution of uncertainty is a Gaussian process, i.e., a distribution over functions with a continuous domain, e.g. space, such that the sample of the Gaussian process is a continuous uncertainty. Representing the probability distribution of uncertainty as a Gaussian process increases the accuracy of uncertainty estimation. However, estimating the uncertainty according to principles of a Gaussian process is a computationally challenging task.

Some embodiments are based on the realization of a manner of simplifying the estimation of the Gaussian process to determine the uncertainty. Specifically, in some embodiments, an uncertainty is regarded as a weighted combination of a finite number of basis functions, wherein each basis function is a function of the state and/or control input, which is a known function of the state, and Gaussian process of the uncertainty is captured by Gaussian distributions of weights of basis function. In other words, to update the Gaussian process some embodiments can just update these Gaussian distributions of weights, and to sample uncertainty some embodiments can just sample N scalar weights from Gaussian distribution. In effect, regarding the uncertainty as a weighted combination of basis functions significantly decreases the computational requirements for estimating the uncertainty in a probabilistic manner.

FIG. 3A shows an illustration of the use of weighted basis functions according to one embodiment. In the illustration, there are three basis functions 310, 320a, and 330a. Also shown is uncertainty 340a. By combining the basis functions and using different weights for each basis function, they can be combined to reproduce the uncertainty.

Figure 3B:
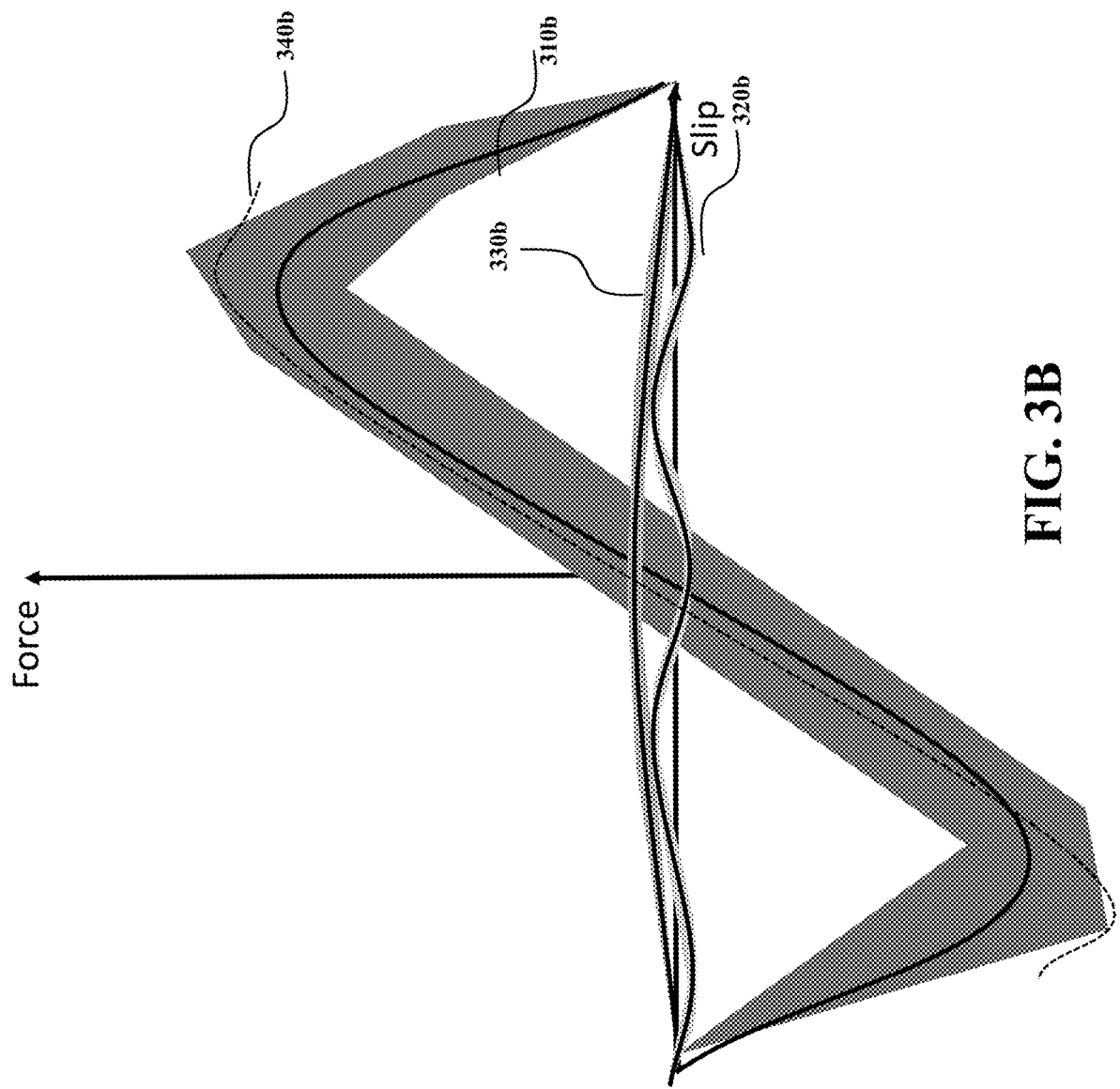
FIG. 3B shows an illustration of the influence of the weights of the basis functions.

FIG. 3B shows an illustration of the influence of the weights of the basis functions for a subset of the uncertainty 340b, in accordance with some embodiments. By letting the weights of basis functions 320b and 330b be very small, and the weight of 310b be large, the basis function expansion can reproduce the uncertainty 340b with only one basis function. Although FIG. 3B is a simplified schematic, it illustrates the principles of basis functions and the computational efficiency it can have.

In other embodiments, the uncertainty is a Gaussian process modeled as a weighted combination of a set of basis functions wherein each weight of each basis function has a Gaussian probability distribution, and wherein to update the probability distribution of the uncertainty the processor is configured to update the Gaussian probability distribution of at least some weights of the weighted combination of the set of basis functions. For instance, one embodiment models the uncertainty as $f(x) \sim \mathcal{GP}(0, \kappa(x, x'))$, wherein the covariance function $\kappa(x, x')$ of the Gaussian process is formulated in terms of Laplace operators, $$\kappa(x, x') \approx \sum_{j_1, \ldots, j_d} S(\lambda^{j_1, \ldots, j_d}) \phi^{j_1, \ldots, j_d}(x) \phi^{j_1, \ldots, j_d}(x').$$

With basis functions $$\phi^{j_1, \ldots, j_d}(x) = \prod_{n=1}^{d} \frac{1}{\sqrt{L_n}} \sin\left(\frac{\pi j_n (x_n + L_n)}{2 L_n}\right),$$

the uncertainty is $$f(x) \approx \sum_j \gamma^j \phi^j(x),$$

where the weights are Gaussian distributed, $\gamma^j \sim \mathcal{N}(0, S(\lambda^j))$ One embodiment recognizes that using weighted basis functions can be used to model the motion of the system as $$x_{k+1} = \underbrace{\begin{bmatrix} \gamma_{11} & \cdots & \gamma_{1m} \\ \vdots & & \vdots \\ \gamma_{n_x 1} & \cdots & \gamma_{n_x m} \end{bmatrix}}_{A} \underbrace{\begin{bmatrix} \phi_1(x_k) \\ \vdots \\ \phi_M(x_k) \end{bmatrix}}_{\varphi(x_k)} + v_k,$$

Wherein A is the matrix of weights and $\varphi(x_k)$ is the vector of basis functions as a function of the state. The left-hand side can be obtained as a combination of the deterministic part of the motion model and the system state in the future time step.

Figure 3C:
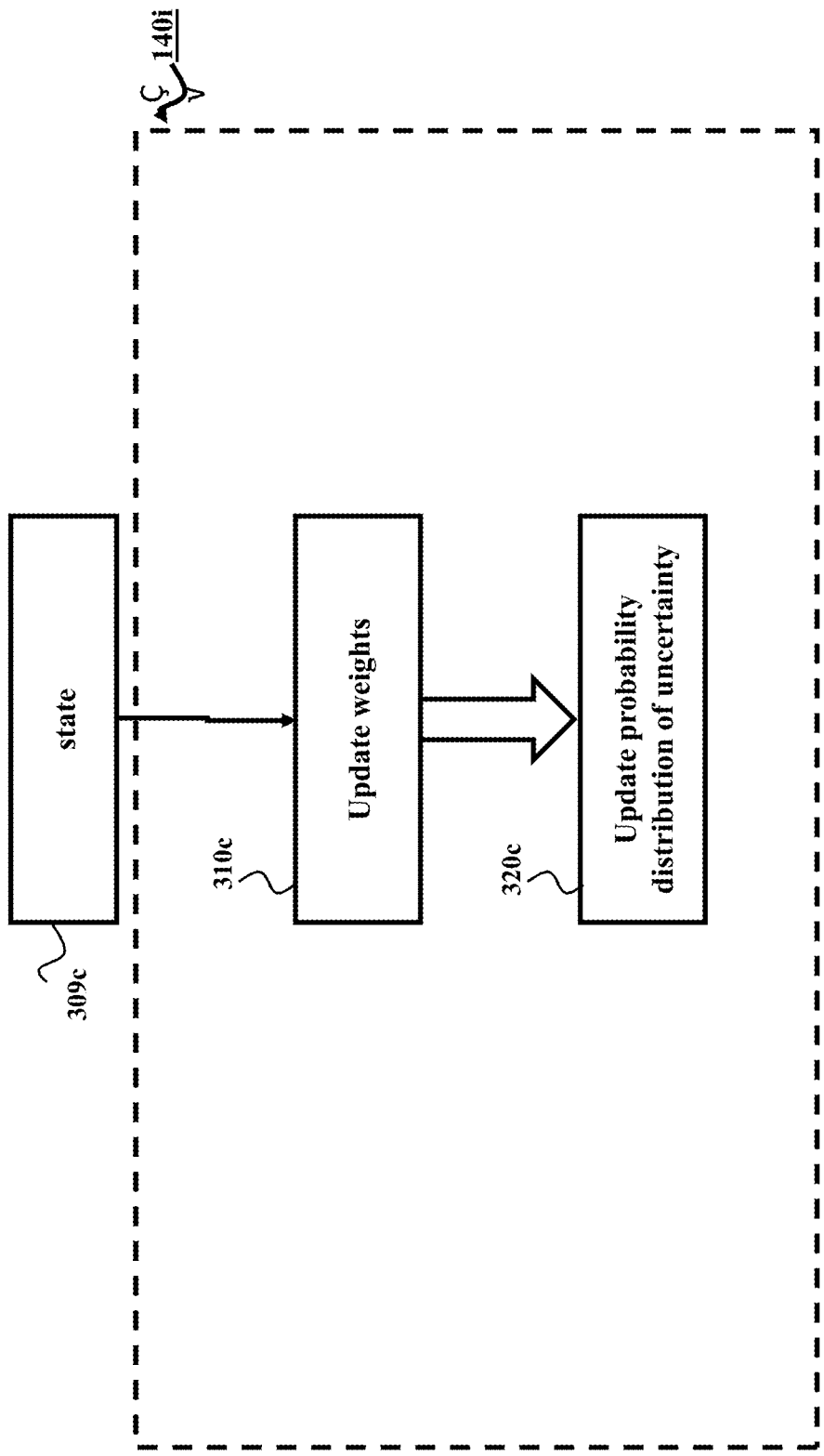
FIG. 3C shows a block diagram of one iteration of a method for updating the probability distribution of uncertainty in each particle according to one embodiment.

FIG. 3C shows a block diagram of one iteration of a method for updating 280a the probability distribution of uncertainty in each particle according to one embodiment. The method updates 310c the weights of the weighted combination of basis functions using the updated state 310c in the particle and updates the probability distribution 320c of the uncertainty according to the weighted combination of the basis functions weighted with the updated weights.

Figure 3D:
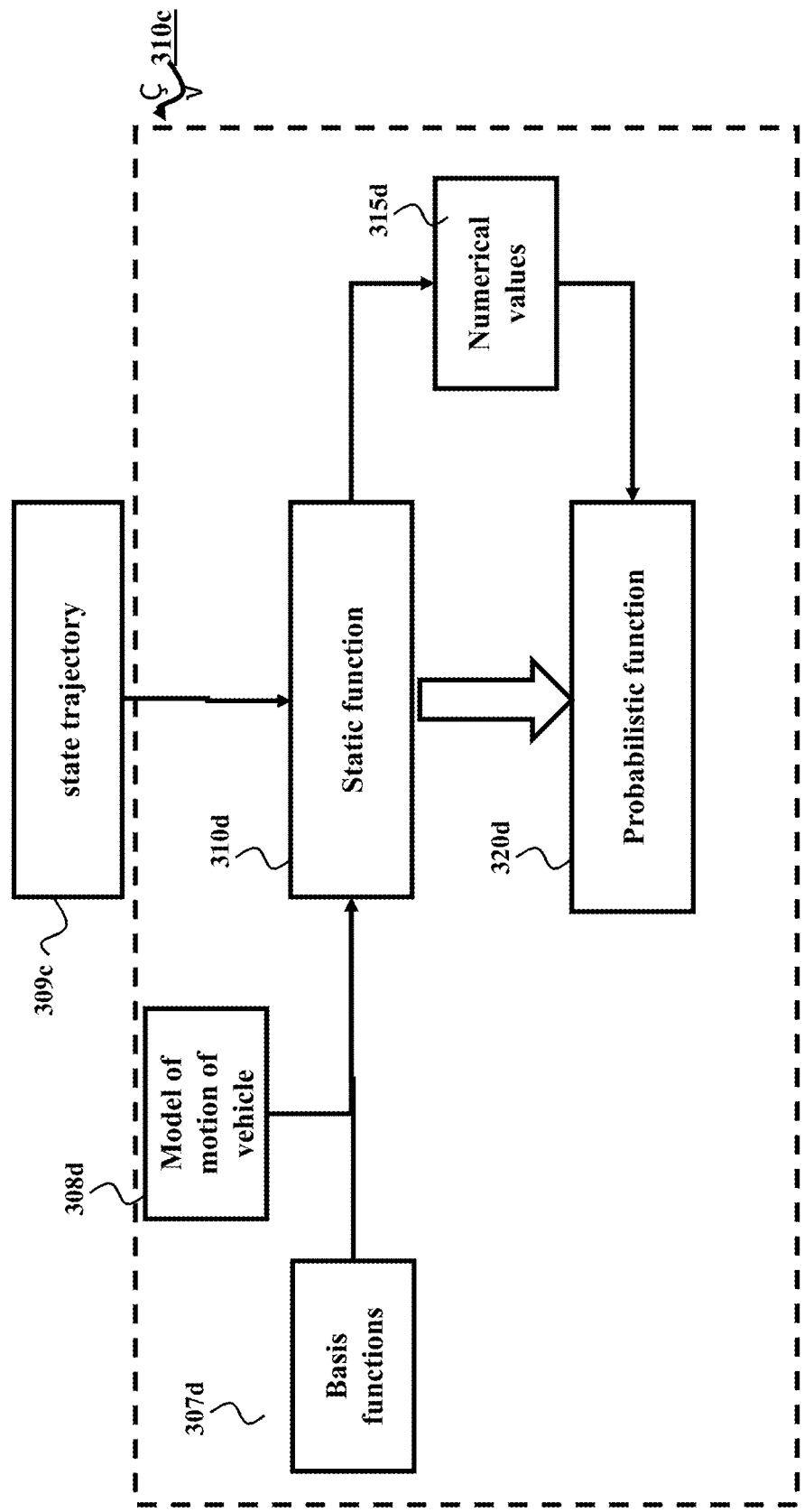
FIG. 3D shows a block diagram of a method for updating the weights of the weighted combination of basis functions in each particle according to one embodiment.

FIG. 3D shows a block diagram of a method for updating the weights of the weighted combination of basis functions in each particle according to one embodiment. The method uses a static function 310d stored in memory having as input the state 309c, the model of the motion of system 308d, and basis functions 307d, that maps the input to a set of numerical values 315 stored in matrices. Then, the method uses the determined numerical values 315d and a probabilistic function 320d mapping the numerical values 315d to a distribution of the weights. The updated weights can be sampled on that distribution of the weights or the distribution of the weights can be used directly in subsequent calculations.

In one embodiment, the probabilistic function is a matrix-Normal distribution parametrized by the numerical values 315d, that is, $A \sim \mathcal{MN}(0, Q, V)$ In another embodiment, the process noise is parametrized as an inverse-Wishart distribution, $Q \sim \mathcal{IW}(\ell_Q, \Lambda_Q)$.

In one embodiment the updating is used for each particle, i.e., each particle determines its probability distribution of uncertainty. The probability distribution of uncertainty can then be determined as a weighted combination of each particle's probability distribution of uncertainty. Doing in such a manner ensures that even though the uncertainty is modeled as a Gaussian process, using several particles can suppress situations where the Gaussian process assumption is unrealistic.

Figure 4A:
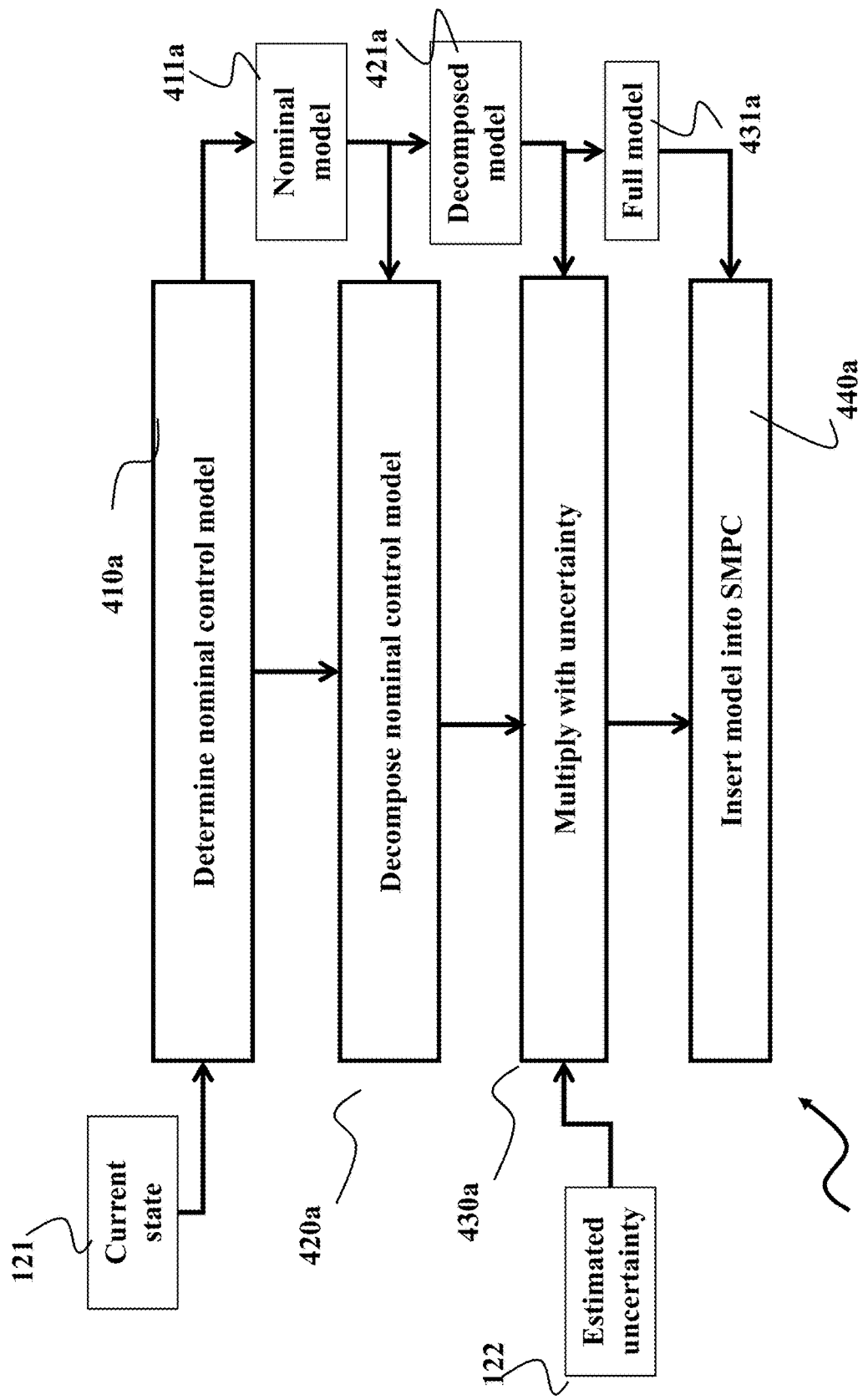
FIG. 4A shows a block diagram of a method for updating the model of the system according to one embodiment.

FIG. 4A shows a block diagram of a method for updating 120e the model of the system according to one embodiment. Using the current estimated state 121, the method determines 410a a nominal control model 411a, by inserting the current state 121 into the model without the uncertainty. Then, the method decomposes 420a the nominal model 411a into an uncertainty-independent part and an uncertainty-dependent part, to produce a decomposed model 421a. Using the decomposed model 421a and the estimated uncertainty 122, the method multiplies 430a the uncertainty with the nonlinear function of the dynamics that is uncertainty-dependent, to produce the control model 43a that is inserted 440a into the SMPC.

Figure 4B:
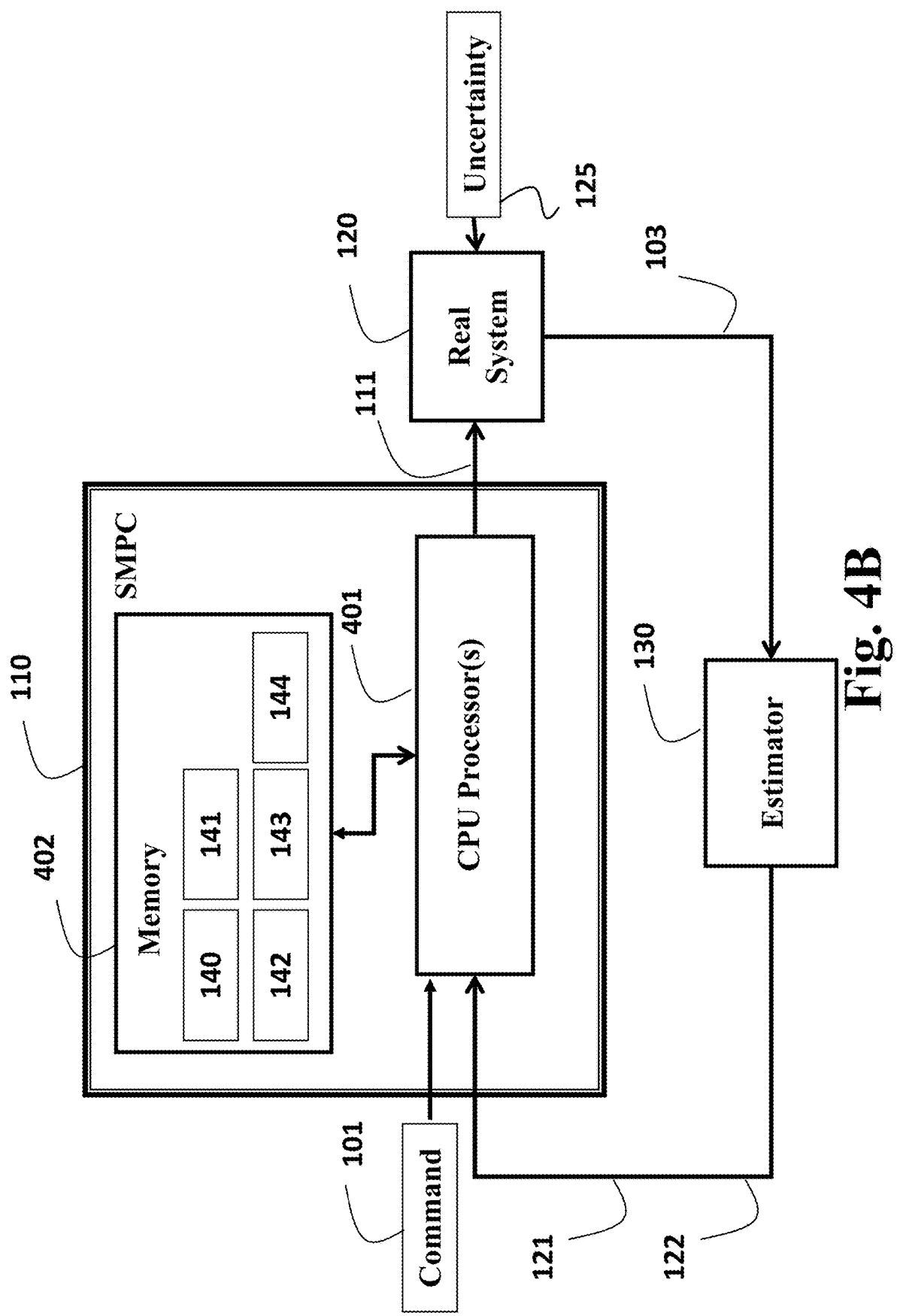
FIG. 4B shows a block diagram of an SMPC according to some embodiments.

FIG. 4B shows a block diagram of an SMPC 110 according to some embodiments, which actuates the system such that the estimated state 121 of the system and output 103 follow a command 101, given the estimated uncertainty 122. The SMPC 110 includes a computer, e.g., in the form of a single central processing unit (CPU) or multiple CPU processors 401 connected to memory 402 for storing the control model 140, the uncertainty model 141, the constraints 142, and probabilistic chance constraints 143 on the operation of the real system 120 with uncertainty 125, the estimation model 144.

Figure 4C:
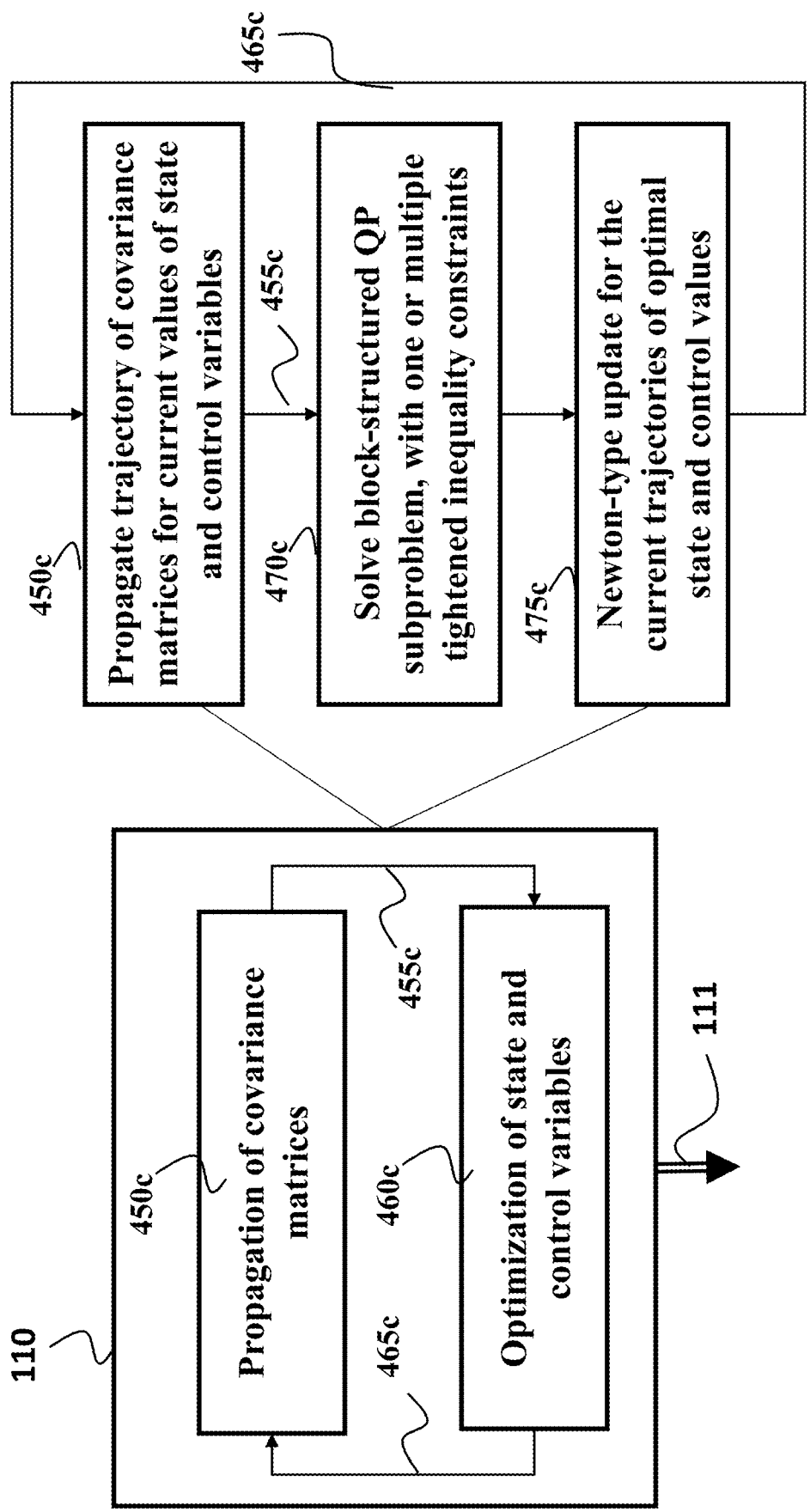
FIG. 4C shows a block diagram of an exemplar implementation of a two-level optimization procedure.

FIG. 4C shows a block diagram of an exemplar implementation of a two-level optimization procedure to solve the inequality constrained nonlinear dynamic optimization problem at each control step of the SMPC 110, including probabilistic chance constraints representing the uncertainty to produce a control command. The two-level optimization procedure alternates propagation of covariance matrices 450c extracted from the probability distribution of the uncertainty of the probabilistic chance constraints within the prediction horizon for fixed values of the state and control variables 465c with optimization of the state and control variables 460c within the prediction horizon for fixed values of the state covariance matrices 455c. The control signal 111 is computed, once a termination condition is met for the two-level optimization procedure.

In some embodiments of the invention, the two-level optimization procedure 110 consists of three main computational steps. The first step prepares the linear-quadratic objective function, computes the Jacobian matrices to prepare the linearized equality and inequality constraints and it propagates a trajectory of covariance matrices 450c, which represent the uncertainty for the predicted state values over the control horizon, by evaluating the nonlinear covariance propagation equations for a current trajectory of state and control values 465c. The second step consists of the solution of the resulting block-structured QP subproblem, with one or multiple tightened inequality constraints to approximate each of the chance constraints 470c. The third and final step includes the Newton-type update for the current trajectories of optimal state and control values 475c.

In some embodiments, adjoint gradient computations are used to correct inexact Jacobian information in the SMPC and the resulting two-level optimization procedure consists of three main computational steps. The first step prepares the linear-quadratic objective function, computes the Jacobian matrices with respect to state and control variables to prepare the linearized equality and inequality constraints, computes the adjoint-based gradient evaluation, and numerically eliminates the covariance matrices from each of the objective and constraint functions by propagating a trajectory of covariance matrices 450c for a current trajectory of predicted state and control values 465c. The second step consists of the solution of the resulting block-structured QP subproblem, with one or multiple tightened inequality constraints to approximate each of the chance constraints 470c. The third and final step includes the Newton-type update for the trajectories of optimal state and control values 475c, as well as an expansion of the corresponding update of Lagrange multipliers.

Figure 5A:
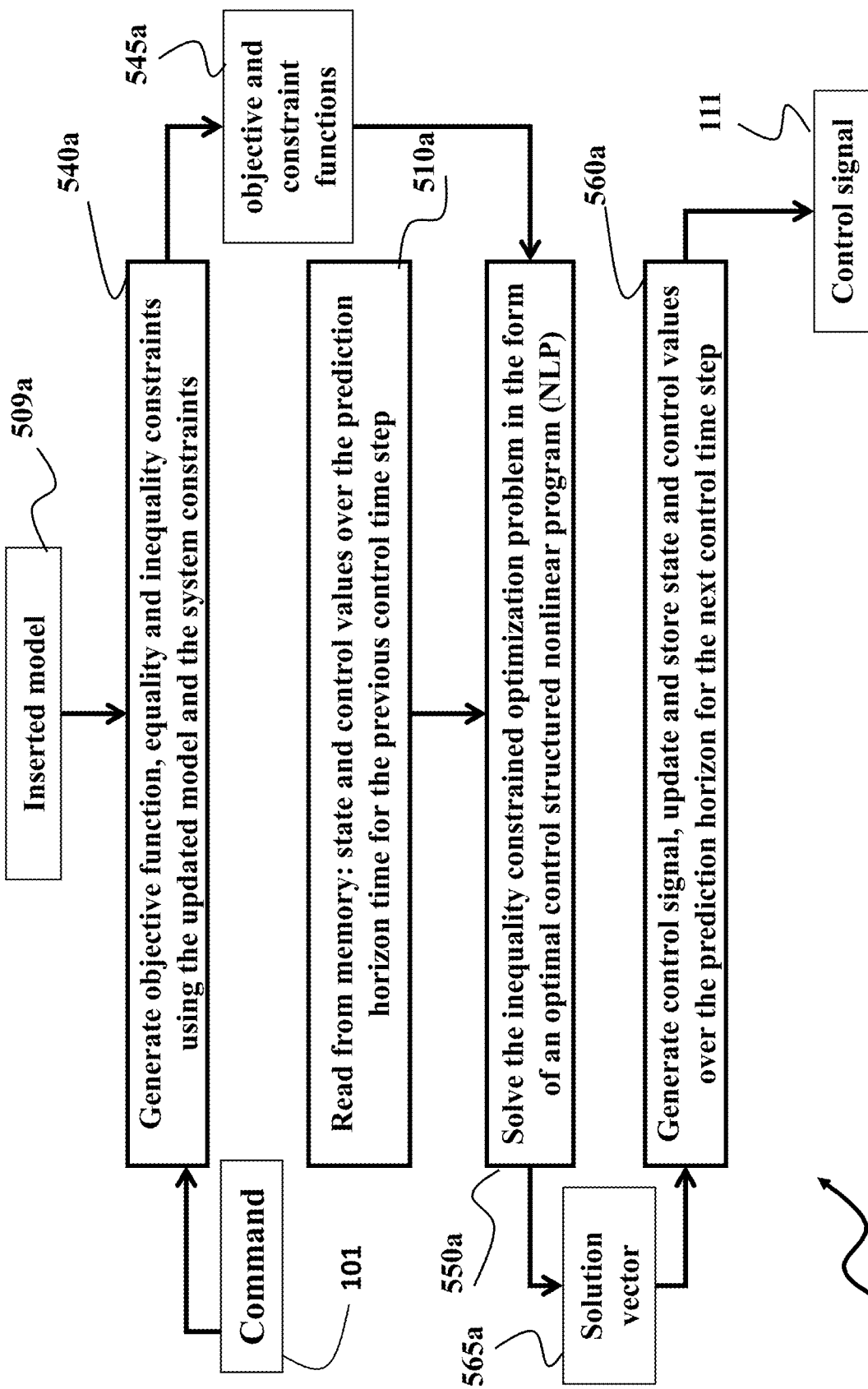
FIG. 5A shows a block diagram of a system and a method to implement the SMPC.

FIG. 5A shows a block diagram of a system and a method to implement the SMPC 110 that determines 130e the control signal 111, given the inserted model 509a and the control command 101 according to some embodiments of the invention. Specifically, SMPC computes a control solution, e.g., a solution vector 565a that includes a sequence of future optimal or approximately optimal control inputs over a prediction time horizon of the system 560a, by solving a constrained optimization problem 550a at each control time step. The data 545a of the objective function, equality, and inequality constraints in this optimization problem 550a depend on the control model and system constraints 540a, determined from the current state estimate of the system 121, the estimated uncertainty 122, and the control command 101.

Embodiments of the invention use a direct optimal control method to formulate the continuous-time SMPC problem as an inequality constrained nonlinear dynamic optimization problem. Some embodiments of the invention use a derivative-based optimization algorithm to solve the inequality constrained optimization problem 550a either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments of the invention are based on the realization that the inequality constrained optimization problem 550a has the form of an optimal control structured optimization problem (OCP), such that a structure exploiting implementation of a derivative-based optimization algorithm can be used to compute the solution vector 565a at each control time step.

In some embodiments of the invention, the solution of the inequality constrained optimization problem 550a uses the exact or approximate state and/or control values over the prediction time horizon from the previous control time step 510a, which can be read from the memory, as a solution guess in order to reduce the computational effort of solving the inequality constrained optimization problem 550a at the current control time step. This concept of computing a solution guess from the solution information at the previous control time step 510a is called warm-starting or hot-starting of the optimization algorithm and it can reduce the required computational effort of the SNMPC in some embodiments of the invention. In a similar fashion, the corresponding solution vector 565a can be used to update and store a sequence of exact or approximate state and/or control values for the next control time step 560a.

Figure 5B:
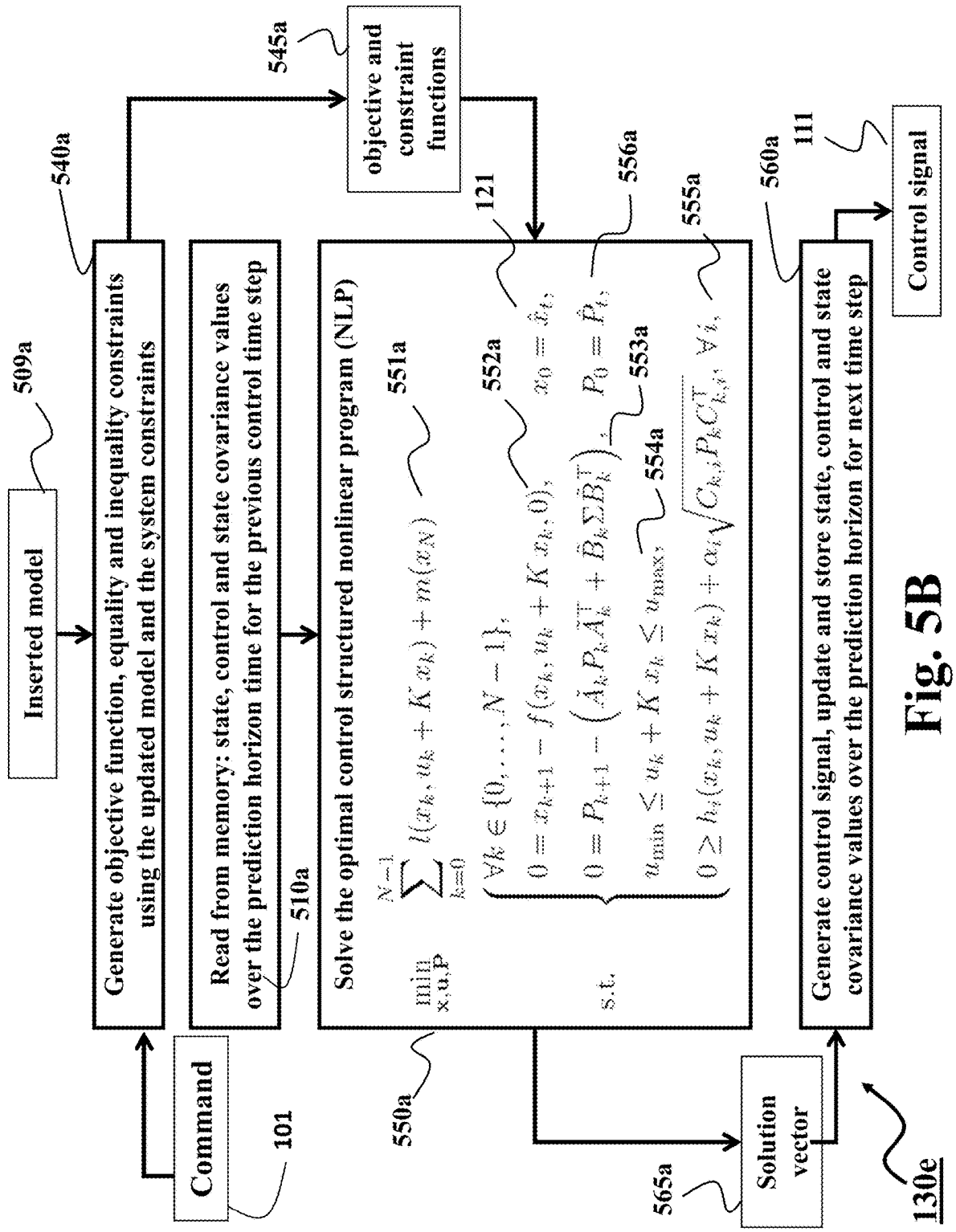
FIG. 5B shows a block diagram of an SNIVIPC controller that solves a constrained optimal control structured nonlinear programming problem.

FIG. 5B shows a block diagram of an SNMPC controller that solves a constrained optimal control structured nonlinear programming problem (OCP-NLP) 550a to compute the control signal 111 at each control time step, given the current state estimate of the system 121 and the estimated uncertainty 122 that provides the inserted updated model 509a and the control command 101. The OCP-NLP 550a includes the state variables $x=[x_0, x_1, \ldots, x_N]$, the state covariance matrix variables $P=[P_0, P_1, \ldots, P_N]$ and the control input variables $u=[u_0, u_1, \ldots, u_{N-1}]$ over the prediction time horizon as variables in the optimization problem that needs to be solved at each control time step:

$$\min_{x,u,P} \sum_{k=0}^{N-1} l(x_k, u_k + Kx_k) + m(x_N)$$

$$\text{s.t.} \begin{cases} \forall k \in \{0, \ldots, N-1\}, \\ 0 = x_{k+1} - f(x_k, u_k + Kx_k, 0), & x_0 = \hat{x}_t, \\ 0 = P_{k+1} - (\tilde{A}_k P_k \tilde{A}_k^\top + \tilde{B}_k \Sigma \tilde{B}_k^\top), & P_0 = \hat{P}_t, \\ u_{min} \le u_k + Kx_k \le u_{max}, \\ 0 \ge h_i(x_k, u_k + Kx_k) + \alpha_i \sqrt{C_{k,i} P_k C_{k,i}^\top}, & \forall i \end{cases}$$

wherein the probability distribution of the uncertainty is used to determine the state covariance matrix over the prediction horizon.

Some embodiments are based on the current state estimate 121 in an initial state value constraint $x_0 = \hat{x}_t$, a dynamical model of the system (the control model) that results in linear and/or nonlinear equality constraints 552a, a linearization-based approximation of the uncertainty propagation through the system dynamics resulting in linear and/or nonlinear covariance propagation equations 553a including the covariance matrix E of the probability distribution of the uncertainty, bounds 554a on control inputs and linear and/or nonlinear inequality constraints 555a and a linear-quadratic or nonlinear objective function 551a, each of which are defined over the prediction time horizon in the optimal control structured optimization problem. The OCP-NLP data 545a of the objective function, equality, and inequality constraints in this optimization problem 550a depend on the dynamical model and system constraints 540a, the current state of the system 121, the estimated uncertainty 122, and the control command 101. Examples of the OCP-NLP data 545a include objective functions, e.g., $l(\cdot)$ and $m(\cdot)$ and constraint functions, e.g., $f(\cdot)$ and $h_i(\cdot)$. Other examples of the OCP-NLP data 545a include constraint vectors, e.g., $\hat{x}_t$, $\text{vec}(\hat{P}_t)$, $u_{min}$ and $u_{max}$ and matrices, e.g., $\tilde{A}_k$, $\tilde{B}_k$, K and $C_{k,i}$.

In some embodiments of the invention, the nonlinear equality constraints 552a

$$x_{k+1} = f(x_k, u_k + Kx_k, 0)$$

impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, explicit or implicit Runge-Kutta methods, backward differentiation formulas, or finite element methods. When the original control model of the system is described by a set of continuous time differential equations, some embodiments of the invention discretize the system dynamics using an explicit or implicit numerical integration method 552a and the linearization requires a corresponding Jacobian evaluation to construct the discrete-time or discretized covariance propagation equations 553a. In some embodiments of the invention, the initial state covariance matrix 556a is defined as $P_0 = \hat{P}_t$, where $\hat{P}_t$ denotes the state uncertainty corresponding to the current state estimate 121. In some embodiments of the invention, the nonlinear inequality constraints 555a can be defined by any nonlinear smooth function, including either convex and/or non-convex constraints. In embodiments of the invention, one or multiple of the inequality constraints 555a can be defined as probabilistic chance constraints that aim to ensure that the probability of violating the corresponding inequality constraint is below a certain probability threshold value, i.e., the back-off coefficient value $\alpha_i > 0$ for probabilistic chance constraints and $\alpha_i = 0$ for standard deterministic inequality constraints. Note that deterministic inequality constraints aim to ensure that the corresponding inequality constraint is satisfied for the expected value of the trajectory of state and control values.

Using an approximate formulation of the probabilistic chance constraints 555a, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

In some embodiments of the invention, a stage and/or terminal cost in the objective function 551a can be defined by any linear, linear-quadratic, and/or nonlinear smooth function, including either convex and/or non-convex functions. The objective function 551a of the optimal control problem can include a cost term corresponding to each of the time points of the prediction time horizon. In some embodiments, the objective function includes a (nonlinear) least squares type penalization of the deviation of a certain output function of the system from a sequence of reference output values at each of the time points of the prediction time horizon, resulting in a reference tracking type formulation of the cost function in the SMPC 110.

Figure 6A:
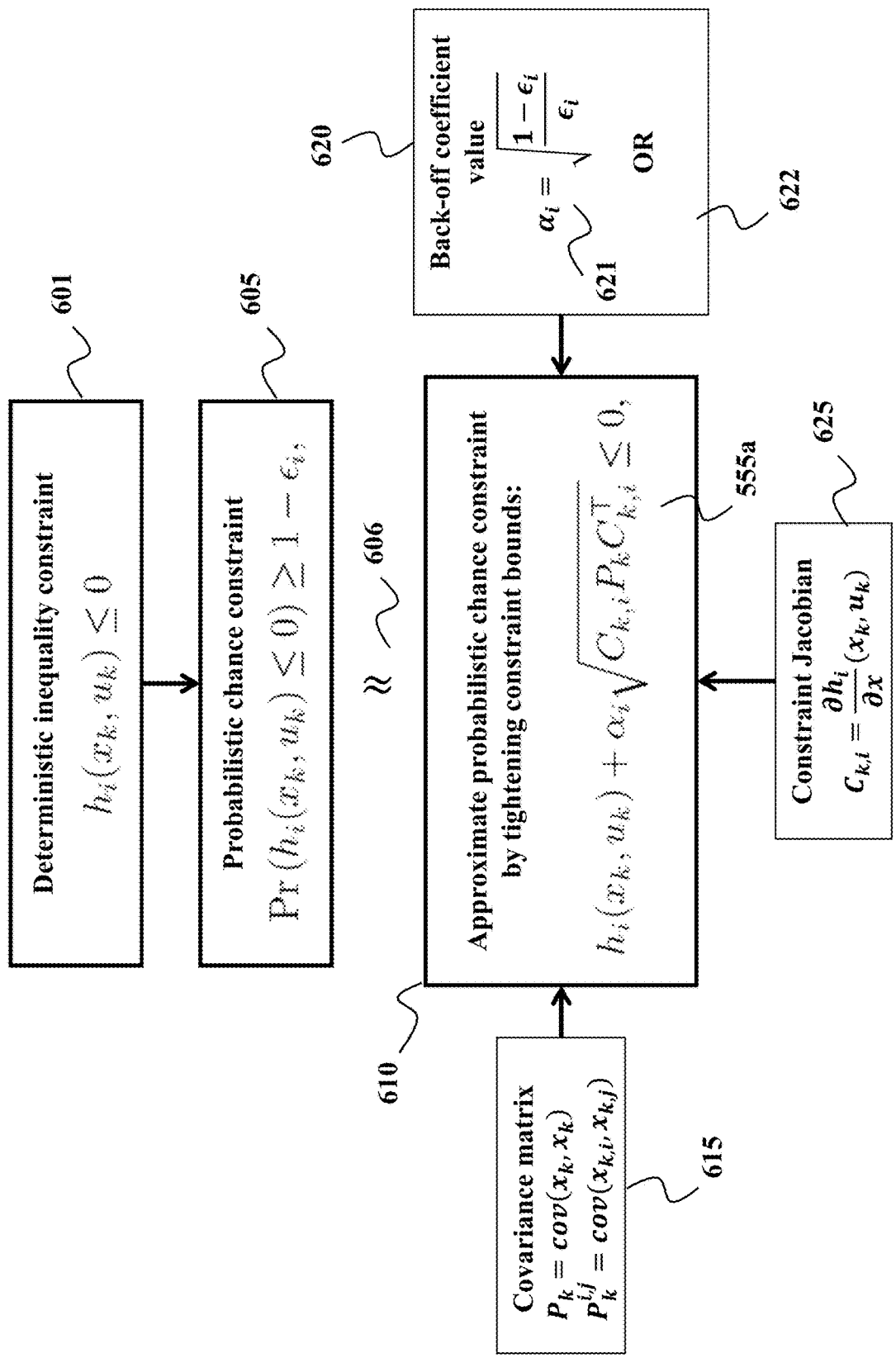
FIG. 6A shows a block diagram of formulating one or multiple constraints according to some embodiments.

FIG. 6A shows a block diagram of formulating one or multiple deterministic inequality constraints 601, on one or multiple states and/or control input variables, as probabilistic chance constraints 605 and their approximation 606 by tightening the corresponding constraint bounds 610 in the constrained OCP formulation of the SMPC. Probabilistic chance constraints aim to ensure that the probability of violating an inequality constraint $h_i(x_k, u_k) \leq 0$ is below a certain probability threshold value $\epsilon_i$, i.e., $\Pr(h_i(x_k, u_k) > 0) \leq \epsilon_i$. Equivalently, probabilistic chance constraints aim to ensure that the probability of satisfying an inequality constraint $h_i(x_k, u_k) \leq 0$ is above a certain probability threshold value $1-\epsilon_i$, i.e., $\Pr(h_i(x_k, u_k) \leq 0) \geq 1-\epsilon_i$.

In some embodiments of the invention, the formulation of one or multiple probabilistic chance constraints is implemented approximately 606, using a constraint tightening procedure 610

$$h_i(x_k, u_k) + \alpha_i \sqrt{C_{k,i} P_k C_{k,i}^T} \leq 0,$$

based on a state covariance matrix $P_k = \mathrm{cov}(x_k, x_k)$ 615, a constraint Jacobian matrix $$C_{k,i} = \frac{\partial h_i}{\partial x}$$

$(x_k, u_k)$ 625 and a back-off coefficient value $\alpha_i$ 620 that depends on the probability threshold value $\epsilon_i$, the probability distribution of the uncertainty and the resulting approximate probability distribution of the predicted state trajectories. The state covariance matrix $P_k$ can be computed using linearization-based covariance propagation equations 353. The constraint Jacobian matrix $C_{k,i}$ can be evaluated efficiently using symbolic differentiation or using algorithmic differentiation (AD) tools.

In some embodiments of the invention, the back-off coefficient value $\alpha_i$ 620 in each of the tightened inequality constraints can be computed using the Cantelli-Chebyshev inequality, i.e., $$\alpha_i = \sqrt{\frac{1-\epsilon_i}{\epsilon_i}} \; 621,$$

which holds regardless of the underlying probability distributions but it may lead to a relatively conservative constraint bound tightening. Other embodiments of the invention are based on a less conservative approximation, assuming normally distributed state trajectories, such that the back-off coefficient value can be chosen as $\alpha_i = \sqrt{2} \, \mathrm{erf}^{-1}(1-2\epsilon_i)$ 622, where $\mathrm{erf}^{-1}(\cdot)$ denotes the inverse Gaussian error function.

Figure 6B:
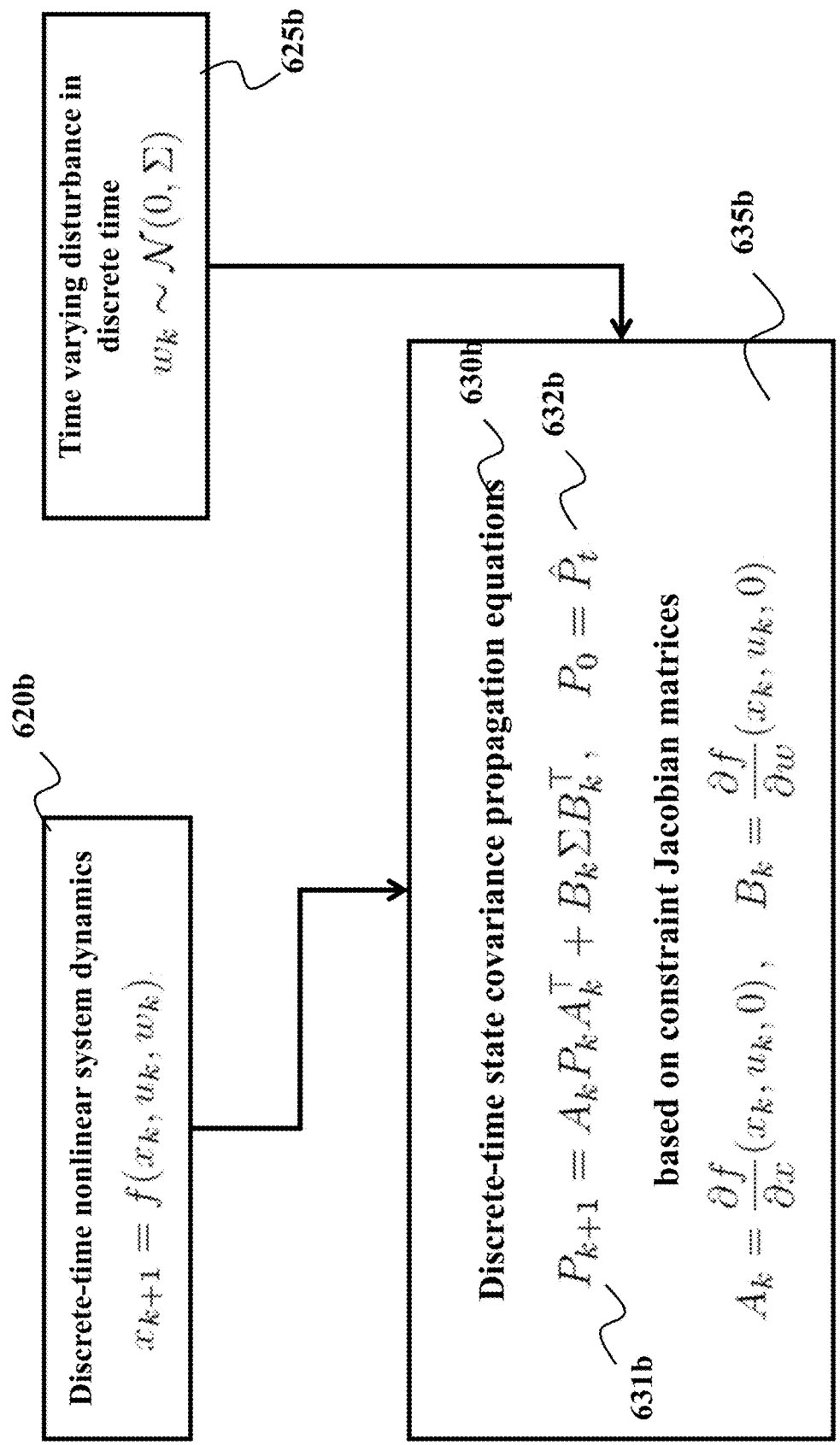
FIG. 6B shows a block diagram to illustrate the linearization-based state covariance propagation for a set of discrete-time nonlinear system dynamics.

FIG. 6B shows a block diagram to illustrate the linearization-based state covariance propagation for a set of discrete-time nonlinear system dynamics 620b
$x_{k+1} = f(x_k, u_k) + g(x_k, u_k) w_k$ given the time-varying estimated uncertainty $w_k$ 625b. In some embodiments of the invention, the uncertainty is modeled as a normally distributed set of stochastic variables $w_k \sim N(0, \Sigma)$ in discrete time, wherein $\Sigma$ is the covariance of the uncertainty determined from the probability distribution of the uncertainty. In other embodiments, the uncertainty is modeled as a weighted combination of basis functions, wherein $w_k$ is determined from the probability distribution of the weights indicating the variation of the uncertainty. The discrete-time state covariance propagation equations 630b then read as $$P_{k+1} = A_k P_k A_k^T + B_k \Sigma B_k^T, P_0 = \hat{P}_t$$

where $P_k = \mathrm{cov}(x_k, x_k) \in \mathbb{R}^{n_x \times n_x}$ is the covariance matrix for the predicted state value $x_k$, and given the discrete-time constraint Jacobian matrices 635b $$A_k = \frac{\partial f}{\partial x}(x_k, u_k, 0), \quad B_k = \frac{\partial f}{\partial w}(x_k, u_k, 0).$$

Unlike continuous-time state covariance propagation equations, some embodiments of the invention are based on the realization that the discrete-time state covariance propagation equations 631b do not require the use of a numerical integration method and they automatically preserve the positive definiteness of the state covariance matrix $P_k \succ 0$, $\forall k$, as long as the initial state covariance matrix 632b is positive definite, i.e., $P_0 = \hat{P}_t \succ 0$.

In some embodiments the probability distribution of uncertainty $w_k$ is used to adapt the constraint bounds $h_i(x_k, u_k) \leq 0$. E.g., when the variance of the uncertainty is large for parts of the state range such that the behavior of the uncertainty is unpredictable for those states, one embodiment restricts the constraint of the state connected to the uncertainty to be in a range where the probability distribution is small enough.

Figure 7A:
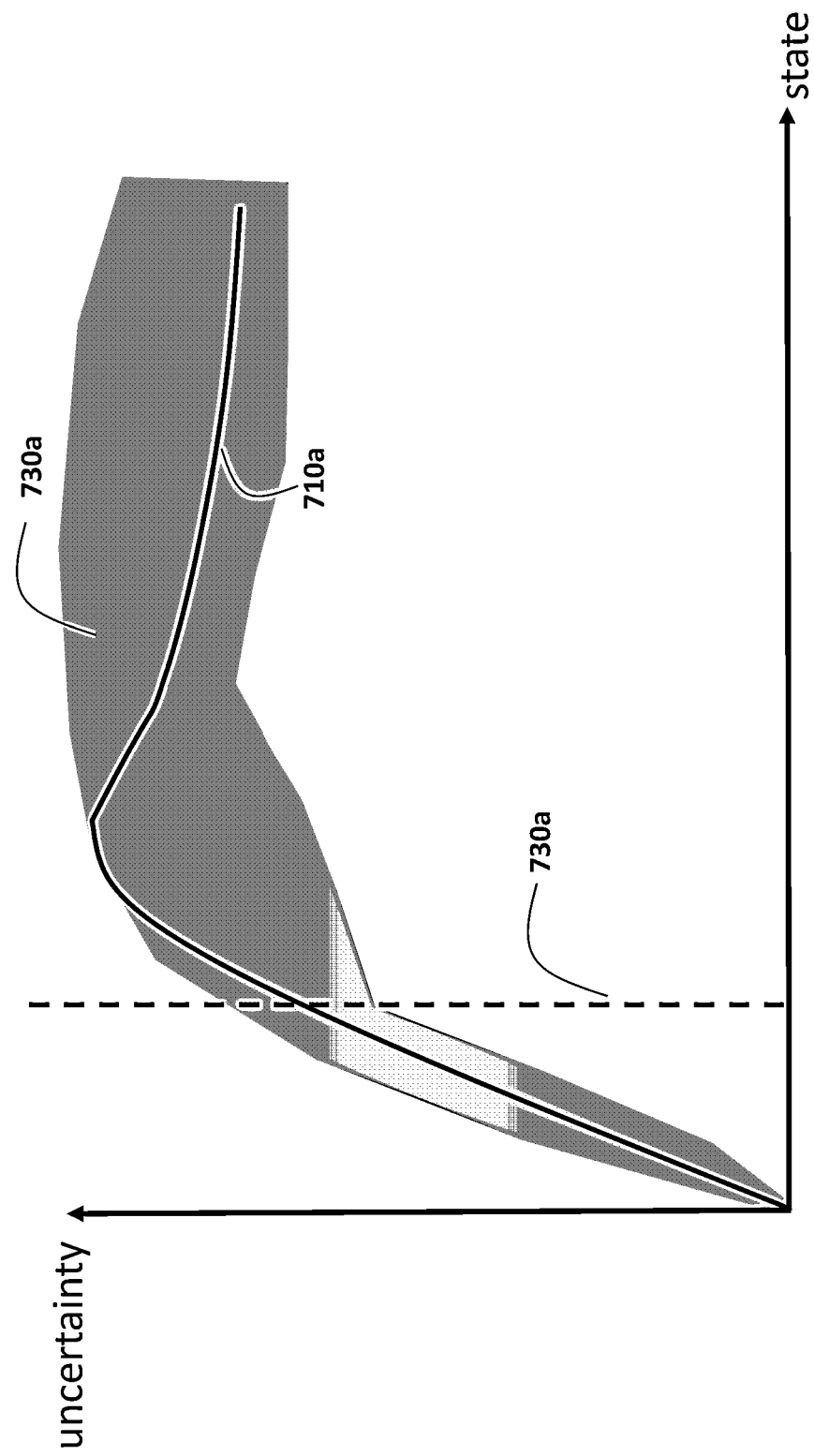
FIG. 7A shows an illustration of some principles to adapt the constraint in response to the probability distribution of the uncertainty, wherein the uncertainty is dependent on at least a subset of the full state.

FIG. 7A shows an illustration of some principles to adapt the constraint in response to the probability distribution of the uncertainty, wherein the uncertainty is dependent on at least a subset of the full state. The probability distribution of the estimated uncertainty 730a includes the true uncertainty 710a. However, beyond the state value 730a the uncertainty is so large that controlling the system beyond those state values can impact the safety of the system. Hence, in response to the large range of the probability distribution 730a, the state is bounded to 730a.

Figure 7B:
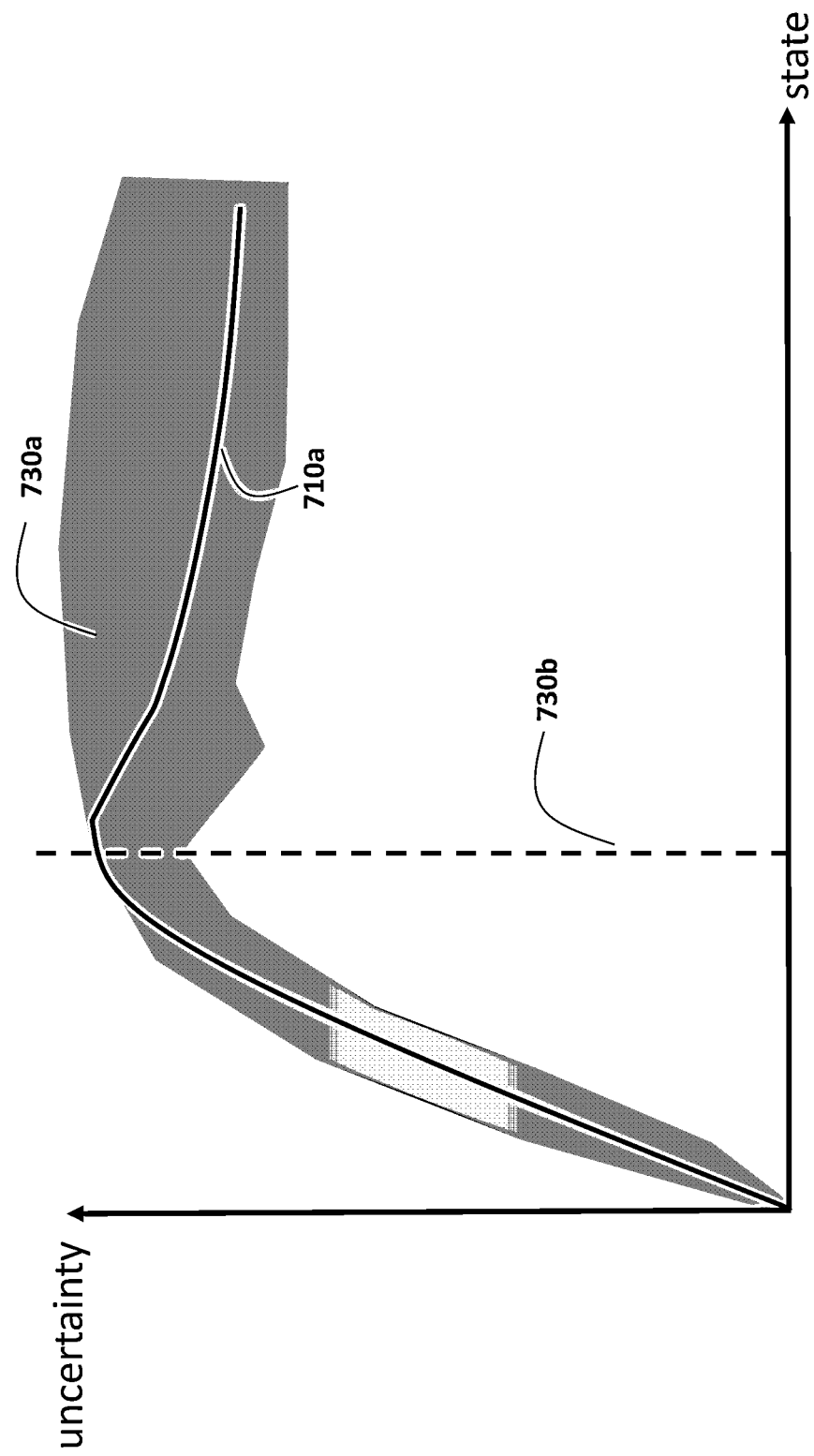
FIG. 7B shows an illustration of some principles to adapt the constraint in response to the probability distribution of the uncertainty, wherein the uncertainty is dependent on at least a subset of the full state.
Figure 7C:
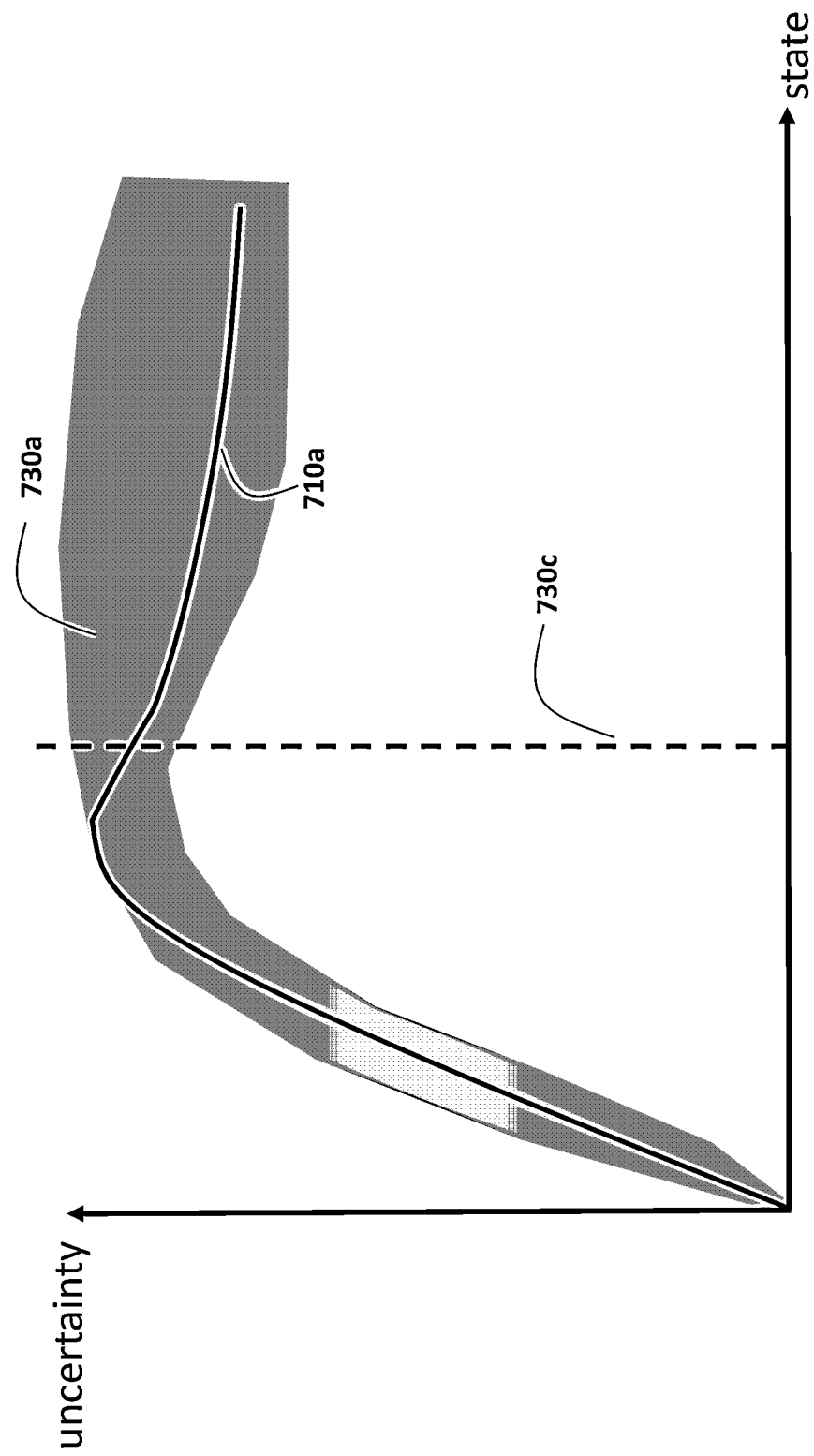
FIG. 7C shows an illustration of some principles to adapt the constraint in response to the probability distribution of the uncertainty, wherein the uncertainty is dependent on at least a subset of the full state.

FIG. 7B shows a situation where the system has been controlled such that the estimator has been able to estimate the uncertainty for values close to the original constraint 730a, such that the range of the probability distribution of the uncertainty has shrunk for state values around 730a. In one embodiment, in response to the shrinking in the range of the probability distribution of the uncertainty for state values in the vicinity of 730a, the state constraints are increased to 730b. Finally, at some future time step the same procedure has been repeated for constraint 730b, such that, in FIG. 7C, the constraint 730b can be increased to 730c. Similarly, in one embodiment the constraint can be shrunk. E.g., if the system is controlled such that state values are not visited for a time period, the range of the probability distribution of the uncertainty is increased and the constraint can be decreased similarly to reflect that.

Figure 8A:
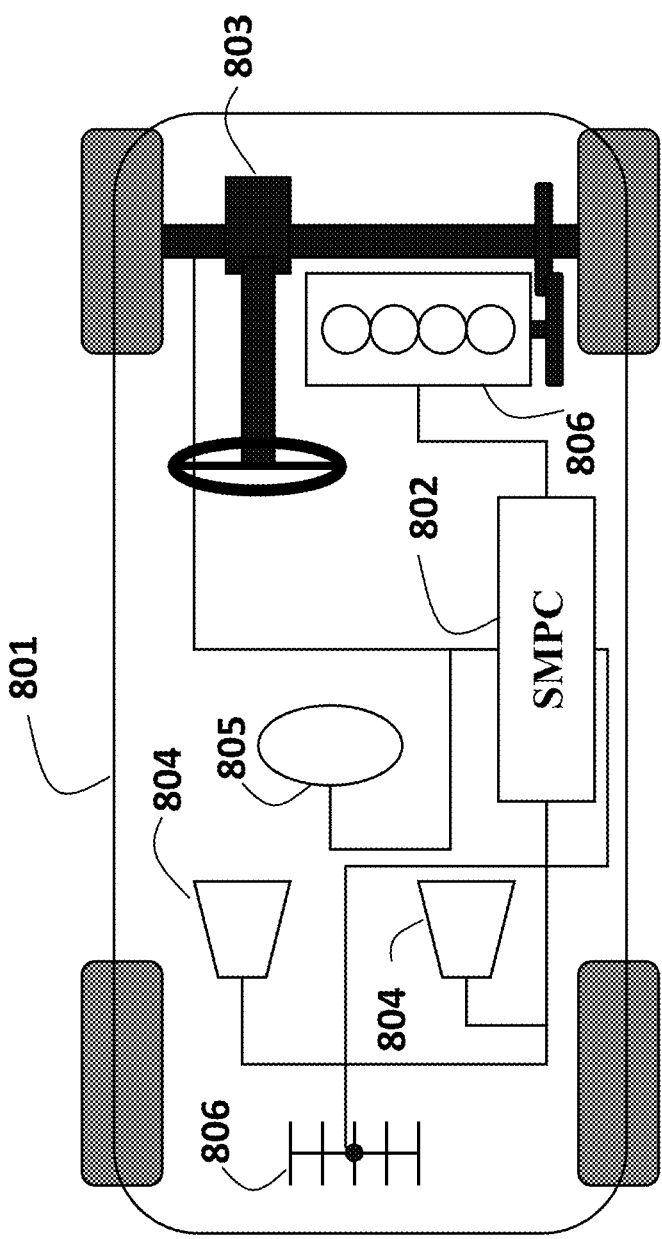
FIG. 8A shows a schematic of a vehicle including an SMPC employing principles of some embodiments.

FIG. 8A shows a schematic of a vehicle 801 including an SMPC 802 employing principles of some embodiments. As used herein, vehicle 801 can be any type of wheeled vehicle, such as a passenger car, bus, or rover. Also, the vehicle 801 can be an autonomous or semi-autonomous vehicle. For example, some embodiments control the motion of vehicle 801. Examples of the motion include the lateral motion of the vehicle controlled by a steering system 803 of the vehicle 801. In one embodiment, the steering system 803 is controlled by controller 802. Additionally or alternatively, the steering system 803 can be controlled by a driver of the vehicle 801.

The vehicle can also include an engine 806, which can be controlled by the controller 802 or by other components of the vehicle 801. The vehicle can also include one or more sensors 804 to sense the surrounding environment. Examples of the sensors 804 include distance range finders, radars, lidars, and cameras. The vehicle 801 can also include one or more sensors 805 to sense its current motion quantities and internal status. Examples of the sensors 805 include global positioning system (GPS), accelerometers, inertial measurement units, gyroscopes, shaft rotational sensors, torque sensors, deflection sensors, pressure sensor, and flow sensors. The sensors provide information to the controller 802. The vehicle can be equipped with a transceiver 806 enabling communication capabilities of the controller 802 through wired or wireless communication channels.

Figure 8B:
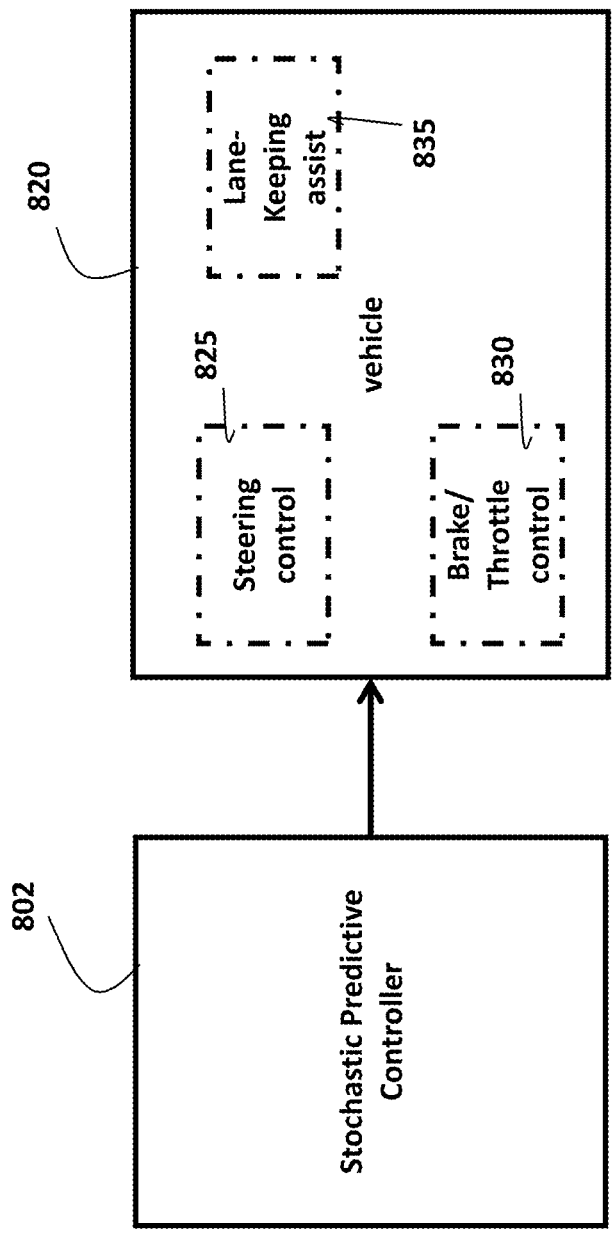
FIG. 8B shows a schematic of the interaction between the SMPC and the controllers of the vehicle according to some embodiments.

FIG. 8B shows a schematic of interaction between the SMPC 802 and the controllers 820 of the vehicle 801 according to some embodiments. For example, in some embodiments, the controllers 820 of the vehicle 801 are steering 825 and brake/throttle controllers 830 that control rotation and acceleration of the vehicle 820. In such a case, the stochastic predictive controller 802 outputs control inputs to the controllers 825 and 830 to control the state of the vehicle. The controllers 820 can also include high-level controllers, e.g., a lane-keeping assist controller 835 that further processes the control inputs of the stochastic predictive controller 802. In both cases, the controllers 820 maps use the outputs of the SMPC 802 to control at least one actuator of the vehicle, such as the steering wheel and/or the brakes of the vehicle, in order to control the motion of the vehicle.

Figure 8C:
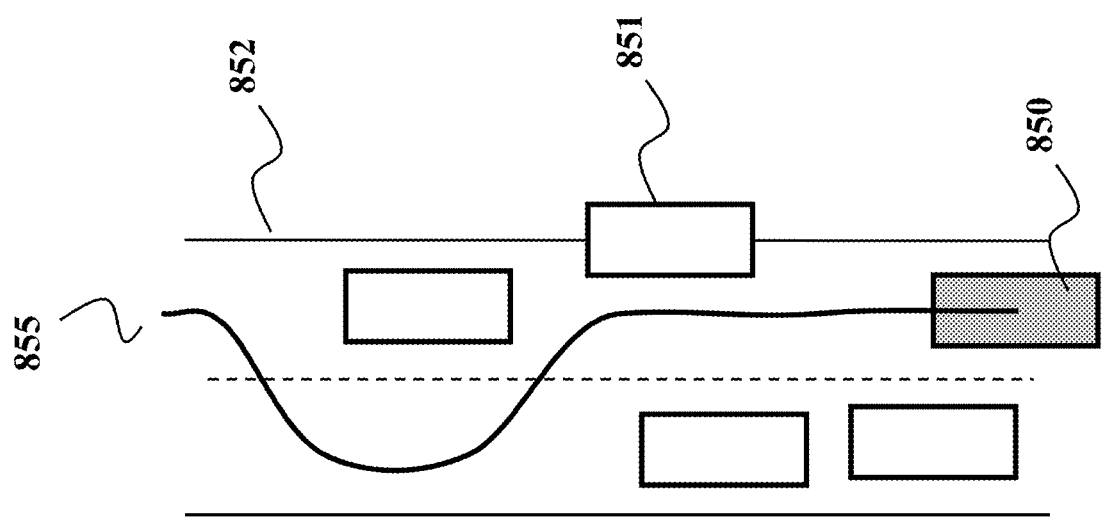
FIG. 8C shows a schematic of an autonomous or semi-autonomous controlled vehicle.

FIG. 8C shows a schematic of an autonomous or semi-autonomous controlled vehicle 850 for which a dynamically feasible, and often optimal trajectory 855 can be computed by using embodiments of this invention. The generated trajectory aims to keep the vehicle within particular road bounds 852, and aims to avoid other uncontrolled vehicles, i.e., obstacles 851 for the controlled vehicle 850. In some embodiments, each of the obstacles 851 can be represented by one or multiple inequality constraints in a time or space formulation of the constrained optimal control problem. For example, based on embodiments configured to implement a stochastic model predictive controller, the autonomous or semi-autonomous controlled vehicle 850 can make decisions in real-time such as, e.g., pass another vehicle on the left or the right side or instead to stay behind another vehicle within the current lane of the road 852. Embodiments of the invention are based on an SNMPC that directly takes into account the uncertainty about the current state and the predicted state of the vehicle 850, the uncertainty about the parameters in the vehicle model as well as the uncertainty about the current and predicted state of the environment, e.g., including the obstacles 851 that are within a certain distance from the position of the autonomous or semi-autonomous controlled vehicle 850.

Figure 8D:
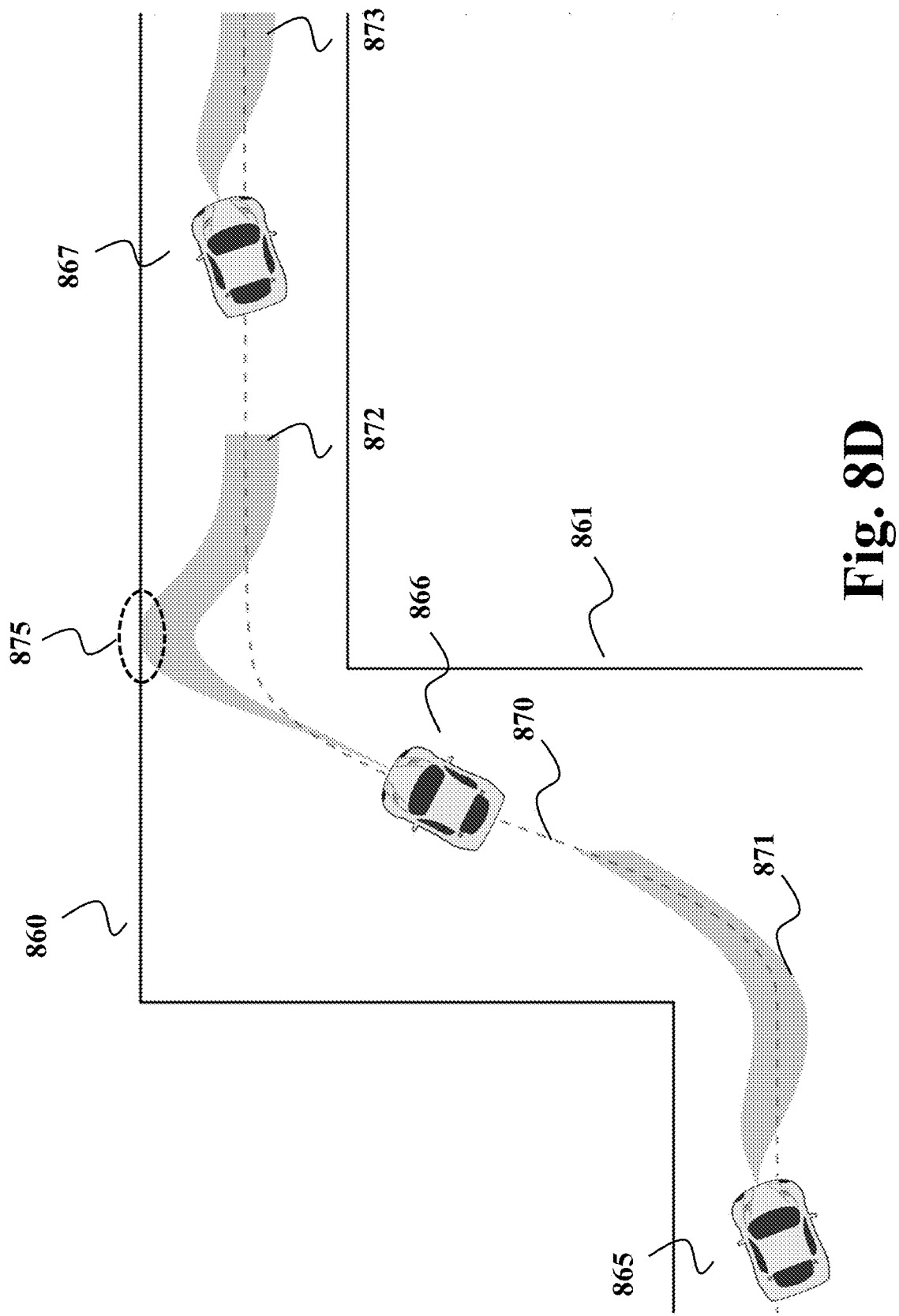
FIG. 8D shows a schematic of a vehicle that is controlled by an SMPC.

FIG. 8D shows a schematic of a vehicle 865 that is controlled by an SNMPC that aims to track a dynamically feasible and optimal trajectory 870 of a sharp lane change maneuver within the upper 860 and lower 861 road bounds by using embodiments of this invention. FIG. 8D shows the vehicle position 865, including the propagation of uncertainty for the predicted state trajectories by the SNMPC controller 871, at a first-time point, the vehicle position 866 and corresponding propagation of predicted state uncertainty 872 at a second-time point, and the vehicle position 867 and corresponding propagation of predicted state uncertainty 873 at a third-time point. The use of the SMPC with probabilistic chance constraints, according to some embodiments of the invention, allows the probability of the controlled vehicle to violate the road-bound constraints 860 and/or 861 to be below a certain probability threshold value. More specifically, FIG. 8D shows that the stochastic tube of predicted state trajectories 872 at the second time point reaches 875 the upper road-bound constraint 860, illustrating the behavior of the stochastic predictive controller that aims to satisfy both deterministic constraints and probabilistic chance constraints for the controlled system under uncertainty.

Examples of the uncertainty for the system and its environment can include any parameters related to the friction behavior between the tires of the vehicle and the road surface, e.g., the parameters in a Pacejka tire-force model that can be learned or estimated either offline and/or online while controlling the vehicle. The estimated parameter values, as well as the estimated uncertainty, can be defined as time-varying and uncertain disturbance variables in the direct optimal control problem formulation of the stochastic nonlinear model predictive controller, according to embodiments of the invention.

Figure 9A:
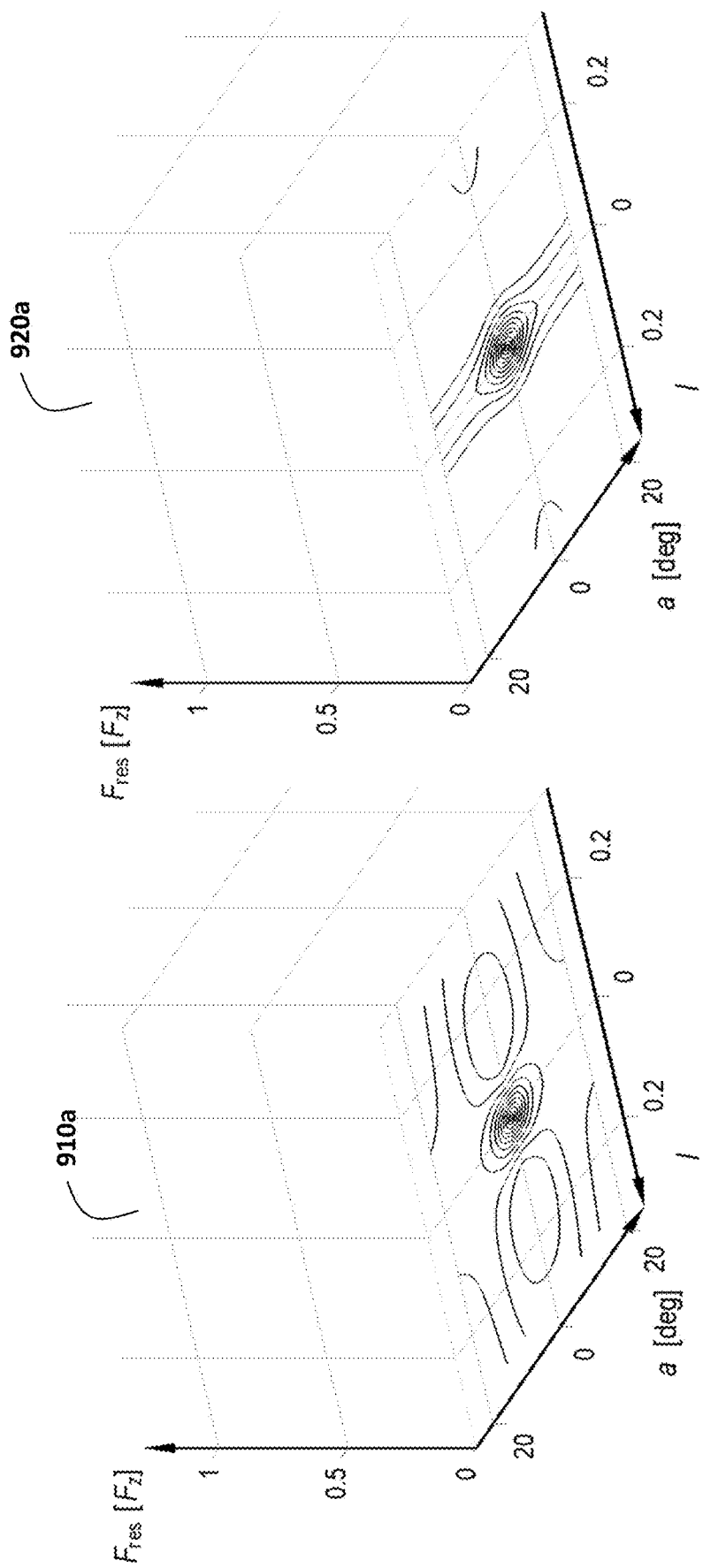
FIG. 9A shows a schematic of how the force of a tire of a vehicle varies when the values of the slip vary.

In some embodiments, the uncertainty is modeling the tire friction, i.e., the friction between tire and road. FIG. 9A shows a schematic of how the force of a tire of a vehicle varies when the values of the slip vary, in both longitudinal and lateral direction used by some embodiments. The situation shows the results for two different tire friction functions 910a and 920a. In the remainder of this disclosure, one of either the longitudinal and lateral slip is zero for simplicity, but it is to be understood, and as a reader with experience within the field will appreciate, various embodiments described herein also cover the case for the combined slip.

Figure 9B:
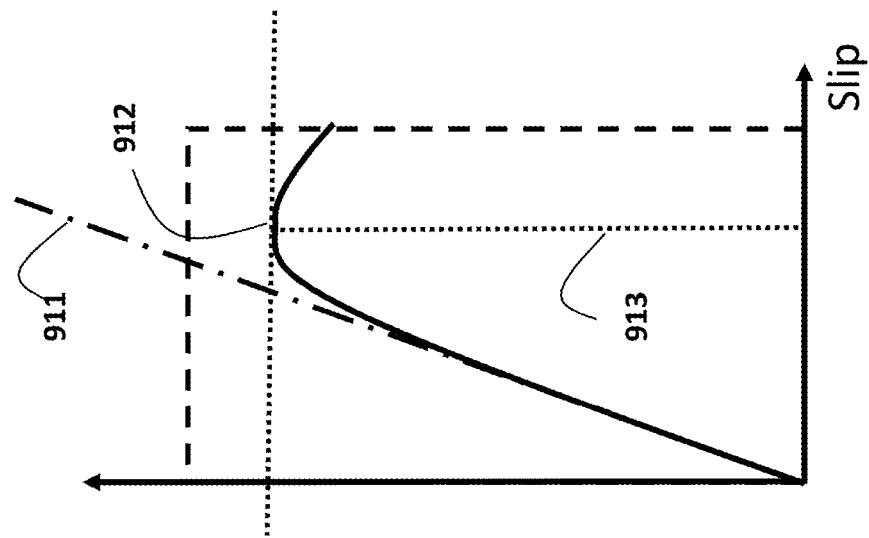
FIG. 9B shows a two-dimensional equivalent of FIG. 9A, where the force has been normalized with the normal force resting on the wheel.
Figure 9B:
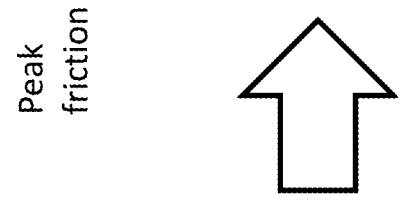
Figure 9B:
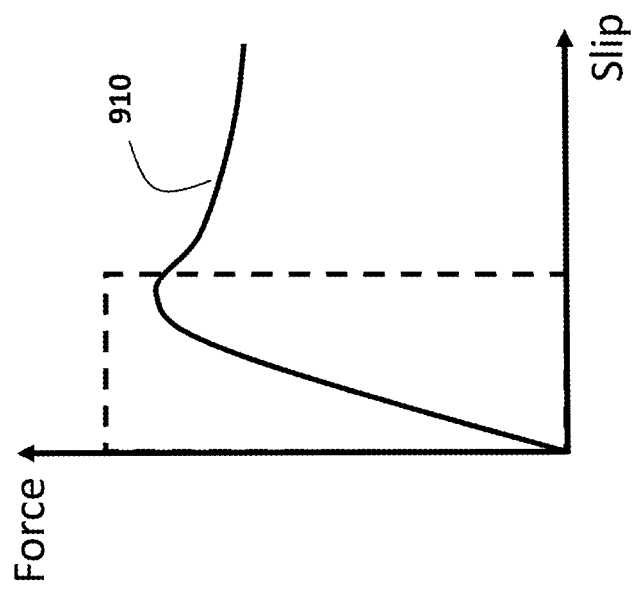

FIG. 9B shows a two-dimensional equivalent of FIG. 9A, where the force has been normalized with the normal force resting on the wheel. The value 913 where the force attains its maximum is called the peak friction 912. The peak friction 912 is useful to know in several automotive control systems. For example, the knowledge of peak friction is important in order to know how much brake torque can be applied to a particular wheel in electronic stability control systems (ESCs). The peak friction value and the corresponding slip value 913 can be used in anti-lock braking systems (ABS) to achieve optimal braking force. The initial slope 911 of the force curve 910 is usually called the stiffness of the tire. During normal driving, in which case the slip is small, the force curve can be approximated with the tire stiffness 911. As used herein, normal driving is defined as regular driving, e.g., everyday driving in urban areas, where the vehicle avoids emergency braking and evasive steering maneuvers.

Normal driving can be contrasted with aggressive driving when extensive force is applied to the wheels of the vehicle. As used herein, aggressive driving is defined as driving where braking/acceleration and/or steering torque is large enough such that the vehicle operates close to the tire adhesion limits of the material of the tires and the surface of the road. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems measure a deviation from a predicted measurement, using a steering wheel angle and a longitudinal velocity, to a vehicle model using the tire force function as a linear approximation. When the deviation is more than a threshold, safety braking is activated. Thus, one exemplar measure of normal driving is driving well below these activation thresholds. In other words, if the driving is not aggressive, the driving is normal.

During aggressive driving, the wheel slips more, which causes a larger force/friction variation. This variation is highly non-linear. For example, regardless of the extent of the force and type of the road, there is maximum friction for almost all surfaces, which occurs at a point from which the force decreases when applying more braking/steering torque. After this point, the increase in wheel slip results in smaller tire forces. For large wheel slip beyond the maximum force, it becomes more difficult to maintain the desired wheel slip since the dynamics become unstable beyond the point of maximum force. Therefore, vehicles are often controlled such that the wheel slip stays small enough such that the peak is not exceeded, and for high-performance maneuvering, it is therefore essential to know where 911 the peak 912 is attained.

For a real-time determination of the tire friction function, which is nonlinear for large slip values, with a deterministic tire friction function determinator, data need to be collected on the entire tire friction function over a short time period. This is challenging because it requires driving at/close to the unstable region of the vehicle dynamics. The whole operating region is typically not visited during normal vehicle driving, and it may be dangerous to visit this part of the dynamics with either a controller that has not yet acquired a good prediction model for the vehicle behavior or knows that the uncertainty of the tire friction at such operating regions, as closed-loop instability may occur.

Some embodiments are based on the understanding that while it is not possible to determine the tire friction curve in its entirety during real-time operation, it is possible to determine a probability distribution of the tire friction function in its entirety during real-time operation, wherein the probability distribution captures eventual uncertainty of the absence of data collection for certain slip values, wherein the tire friction function is the uncertainty 125 to the vehicle 120.

Another embodiment is based on the understanding that using a probabilistic approach, a controller of the vehicle, either autonomous or manual, can use the information to either explore the uncertain region to gain more knowledge and hence reduce uncertainty or, avoid that region since the uncertainty causes a risk to explore.

One embodiment is based on the realization that even though production vehicles do not have the sensor equipment to measure the tire friction function directly, several of the sensors in production vehicles give indirect information about the tire friction function because they measure a vehicle state or combinations of a vehicle state. As used herein, a vehicle state includes a velocity of the vehicle and a heading rate of the vehicle. For instance, an inertial measurement unit measures a heading rate of the vehicle and an acceleration of the vehicle. Hence, an inertial sensor measures directly parts of the vehicle state. On the other hand, an acceleration sensor measures an acceleration of the vehicle, which is related to both the vehicle velocity and the tire friction function by Newton's second law. For instance, a wheel speed sensor of a vehicle indicates the forward velocity of the vehicle, which can be a vehicle state.

In some embodiments only the linear part of the tire friction function is estimated, i.e., the slope equivalently denoted with stiffness, 911 is estimated, which is constant for small slip values. Hence, such an estimation results in a state-independent uncertainty because the slope 911 is constant. In other embodiments, the probability distribution of the full function 910 is estimated, wherein the uncertainty can be made state-independent by using a weighted combination of basis functions to some other embodiments.

Only estimating the slope 911 leads to a much simpler estimation problem, and there is no need for a weighted combination of basis functions since the uncertainty is already state-independent. However, since the tire friction function is highly nonlinear it can be dangerous to control the vehicle for large slip values when the model of the tire friction function is modeled as a linear state-independent slope as 911.

Some embodiments are based on the understanding that there is a relation between slope 911 and the peak friction 912, which can be used to ensure the safety of the vehicle control system. In some embodiments the constraints ensuring vehicle stability are determined as $|\dot{\psi}v_x| \le 0.85\ \mu g$ and $$\left|\frac{v_y}{v_x}\right| \le \arctan(0.02\ \mu g),$$

wherein $\dot{\psi}$ is the heading rate of the vehicle, $v_x$ is the longitudinal velocity of the vehicle, $v_y$ is the lateral velocity of the vehicle, g is the gravitational acceleration, and $\mu$ is the peak friction, i.e., the friction coefficient. The friction coefficient is not estimated by the slope 911. However, some embodiments determine the peak friction from the estimated values of slope 911. In some embodiments, the estimated values of the slope are determined as the mean of the probability distribution of the uncertainty. Other embodiments determine the peak friction as $$\mu \approx \min\left(\frac{a(C_{f,n}^y + \Delta C_f^y + C_{r,n}^y + \Delta C_r^y)}{2}, 1\right),$$

wherein a is a scaling constant, f indicates the front wheel axle, r the rear wheel axle, subscript n indicates that the stiffness C is for a nominal value, and wherein $\Delta C$ is the estimated mean value of the stiffness. Hence, the safety of the SMPC can be ensured even without explicit estimation of the probability distribution of the peak friction. These constraints are hereafter denoted with stability constraints.

Different types of motion models can be used, both in the control model and the estimation model. For computation purposes, a simple model is preferred, because it facilitates fast implementations computation-wise. However, a high-fidelity model is preferred if model accuracy is important.

Moreover, depending on the model that is employed by the invention, a different number of parameters can be calibrated.

In some embodiments, the uncertainty models the full tire friction function, wherein the weighted basis function combination is used to decompose the friction function into a state-dependent part and state-independent part according to some embodiments.

Some embodiments are based on the understanding that while estimating the tire friction function includes estimating the peak friction, the amount of driving, i.e., the amount of sensor data available, affects the accuracy of the estimation. Hence, the estimated peak may be estimated to be too low or too large, or it may be estimated to occur for different slip values. In such a case, allowing the SMPC to actuate the vehicle for large slip values can be dangerous, since the uncertainty is not correctly determined.

Figure 9C:
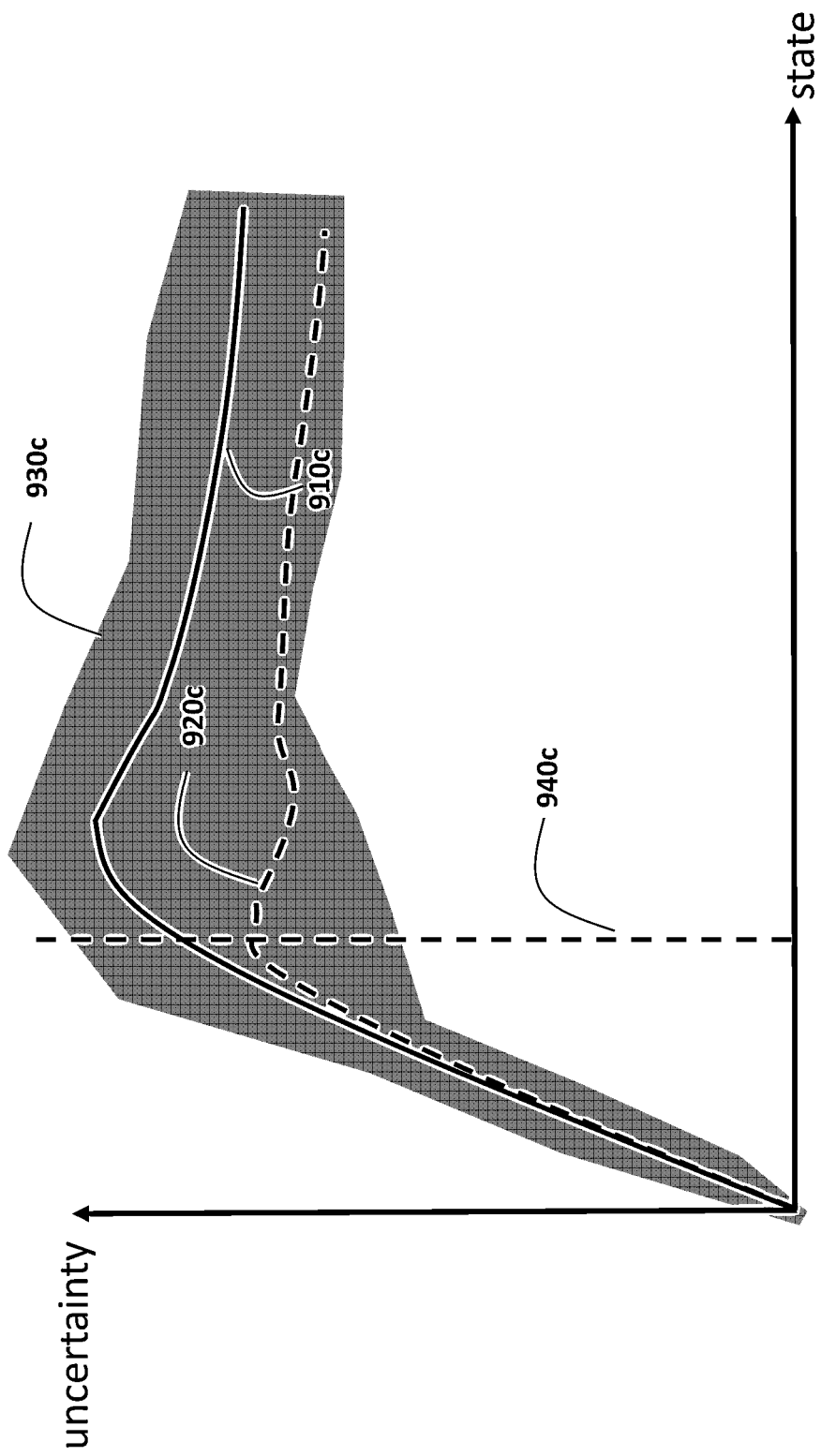
FIG. 9C illustrates the adaptation of the slip value constraint with the estimated tire friction function according to some embodiments.

To this end, some embodiments restrict the slip value in the SMPC to not be larger where the peak is estimated to occur. FIG. 9C illustrates the adaptation of the slip value constraint with the estimated tire friction function according to some embodiments. The true friction function 910c is not well-estimated 920c, but the estimated distribution of friction function 930c includes the true friction function. The uncertainty around the values of the peak is large, implying the knowledge about the friction function is limited. To this end, one embodiment constraints the slip value to be around the value 940c where the peak occurs.

Figure 9D:
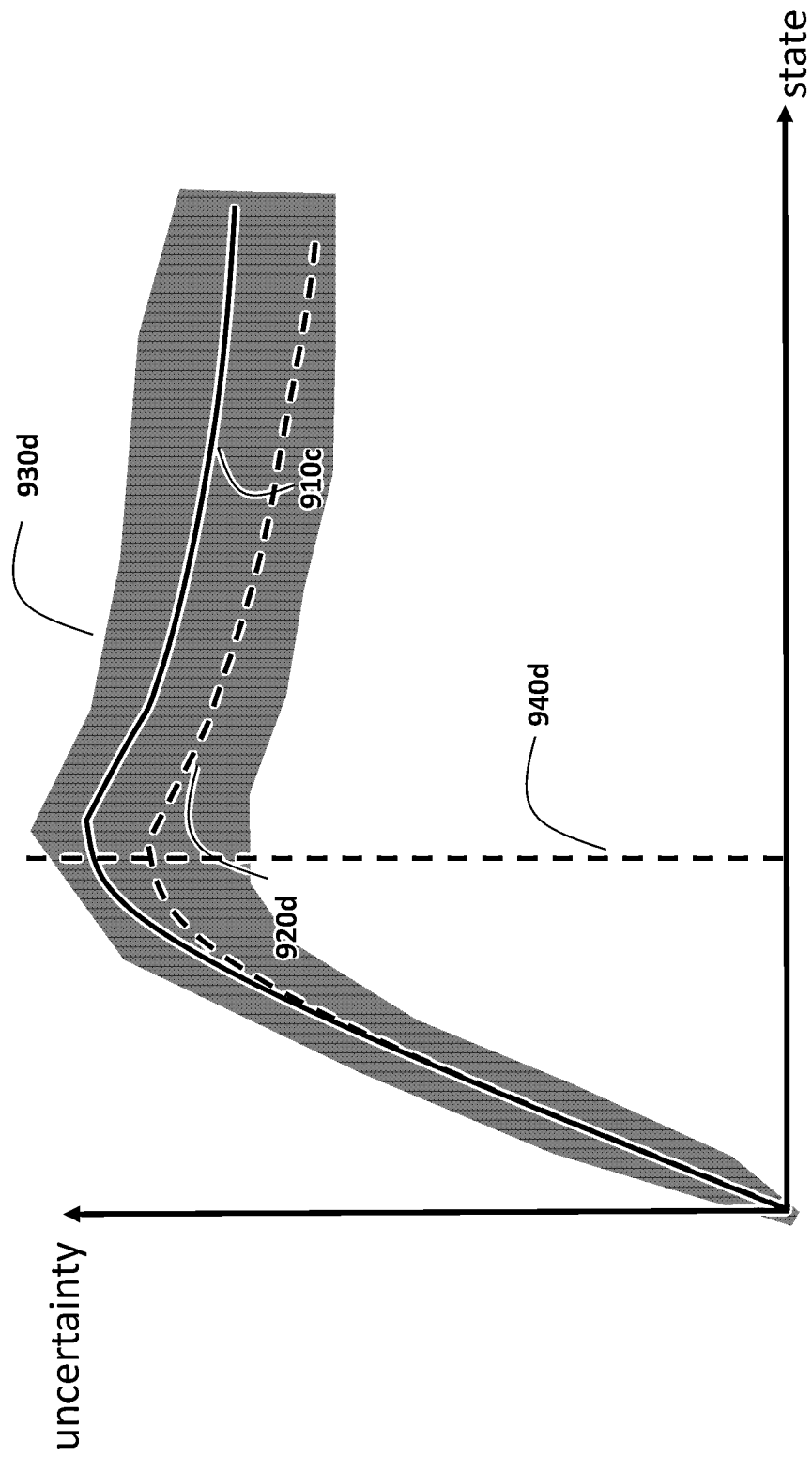
FIG. 9D illustrates the adaptation of the slip value constraint with the estimated tire friction function according to some embodiments.

When the vehicle has been controlled close to the constraint, more knowledge is gathered. FIG. 9D shows an illustration of the change of estimation of the friction function 920d in response to the acquiring of data. More sensor measurements have arrived and been processed, and as a result, the probability distribution 930d and the estimated friction function 920d are of better quality. Hence, the slip value constraint 940d can be adjusted.

Various embodiments determine the slip constraint in different ways.

One embodiment uses the understanding that the peak occurs at different slip values for different surfaces. E.g., on snow-covered surfaces one embodiment employs a nominal limit for some small slip value, e.g., 5 degrees, but as the estimator learns about a surface change to asphalt, and a peak forms in the estimated friction function, the constraint can be increased to values around the peak, to allow the estimator to learn more about the friction, but prevent it from reaching dangerous regions.

One embodiment initializes the estimator with a nominal model, e.g., determined offline. In one embodiment, the adaptation of the slip value is determined as $$\bar{\alpha} = \begin{cases} \min_{\{\alpha \mid \alpha > 0, \frac{\partial F_y(\alpha)}{\partial \alpha} \leq 0\}} \alpha & \text{if } \frac{F_{ymax}}{F_z} > \mu_{nom} + 0.1 \\ \frac{5\pi/180}{0.7}\left(\frac{F_{ymax}}{F_z} - 0.3\right) + 5\pi/180 & \text{otherwise} \end{cases}$$

-continued $$\alpha_{max} = \min(\max(\bar{\alpha}, 5\pi/180), 12\pi/180)$$

wherein $F_{y\ max}$ is the maximum lateral force in the learned model and $\mu_{nom}$ is the coefficient of friction for the nominal model, and wherein the different constant values can be adjusted, e.g., by offline determination of surface models.

Figure 10A:
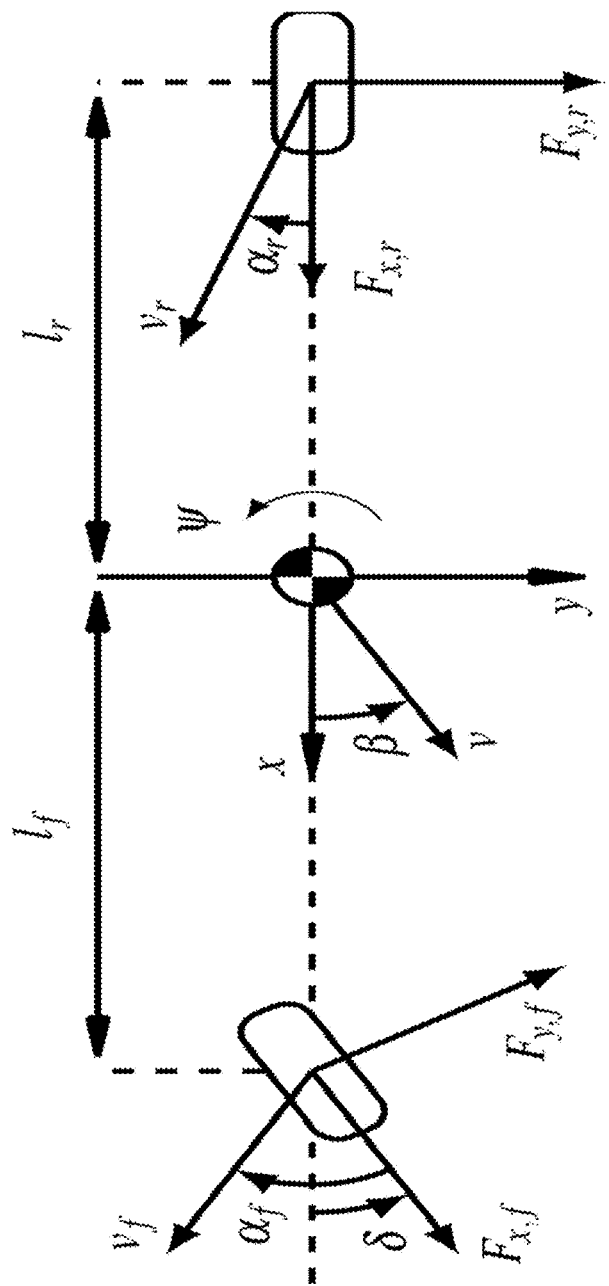
FIG. 10A shows a schematic of a simplified front-wheel-drive single-track model of the vehicle.
Figure 10B:
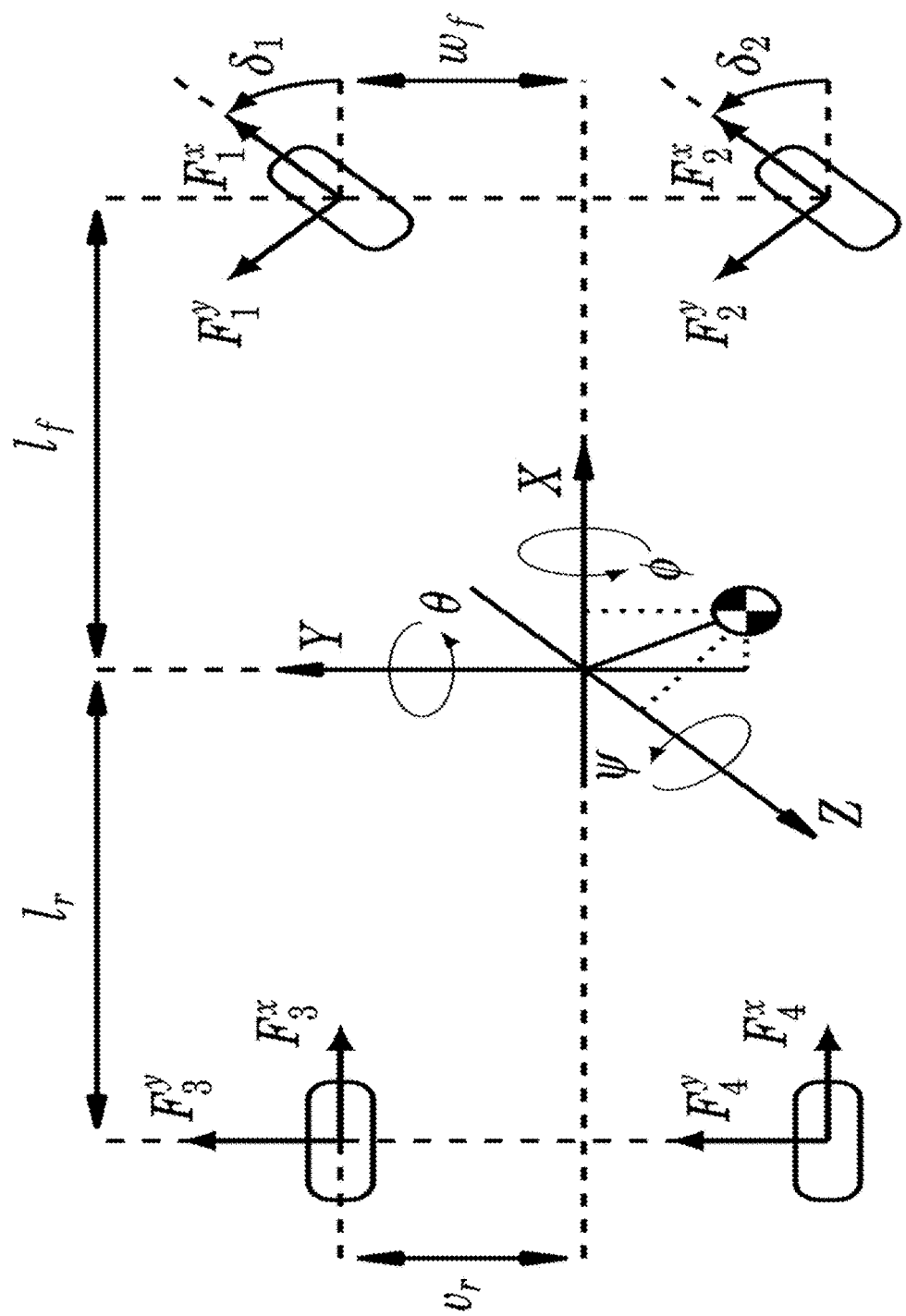
FIG. 10B shows a schematic of a double-track model, which models all 4 wheels, in accordance with one embodiment.

FIG. 10A shows a schematic of a simplified front-wheel-drive single-track model of the vehicle, in which the two wheels on each axle are lumped together, in accordance with one embodiment. This model depends on 4 tire friction functions or stiffness when accelerating, one longitudinal and two lateral. In FIG. 10B, 'δ' is the steering angle of the front wheel, α is the slip angle in the lateral case, β is the body slip of the vehicle, which is defined as the ratio of the forward and lateral velocity of the vehicle, and is the longitudinal (forward) and lateral force, respectively.

FIG. 10B shows a schematic of a double-track model, which models all 4 wheels, in accordance with one embodiment. With such a model, eight tire friction functions affect the motion of the model of the vehicle.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A stochastic model predictive controller (SMPC) for controlling a system, comprising: at least one processor; and memory having instructions stored thereon that, when executed by the at least one processor, cause the SMPC to:

determine, at each control step based on measurements of outputs of the system indicative of a transition of a state of the system from a previous state to a current state, an estimation of the current state of the system, and an estimation of a probability distribution of uncertainty of a parameter of dynamics of the system;

update a control model of the system including a function of dynamics of the system modeling the uncertainty of the parameter with first and second order moments of the estimated probability distribution of uncertainty of the parameter;

determine a control input to control the system by optimizing the updated control model of the system at the current state over a prediction horizon; and control the system based on the control input to change the state of the system.

2. The SMPC of claim 1, wherein the first and second order moments of the estimated probability distribution of uncertainty of the parameter are included in the control model as a multiplier of the function of dynamics of the system, such that the update of the control model includes an update of the multiplier.

3. The SMPC of claim 2, wherein the probability distribution of uncertainty of the parameter is independent of the state of the system.

4. The SMPC of claim 2, wherein the probability distribution of uncertainty of the parameter is dependent on the state of the system, wherein the probability distribution of uncertainty of the parameter is partitioned into a state-dependent part expressed in the control model as a function of the state of the system and a state-independent part expressed independently from the state of the system, wherein the state-dependent part is included inside the function of dynamics of the system, and the state-independent part is included outside of the function of dynamics of the system into the multiplier.

5. The SMPC of claim 4, wherein the probability distribution of uncertainty of the parameter is represented as a weighted combination of basis functions dependent on the state of the system, such that the state-dependent part of the probability distribution of uncertainty of the parameter includes a combination of basis functions capturing the dependency on the state of the system and the state-independent part of the probability distribution of uncertainty of the parameter includes the weights of the combination of basis functions independent from the state of the system and derived from the first and the second order moments of the estimated probability distribution of uncertainty of the parameter.

6. The SMPC of claim 5, wherein the probability distribution of uncertainty of the parameter models the weights of the combination of basis functions as a Gaussian distribution with unknown mean and covariance estimated by the SMPC during the control of the system as the first and the second order moments.

7. The SMPC of claim 1, wherein the processor is configured to execute a probabilistic filter to determine both the first and the second order moments of the estimated probability distribution of uncertainty of the parameter to reduce an error between measured state variables and state variables estimated with the updated control model.

8. The SMPC of claim 7, wherein the processor is configured to execute a particle filter to determine both the first and the second order moments of the estimated probability distribution of uncertainty of the parameter.

9. The SMPC of claim 8, wherein the particle filter maintains a set of particles, each particle represents a weighted estimation of the probability distribution of uncertainty of the parameter, wherein the set of particles collectively represents the first and the second order moments of the estimated probability distribution of uncertainty of the parameter, wherein to update the particles, the processor is configured to determine a relation between the state of the system estimated with the control model having the uncertainty and the state of the system estimated with the motion model without uncertainty; and update the probability distribution of the uncertainty of the parameter based on the determined relation to reduce the error between the estimated state and a measurement.

10. The SMPC of claim 9, wherein the relation is one or combination of a division between the state of the system estimated with the control model having the uncertainty and the state of the system estimated with the motion model without uncertainty, and a difference between the state of the system estimated with the control model having the uncertainty and the state of the system estimated with the motion model without uncertainty.

11. The SMPC of claim 7, wherein the processor is configured to execute a Kalman filter to determine both the first and the second order moments of the estimated probability distribution of uncertainty of the parameter.

12. The SMPC of claim 11, wherein the probability distribution of uncertainty of the parameter is modeled as a Gaussian distribution with unknown mean and covariance estimated by the Kalman filter during the control of the system as the first and the second order moments.

13. The SMPC of claim 1, wherein the first and the second order moments of the estimated probability distribution of uncertainty of the parameter is modeled as a covariance matrix, such that the SMPC propagates a trajectory of covariance matrices over the prediction horizon by evaluating nonlinear covariance propagation equations for a current trajectory of state and control values.

14. The SMPC of claim 1, wherein the SMPC performs an optimization subject to constraints, such that the update of the control model updates the constraints based on the second order moment of the estimated probability distribution of uncertainty of the parameter.

15. The SMPC of claim 1, wherein the system is a vehicle.

16. The SMPC of claim 15, wherein the probability distribution of uncertainty of the parameter models friction of a tire of the vehicle with a road the vehicle is traveling on.

17. The SMPC of claim 15, wherein the probability distribution of uncertainty of the parameter models a state of stiffness of a tire of the vehicle with a road the vehicle is traveling on, and wherein at least one of the constraints is adapted based on a peak friction determined from the state of stiffness of the tire.

18. The SMPC of claim 17, wherein the control model includes one or more probabilistic chance constraints, wherein each of the one or more probabilistic chance constraints defines physical or geometric limitations of the system accounting for uncertainty of different aspects of the control model.

19. A stochastic model predictive control (SMPC) method for controlling a system, wherein the method uses a processor coupled with stored instructions implementing the method, wherein the instructions, when executed by the processor carry out steps of the method, comprising:

determining, at each control step based on measurements of outputs of the system indicative of a transition of a state of the system from a previous state to a current state, an estimation of the current state of the system, and an estimation of a probability distribution of uncertainty of a parameter of dynamics of the system;

updating a control model of the system including a function of dynamics of the system modeling the uncertainty of the parameter with first and second order moments of the estimated probability distribution of uncertainty of the parameter;

determining a control input to control the system by optimizing the updated control model of the system at the current state over a prediction horizon; and controlling the system based on the control input to change the state of the system.

20. A non-transitory computer readable storage medium embodied thereon a program executable by a processor for performing a stochastic model predictive control (SMPC) method for controlling a system, the SMPC method comprising:

determining, at each control step based on measurements of outputs of the system indicative of a transition of a state of the system from a previous state to a current state, an estimation of the current state of the system, and an estimation of a probability distribution of uncertainty of a parameter of dynamics of the system;

updating a control model of the system including a function of dynamics of the system modeling the uncertainty of the parameter with first and second order moments of the estimated probability distribution of uncertainty of the parameter;

determining a control input to control the system by optimizing the updated control model of the system at the current state over a prediction horizon; and controlling the system based on the control input to change the state of the system.

\* \* \* \* \*